US007954287B2

(12) United States Patent
Bravo et al.

(10) Patent No.: US 7,954,287 B2
(45) Date of Patent: Jun. 7, 2011

(54) CABLE MANAGEMENT SYSTEM FOR A RAISED FLOOR GRID SYSTEM

(75) Inventors: Rey Bravo, Manhattan, IL (US); Brett A. Swett, Bolingbrook, IL (US); David R. Davis, Richton Park, IL (US); Dennis J. Waszak, Wheaton, IL (US); Rhonda Johnson, Chicago Heights, IL (US); Joseph Allen Dukes, Sugar Hill, GA (US); Kevin L. Nelson, Cumming, GA (US); Stanley A. Brzezniak, Lemont, IL (US)

(73) Assignee: Panduit Corp., Tinley Park, IL (US)

( * ) Notice: Subject to any disclaimer, the term of this patent is extended or adjusted under 35 U.S.C. 154(b) by 324 days.

(21) Appl. No.: 12/142,265

(22) Filed: Jun. 19, 2008

(65) Prior Publication Data

US 2009/0090073 A1 Apr. 9, 2009

Related U.S. Application Data

(63) Continuation-in-part of application No. 11/930,376, filed on Oct. 31, 2007, now Pat. No. 7,476,801, and a continuation-in-part of application No. 11/751,716, filed on May 22, 2007, now Pat. No. 7,723,622.

(60) Provisional application No. 60/948,071, filed on Jul. 5, 2007.

(51) Int. Cl.
*E04C 2/52* (2006.01)

(52) U.S. Cl. ............... 52/220.1; 52/220.2; 52/220.5; 52/220.7; 174/19; 174/60; 174/135; 248/49; 248/175

(58) Field of Classification Search ............ 52/220.1, 52/220.2, 220.7, 220.5, 263, 302.1, 302.2; 174/19, 47, 48, 60, 135; 248/49, 175
See application file for complete search history.

(56) References Cited

U.S. PATENT DOCUMENTS 3,009,235 A * 11/1961 De Mestral .................. 428/86
(Continued)

FOREIGN PATENT DOCUMENTS

DE 102006001644 A1 7/2006
(Continued)

OTHER PUBLICATIONS

Chatsworth Products, Inc. Product Information Sheet, Patch Panel Enclosures for Raised Access Floors, 2 pages, 2008.
(Continued)

*Primary Examiner* — Brian E Glessner
*Assistant Examiner* — James J Buckle, Jr.
(74) *Attorney, Agent, or Firm* — Robert A. McCann; Christopher S. Clancy; Aimee E. McVady

(57) ABSTRACT

A cable management system for managing electrical cables in a raised floor grid system is provided. The cable management system includes a cable enclosure including side walls and a base together defining an enclosure cavity. Each of the side walls defines a cable opening and a plurality of bracket openings in communication with the enclosure cavity. The cable management system also includes a sealing assembly installed in each of the cable openings, and a plurality of equipment brackets mountable to the sidewalls via the bracket openings, which are configured to enable mounting of the equipment brackets in vertical and angled orientations. The cable management system further includes a plurality of support brackets connectable to support structure of the raised floor grid system for supporting the cable enclosure on the support structure. The cable enclosure can be installed in the raised floor grid system by removing only a single floor tile.

10 Claims, 47 Drawing Sheets

U.S. PATENT DOCUMENTS

| | | | | |
|---|---|---|---|---|
| 3,052,369 | A * | 9/1962 | Taibi | 220/3.6 |
| 3,387,345 | A * | 6/1968 | Savoir | 24/446 |
| 3,461,513 | A * | 8/1969 | Hockmeyer et al. | 24/445 |
| 3,784,042 | A | 1/1974 | Hadfield et al. | |
| 3,941,159 | A * | 3/1976 | Toll | 138/147 |
| 4,086,736 | A * | 5/1978 | Landrigan | 52/220.8 |
| 4,277,923 | A | 7/1981 | Rebentisch et al. | |
| 4,536,612 | A * | 8/1985 | Domigan | 174/489 |
| 4,708,664 | A * | 11/1987 | Yard | 439/471 |
| 4,930,543 | A * | 6/1990 | Zuiches | 138/110 |
| 5,101,078 | A * | 3/1992 | Yang | 174/482 |
| 5,271,585 | A | 12/1993 | Zetena, Jr. | |
| 5,316,244 | A | 5/1994 | Zetena, Jr. | |
| 5,505,500 | A * | 4/1996 | Webb et al. | 285/223 |
| 5,546,717 | A | 8/1996 | Penczak et al. | |
| 5,628,157 | A * | 5/1997 | Chen | 52/263 |
| 5,787,663 | A | 8/1998 | Wehrmann | |
| 5,791,096 | A * | 8/1998 | Chen | 52/126.6 |
| 5,953,870 | A * | 9/1999 | Jette | 52/220.1 |
| 6,061,884 | A * | 5/2000 | Ohms et al. | 24/703.1 |
| 6,274,809 | B1 | 8/2001 | Pudims et al. | |
| 6,278,061 | B1 * | 8/2001 | Daoud | 174/659 |
| 6,395,978 | B1 * | 5/2002 | Whitehead et al. | 174/50 |
| 6,449,912 | B2 * | 9/2002 | Jette | 52/220.1 |
| 6,463,704 | B1 | 10/2002 | Jette | |
| 6,632,999 | B2 * | 10/2003 | Sempliner et al. | 174/659 |
| 6,637,165 | B2 * | 10/2003 | Jette | 52/220.1 |
| 6,672,022 | B2 * | 1/2004 | Simmons | 52/263 |
| 6,855,884 | B2 * | 2/2005 | Spagnoli et al. | 174/507 |
| D507,539 | S * | 7/2005 | Hull et al. | D13/152 |
| 6,998,531 | B2 * | 2/2006 | Hull | 174/50 |
| 7,141,744 | B2 * | 11/2006 | Cloutier | 174/650 |
| 7,145,075 | B2 * | 12/2006 | Hull et al. | 174/50 |
| 7,186,913 | B2 * | 3/2007 | Hull et al. | 174/50 |
| 7,304,240 | B1 * | 12/2007 | Gretz | 174/72 A |
| 7,373,759 | B1 * | 5/2008 | Simmons | 52/220.5 |
| 7,462,785 | B1 * | 12/2008 | Davis et al. | 174/481 |
| 7,507,912 | B1 * | 3/2009 | Sempliner et al. | 174/153 G |
| 2001/0011441 | A1 * | 8/2001 | Jette | 52/220.1 |
| 2002/0014045 | A1 * | 2/2002 | Jette | 52/220.1 |
| 2002/0184843 | A1 * | 12/2002 | Jette | 52/220.1 |
| 2002/0194801 | A1 * | 12/2002 | Jette | 52/220.5 |
| 2003/0037942 | A1 * | 2/2003 | Haselby et al. | 174/35 R |
| 2003/0089049 | A1 | 5/2003 | Scissom et al. | |
| 2003/0207664 | A1 * | 11/2003 | Quinet | 454/187 |
| 2004/0010990 | A1 * | 1/2004 | Moselle | 52/220.1 |
| 2004/0049998 | A1 * | 3/2004 | Jette | 52/220.1 |
| 2005/0072589 | A1 * | 4/2005 | Hull et al. | 174/50 |
| 2005/0166483 | A1 | 8/2005 | Mead | |
| 2005/0284650 | A1 * | 12/2005 | Hull et al. | 174/58 |
| 2007/0020991 | A1 | 1/2007 | Murano | |
| 2010/0000758 | A1 * | 1/2010 | Bravo et al. | 174/60 |

FOREIGN PATENT DOCUMENTS

| | | |
|---|---|---|
| DE | 202007016555 U1 * | 2/2008 |
| EP | 0766361 A1 | 4/1997 |

OTHER PUBLICATIONS

Chatsworth Products, Inc. Product Data Sheet, Fiber Enclosure for Raised Floors, 2 pages, 2008.

Chatsworth Products, Inc. Product Information Sheet, Raised Floor Enclosure for Patch Panels, 3 pages, 2003.

Chatsworth Products, Inc. Product Information Sheet, Raised Floor Enclosure for Active Components, 1 page, 2003.

Chatsworth Products, Inc. Product Information Sheet, Drop-In Floor Enclosure with Lid for Patch Panels, 1 page, 2003.

Haworth, Inc. Pre-Terminated Zone Brochure, 2 pages, Jul. 2004.

* cited by examiner

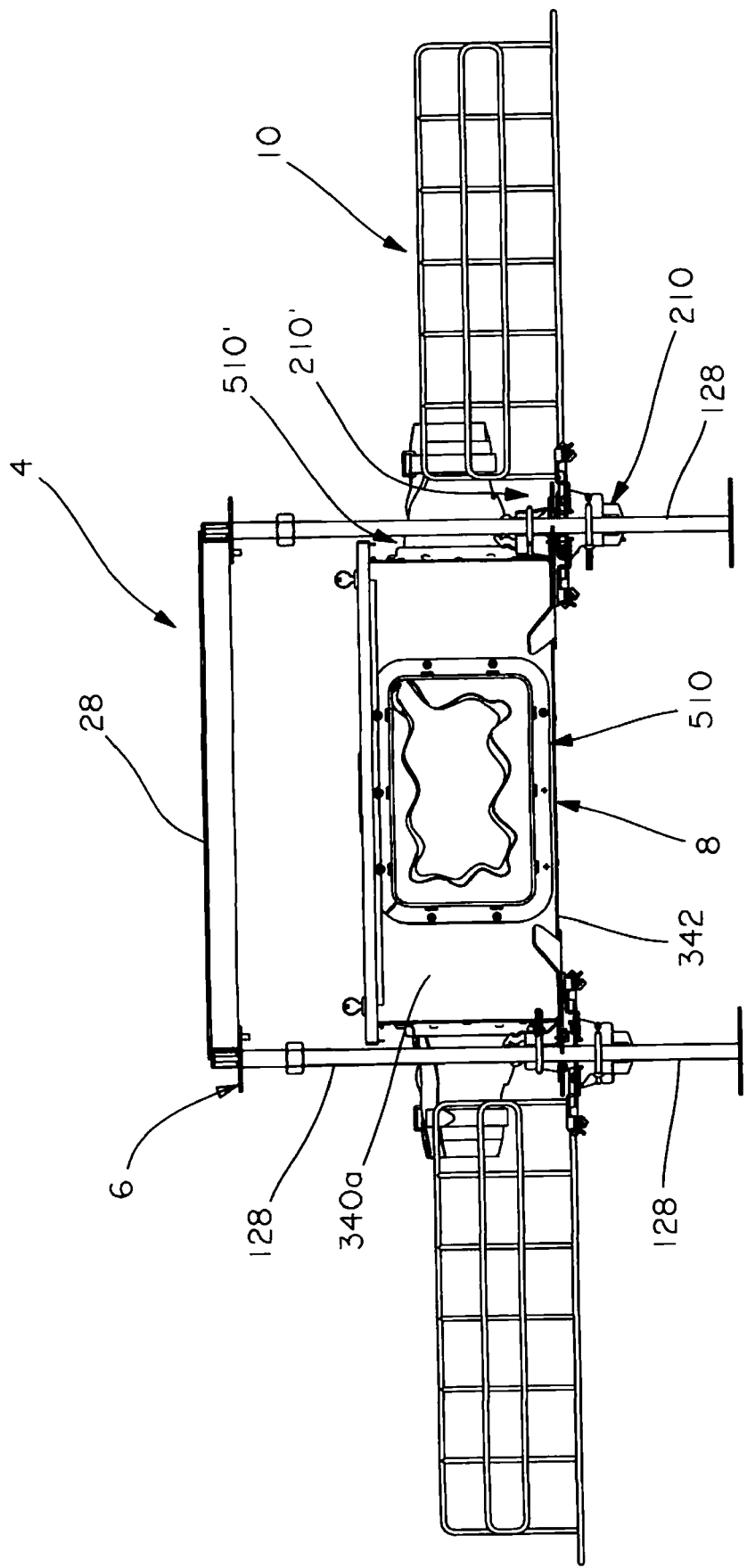

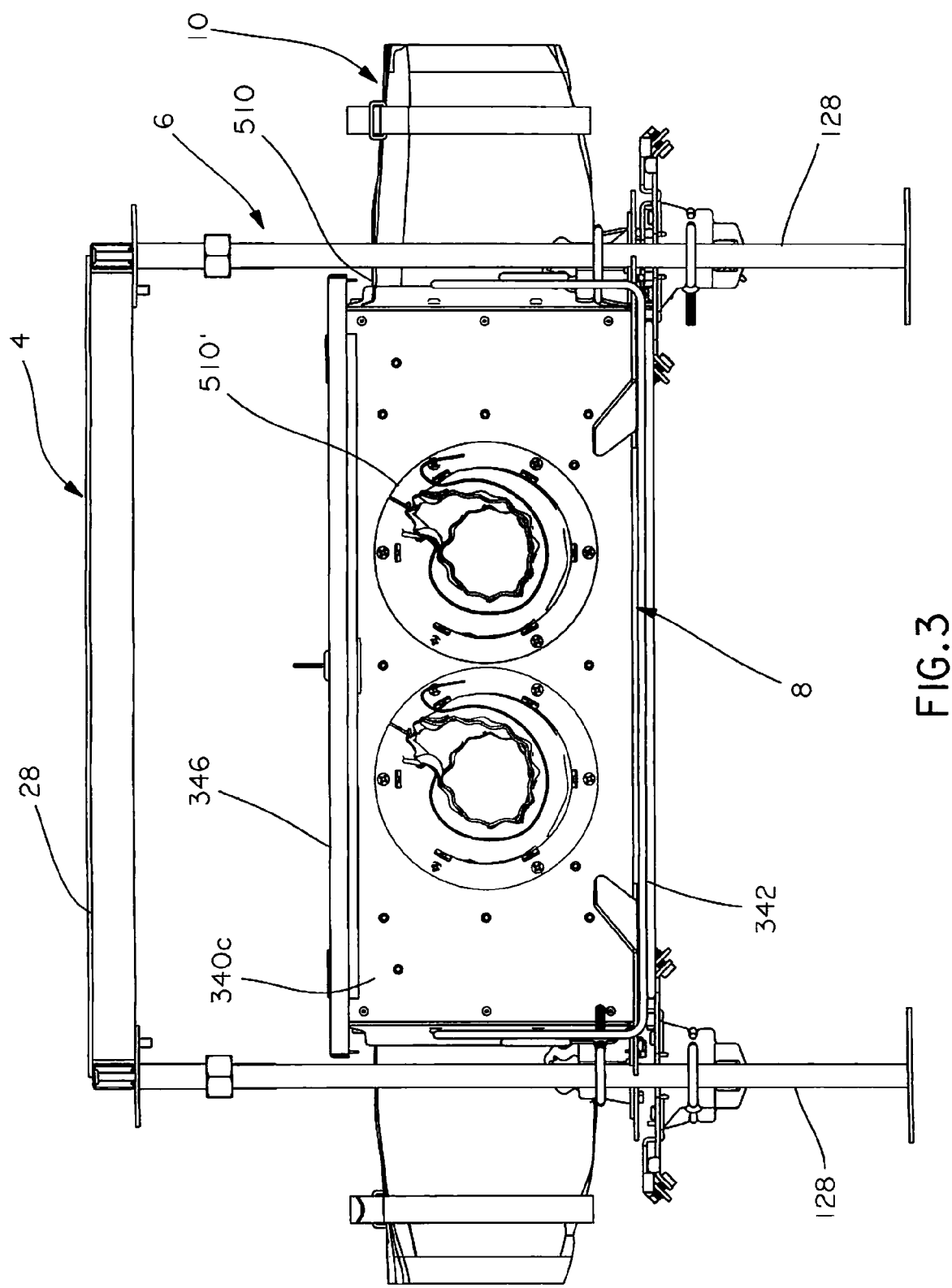

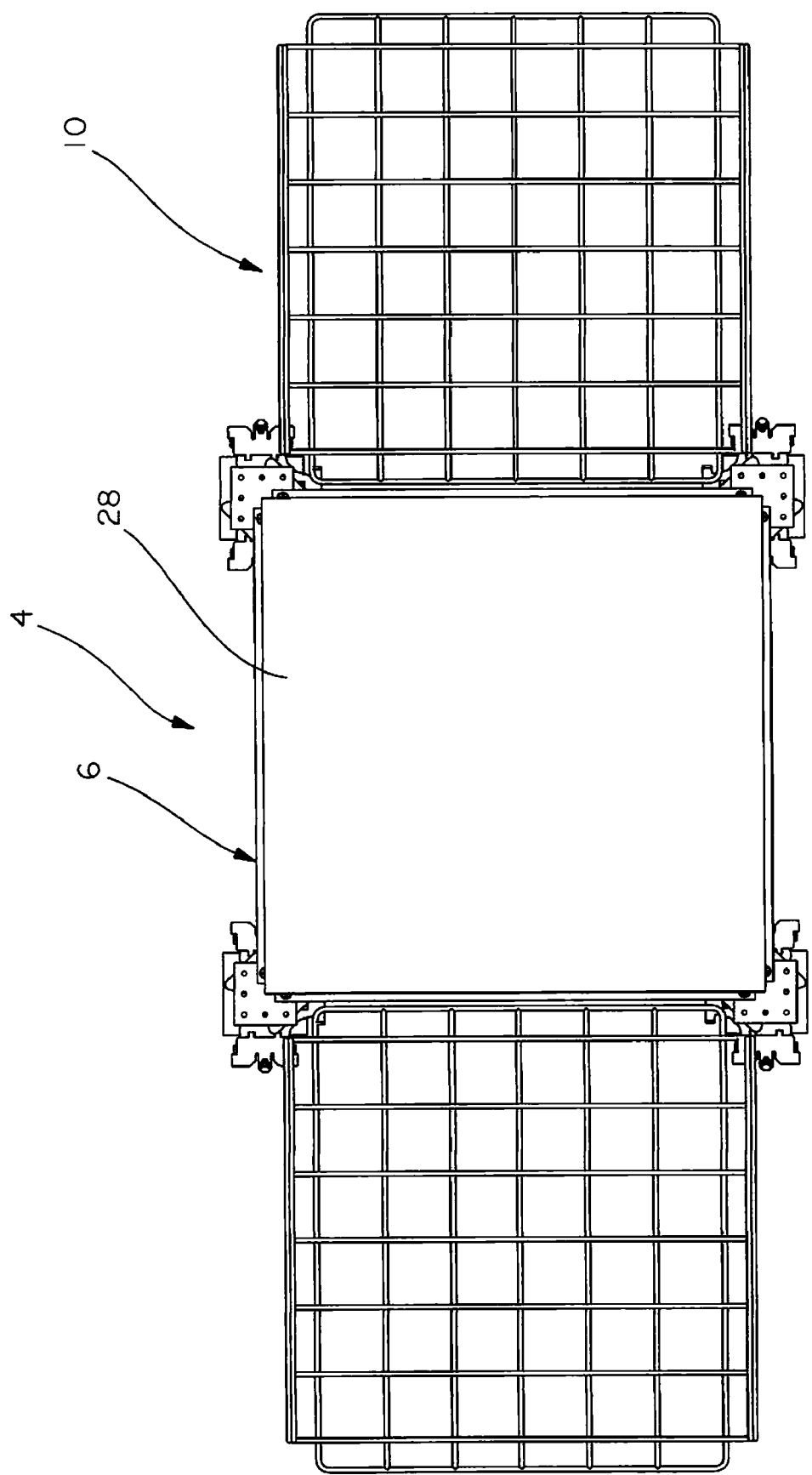

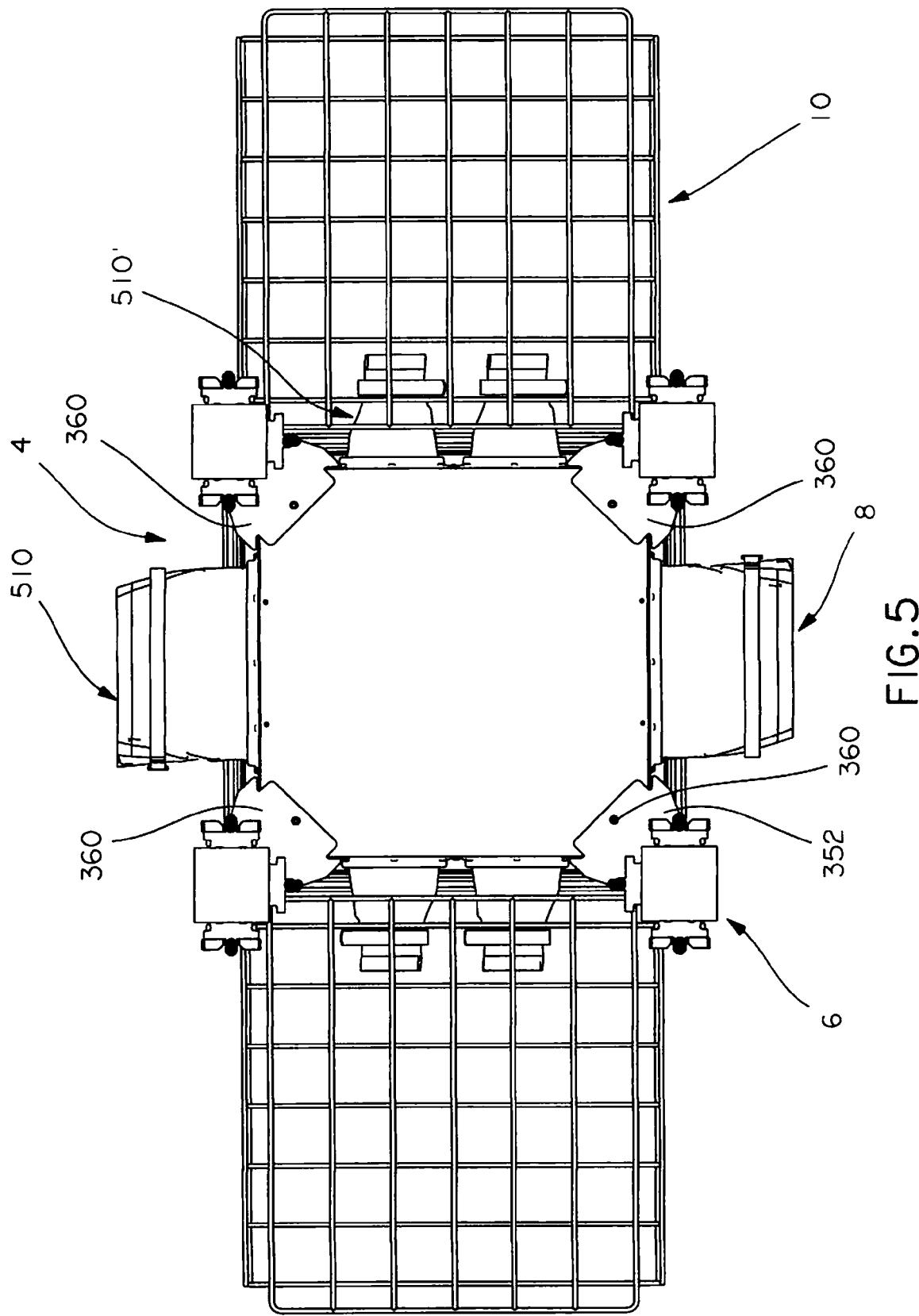

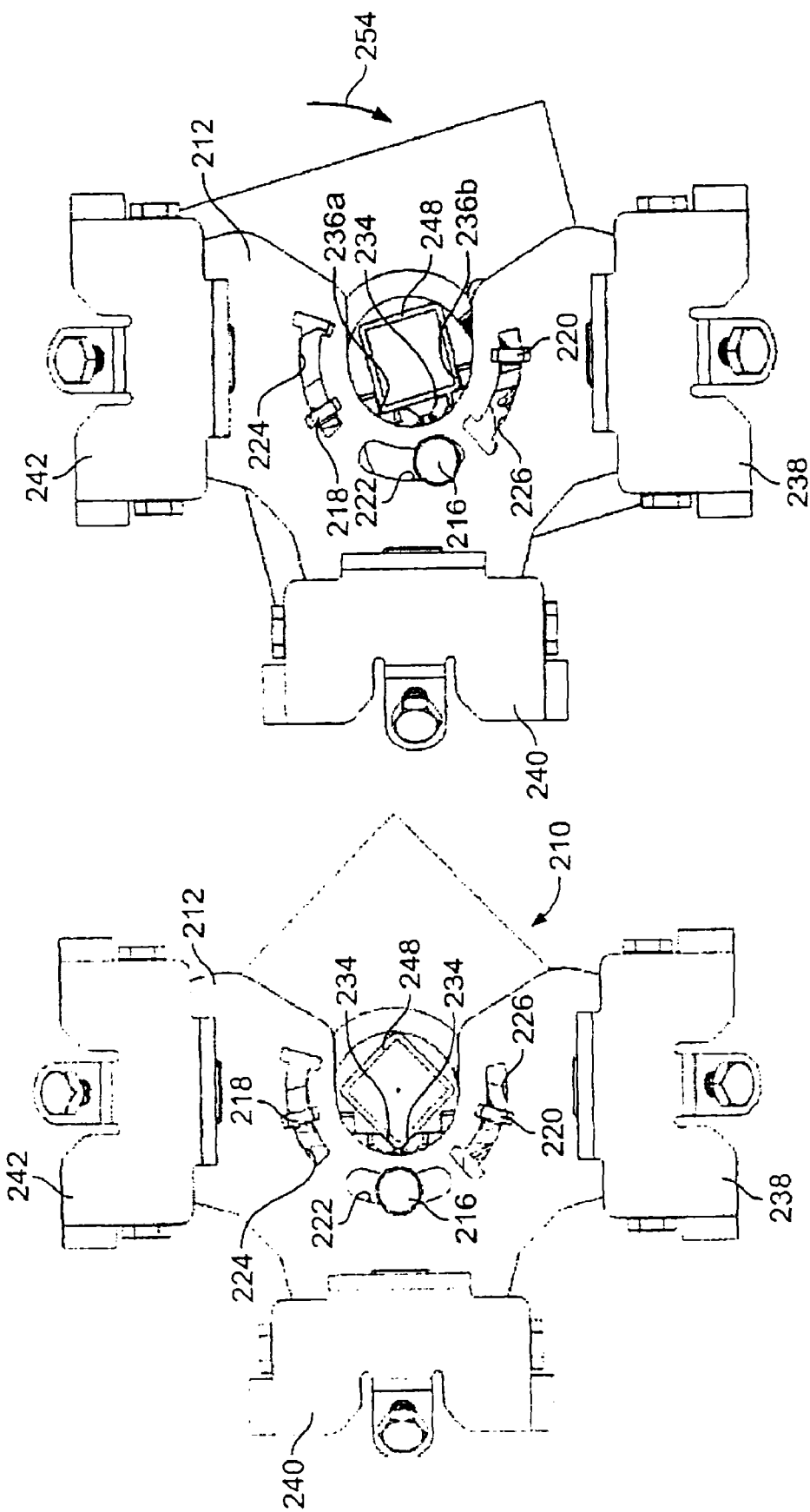

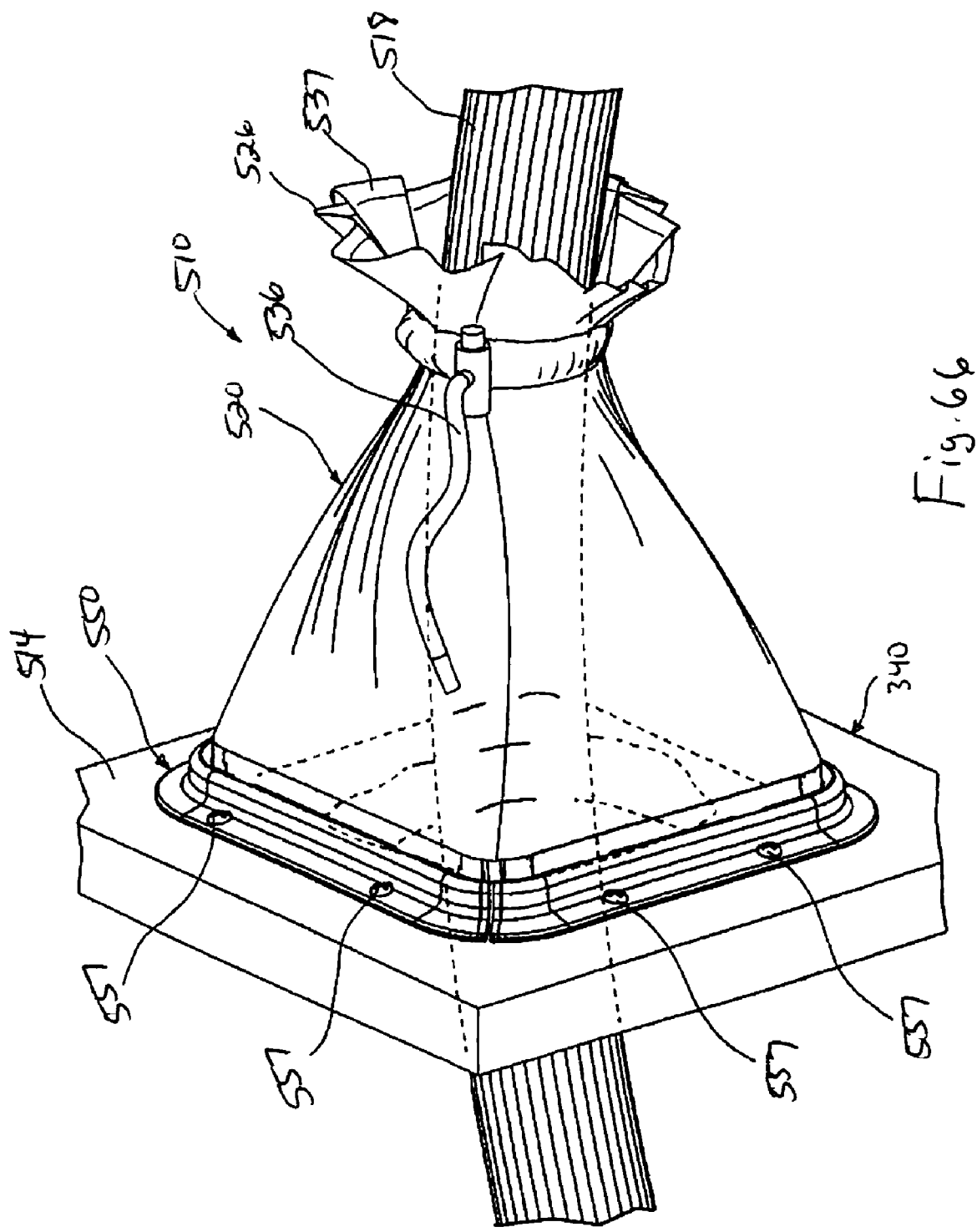

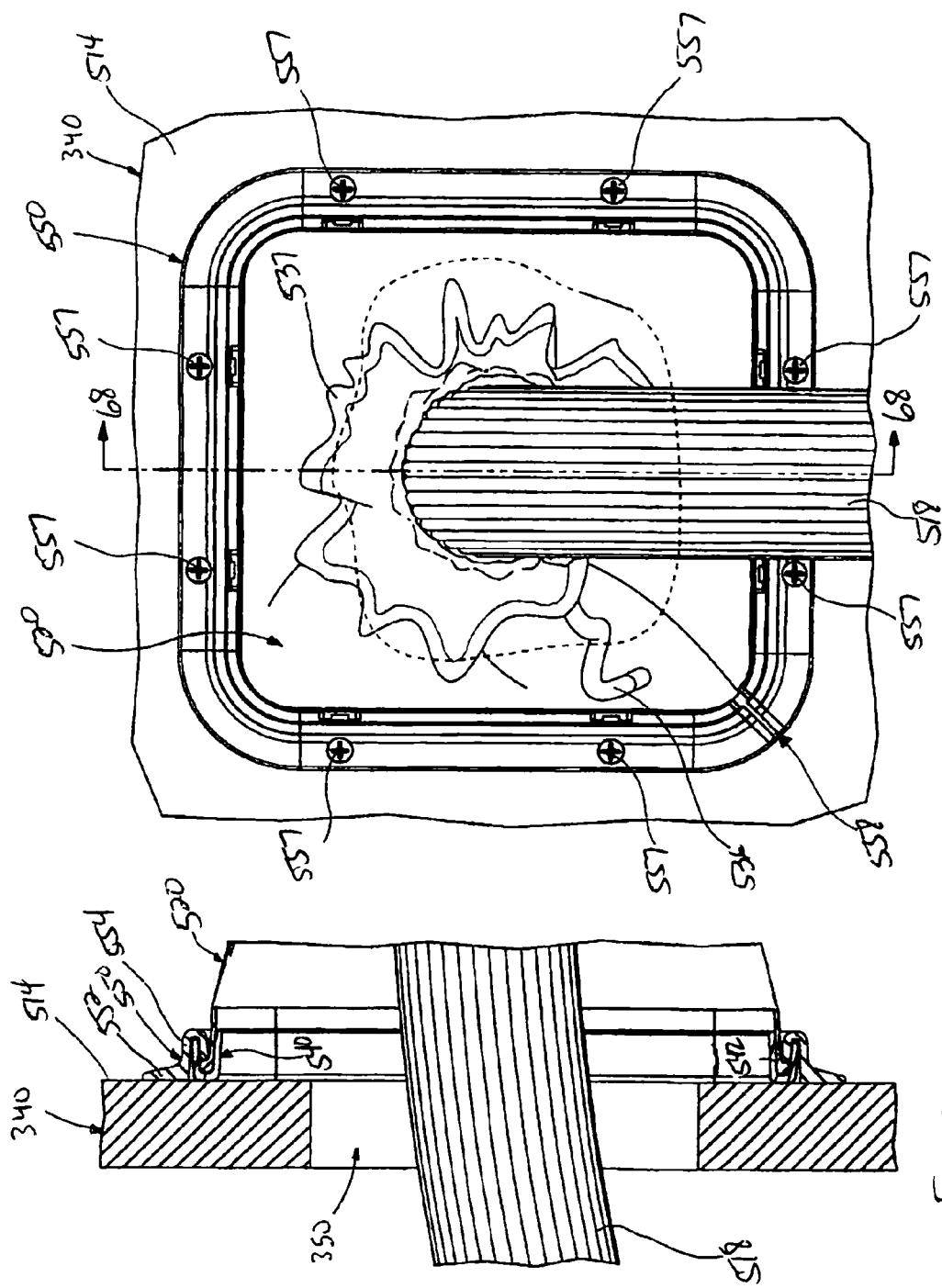

CABLE MANAGEMENT SYSTEM FOR A RAISED FLOOR GRID SYSTEM

CROSS-REFERENCE TO RELATED APPLICATIONS

This application is a continuation-in-part of U.S. patent application Ser. No. 11/930,376 filed Oct. 31, 2007, which claims the benefit of U.S. Provisional Patent Application No. 60/948,071, filed Jul. 5, 2007; and this application is a continuation-in-part of U.S. patent application Ser. No. 11/751,716, filed May 22, 2007, the contents of all are hereby incorporated herein by reference.

FIELD OF INVENTION

This invention relates generally to the positioning, support, protection, and interconnection of conductive cables, and is particularly directed to wire basket arrangements and cable enclosures for maintaining pathways of conductive cables securely and safely in position in a raised floor grid system.

BACKGROUND OF THE INVENTION

The widespread use of electronic systems in business and industry has led to the requirement to route large numbers of cables throughout the work environment. Various types of cable tray assemblies are used as a support system for carrying these cables throughout various locations in buildings and other commercial structures.

Attempts to provide additional space to accommodate greater numbers of cables have led to the development of raised floor grid systems. Raised floor grid systems make use of the space between the structure's original floor and an upper floor disposed in a spaced manner above the original floor.

Cable management systems are particularly adapted for positioning beneath the floor panels of the raised floor to contain and direct cables along their respective pathways. Cable management systems can include cable tray assemblies and cable enclosures. The cable tray assemblies are generally comprised of a large number of individual cable trays which are typically made of wire lengths welded together in a cage-like arrangement to provide a support surface for the cables. Cable enclosures are typically located at an intersection of two different runs of cable trays. Typical cable management systems are installed by removing floor tiles and cross beams from the raised floor grid system, which provides openings in the grid. The cable tray assemblies are passed through the openings to a position below the floor grid system. To install a cable enclosure, both floor tiles and the grid structure are required to be removed in order to provide a sufficiently large space through which the cable enclosure can pass to a position below the floor grid.

One problem encountered in these prior art cable management systems is the presence of sharp edges in the cable tray assemblies which are capable of cutting the cable's outer protective sheathing. In addition, increasing the number of cables within the confined space of the raised floor system restricts access to cable pathways which is required for carrying out maintenance and repair functions. The ability to vary the horizontal and vertical positioning of cable pathways in a controlled manner for improving cooling air circulation, optimizing cable pathway spacing and providing additional cable pathways is also limited in existing cable support systems.

Another problem encountered with these prior art cable management systems is that the cable enclosures are sized larger than an opening created by removing a single floor tile and, therefore, require that a user remove numerous floor tiles (both the floor tile directly above the desired position of the cable enclosure and adjacent floor tiles) and grid structure supporting the floor tiles and positioned adjacent the desired position of the cable enclosure. Removal of multiple floor tiles and support structure and reassembly of the tiles and support structure after installation of the cable enclosure is very time consuming.

The present invention addresses the aforementioned limitations of the prior art by providing for the flexible vertical and lateral positioning of cable pathways in a raised floor system, as well as the elimination of sharp edges in, and an increase in the strength of, individual cable trays for accommodating larger numbers of cables. The present invention also addresses the aforementioned limitations of the prior art by facilitating installation of a cable enclosure by solely removing a single floor tile, thereby decreasing the time required to install a cable enclosure.

SUMMARY OF THE INVENTION

The present invention relates to an improved arrangement for supporting, grounding and connecting together plural wire frames in a cable tray system.

The present invention also relates to the safe and secure support of large numbers of conductive cables in a raised floor system, while providing cable access for inspection and maintenance.

The present invention further relates to an improved arrangement for a cable pathway system which facilitates rerouting of the conductive cables and the incorporation of additional cables.

The present invention relates still further to improved cable tray wire frames having substantially increased strength and rigidity.

Additionally, the present invention relates to a cable management system for managing electrical cables in a raised floor grid system, the raised floor grid system including support structure and a plurality of floor tiles supported by the support structure at a distance above a floor surface. The cable management system includes a cable enclosure including a plurality of side walls and a base together defining an enclosure cavity, each of the plurality of side walls defines a cable opening and a plurality of bracket openings therethrough in communication with the enclosure cavity; a sealing assembly installed in each of the cable openings defined in the plurality of side walls, each sealing assembly including a flexible sleeve configured to receive at least one electrical cable therethrough, each sleeve includes a first end portion, a second end portion, and a hook and loop fastener attached to the first end portion of the sleeve, and wherein the second end portion of the sleeve is securable to the side wall, the sleeve being movable between an external position, in which the first portion is positioned externally of the enclosure cavity, and an internal position, in which the first portion is positioned in the enclosure cavity; a plurality of equipment brackets mountable to the sidewalls via the plurality of bracket openings, the plurality of bracket openings being configured to enable mounting of the equipment brackets in a vertical orientation and an angled orientation: and a plurality of support brackets connectable to the support stricture of the raised floor grid system for supporting the cable enclosure on the support structure, wherein each bracket includes a support plate having a pair of upward extending flanges and the cable enclosure is engageable with and supportable by the support plates; wherein the cable enclosure is installable in the raised floor grid system by removing only a single floor tile.

BRIEF DESCRIPTION OF THE DRAWINGS

Certain embodiments of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular embodiments illustrated herein.

FIG. 2 is a front view of the cable management system shown in FIG. 1;

FIG. 4 is a top view of the cable management system shown in FIG. 1;

FIG. 5 is a bottom view of the cable management system shown in FIG. 1;

FIG. 30 is an exploded perspective view of the pedestal bracket shown in FIG. 29;

FIGS. 36-38 are top plan views of the pedestal bracket illustrating the manner in which the angular orientation of the pedestal bracket on a vertical support member to which it is attached may be varied over a 360° range;

FIG. 66 is a perspective view of the sealing assembly of FIG. 56 as installed without the grommet;

FIG. 67 is a top view of the sealing assembly of FIG. 66;

FIG. 68 is a cross-sectional vie taken along line 68-68 in FIG. 67; and

DETAILED DESCRIPTION OF THE PREFERRED EMBODIMENTS

Figure 1:
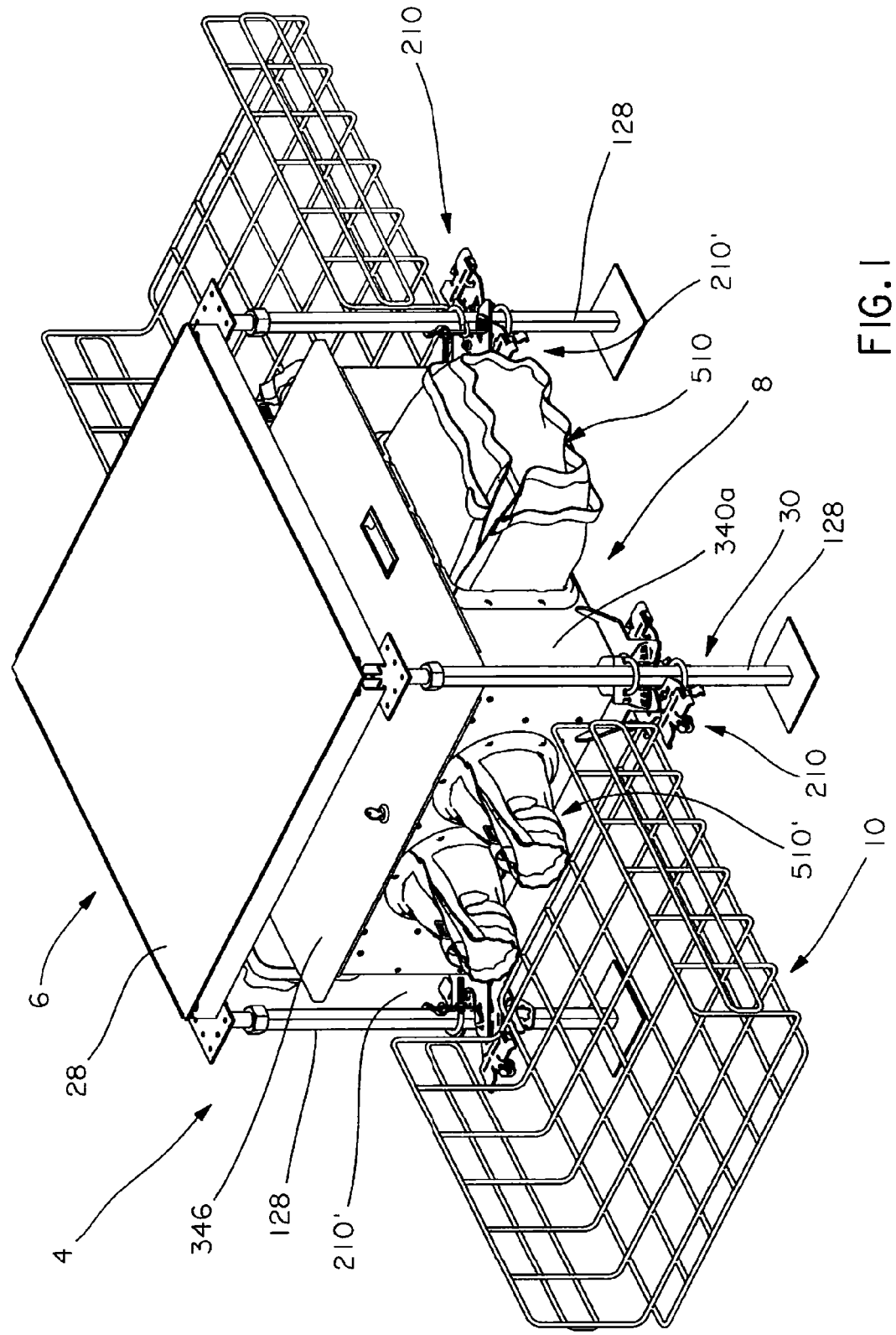
FIG. 1 is a top perspective view of a cable management system.

Referring to FIGS. 1-5 one example of a cable management system 4 is illustrated and is operable to assist with managing communication cables carrying electronic signals between electrical instrumentation (not shown). In the illustrated construction, the cable management system 4 is used with a raised floor grid system 6 (see FIG. 6), which includes raised floor tiles 28 and a support structure 30. The support structure 30 is supported on a lower floor 26 and supports the raised floor tiles 28 above the lower floor 26. For simplicity, only a single raised floor tile 28 and associated support structure 30 are illustrated. In use, an array of raised floor tiles 28 and associated support structures 30 will be utilized (see FIG. 6). Alternatively, the cable management system 4 may be used in applications other than raised floor grid systems to assist with managing communication cables in such applications. The cable management system 4 includes a wire basket pathway system 10 and a cable enclosure 8. For simplicity, only a small portion of the wire basket pathway system 10 is shown in FIGS. 1-5. A more extensive version of the wire basket pathway system 10 will be illustrated and described hereinafter.

Figure 6:
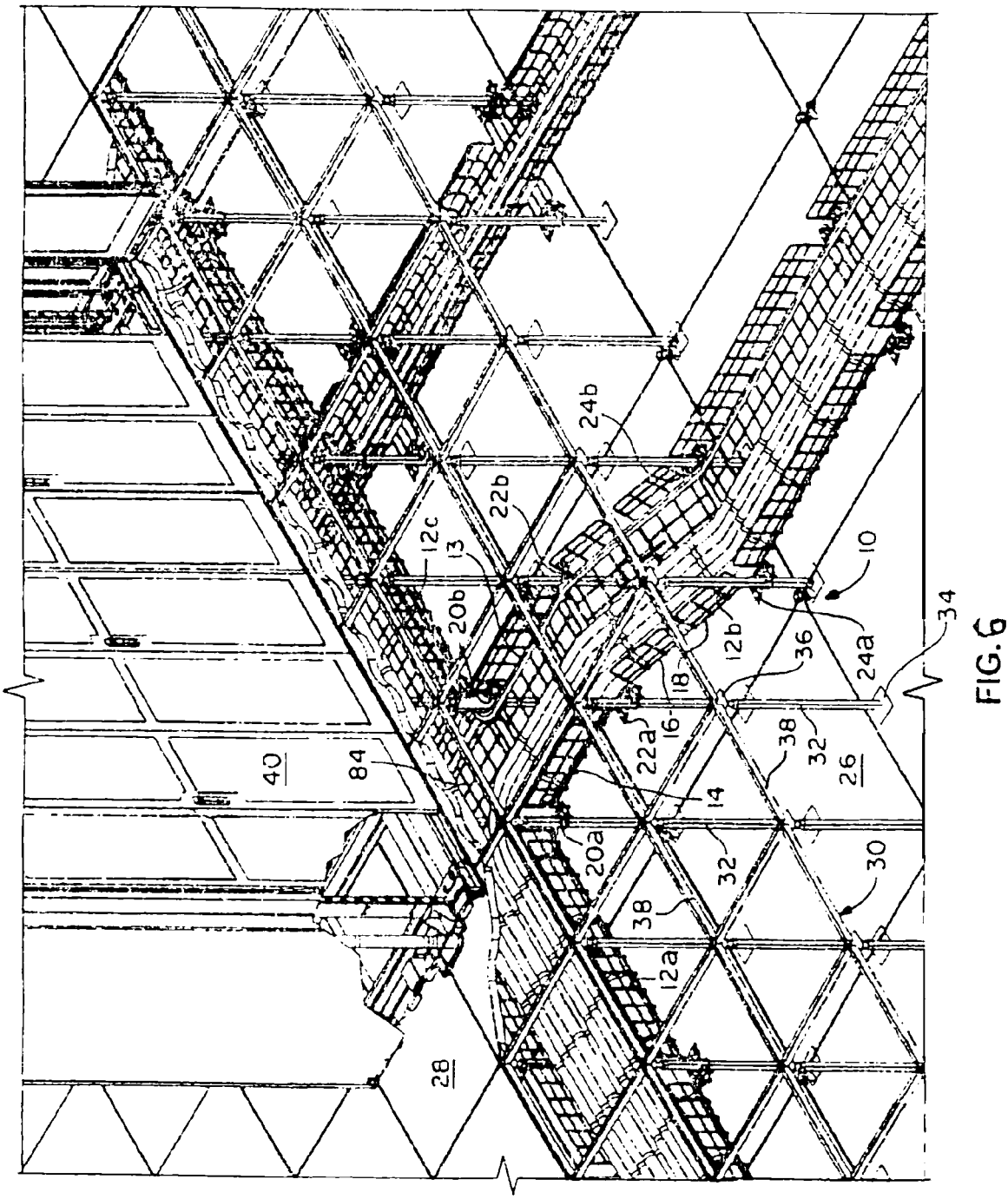
FIG. 6 is a perspective view of an improved wire basket pathway system of the cable management system.

Referring to FIG. 6, there is shown a perspective view of an exemplary wire basket pathway system 10 of the cable management system 4. The wire basket pathway system 10 provides for plural cable runs 12a, 12b and 12c, which are shown as an example, as the present invention is adapted for use with virtually any number of cable runs. Each of these three cable runs 12a, 12b and 12c includes plural cables carrying electronic signals. The wire basket pathway system 10 may also include one or more optical cables 13, as well as, possibly power cables which are not shown in the figure for simplicity.

The first, second and third cable rims 12a, 12b and 12c are disposed between a first lower floor 26 and a second raised floor 28. Electronic instrumentation is disposed on the second raised floor 28 and is typically enclosed in one or more cabinets 40.

The cable runs 12a, 12b and 12c are positioned on and supported by the exemplary wire basket pathway system 10. The wire basket pathway system 10 includes plural wire baskets connected together and maintained in position by means of a support structure 30. Support structure 30 includes plural spaced vertical members 32 disposed on the first lower floor 26 and interconnected by means of plural upper horizontal members 38. Each of the vertical members 32 includes a respective lower plate 34 disposed on the first lower floor 26 and an upper plate 36 engaging and supporting plural upper horizontal members 38. This type of wire basket support structure 30 is conventional in structure and function. Typically, upper horizontal members 38 are also utilized to support floor panels of upper floor 28. As will be mentioned later below, the floor panels are currently at a United States standard of 24 inches by 24 inches and at a European standard of 600 mm by 600 mm.

The wire basket pathway system 10 shown in FIG. 6 includes a large number of wire baskets, but only three wire baskets 14, 16 and 18 will be discussed herein for simplicity. Each of the first, second and third wire baskets 14, 16 and 18 support the second cable run 12b, as well as, a portion of the optical cable run 13. Each of the first, second and third wire baskets 14, 16 and 18 is connected to and supported by two or more vertical members 32. Thus, the first wire basket 14 is connected to and supported by four vertical members 32 by means of four pedestal brackets 20a, 20b, 22a and 22b. Similarly, the second wire basket 16 is coupled to and supported by a pair of vertical members 32 by means of pedestal brackets 22a and 22b. Finally, the third wire basket 18 is coupled to and supported by a pair of vertical members 32 by means of pedestal brackets 24a and 24b. In accordance with one aspect of the present invention, each of these pedestal brackets couple the wire basket or baskets to which it is connected to the building ground system via the vertical member on which the pedestal bracket is positioned (assuming the vertical member is otherwise grounded to the building ground). The second and third wire baskets 16, 18 are connected together in a telescoping manner to allow for a change in vertical height of the second cable run 12b in a manner which is described in detail below.

Figure 7:
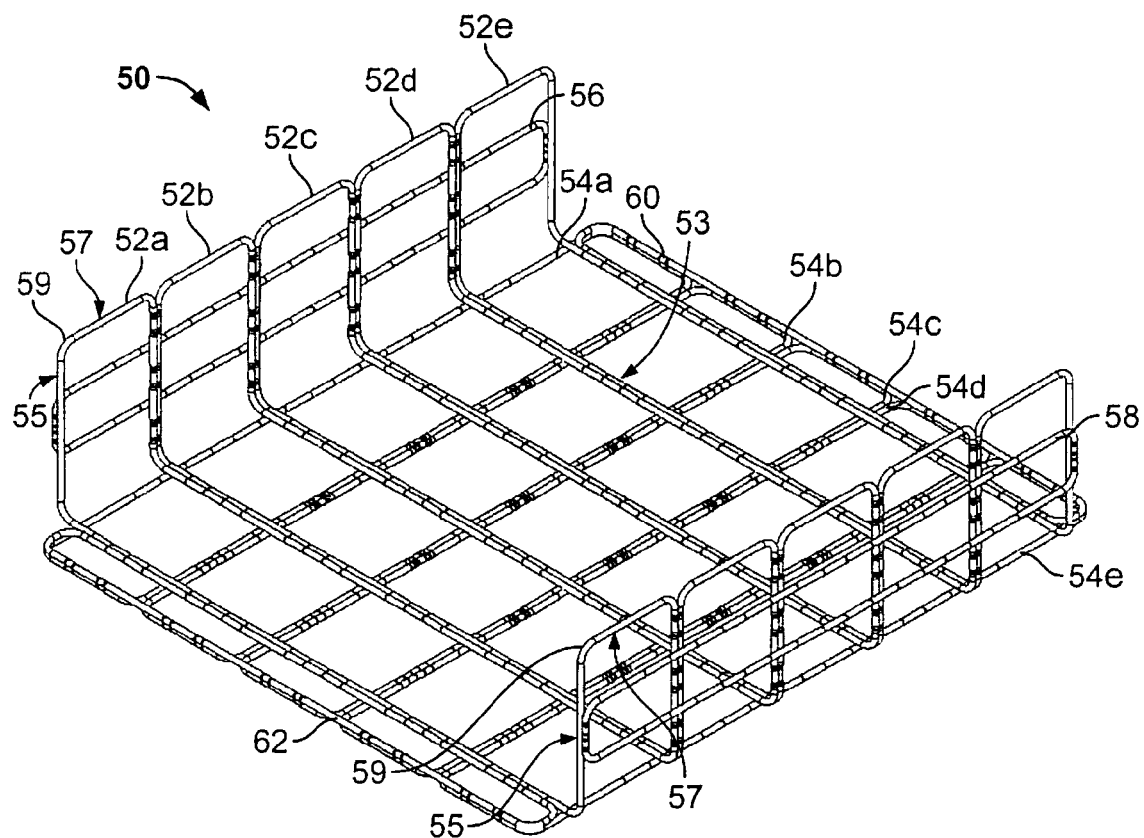
FIG. 7 is an upper perspective view of a wire basket for use in a cable pathway system.

Referring to FIG. 7, there is shown one embodiment of an upper perspective of a reinforced wire basket 50. Reinforced wire basket 50 is comprised of plural connected wires and is designed to provide additional rigidity and strength for supporting and maintaining, in fixed position, large numbers of cables. The wires are preferably comprised of high pre-galvanized steel wire. However, the wires can be constructed of other metals such as stainless steel, cold-rolled steel, and the like. All 90° angles, as shown in this embodiment, in reinforced wire basket 50, as well as in all other wire basket structures disclosed herein, are formed by bending wires in a smooth curve and do not include any sharp edges which could damage a cable supported by the basket. The avoidance of sharp edges also prevents injuries to installers and technicians working with and around the system. Reinforced wire basket 50 is comprised of plural aligned U-shaped closed wire frames 52a-52e which are connected together in a side-by-side relationship forming a generally flat bottom 53 and opposed upraised end portions 55. This construction provides wire basket 50 with a generally overall U-shaped frame. As can be seen in FIG. 7, upraised end portion 55 comprises a closed section 57 without an end and in this example, two bend radii 59 are positioned one at each end of closed section 57. Reinforced wire basket 50 further includes plural aligned flat closed wire frames 54a-54e similarly, constructed in side-by-side relationship forming a generally flat structure. The lower portion of each of the U-shaped closed wire frames 52a-52e are placed in contact with and securely connected to each of the flat closed wire frames 54a-54e by means of resistance weldments at each wire intersection. Disposed on and securely attached to opposed vertical or upraised end portions 55 of the U-shaped closed wire frames 52a-52e by means of resistance weldments are first and second closed parallel wire flames 56 and 58. Opposed end portions of each of the flat closed wire frames 54a-54e extend beyond the respective end U-shaped closed wire frames 52a and 52e. Disposed on and securely attached by means of resistance weldments to each of the end extensions of the flat closed wire frames 54a-54e are third and fourth closed parallel wire frames 60 and 62. The double wire configuration of the connected U-shaped and flat closed wire frames as well as on its two opposed side and end portions substantially increases the strength and rigidity of the wire basket for supporting the weight of additional cables. The reinforced wire basket 50 is 21" wide by 6" high by 24" long.

Figure 8:
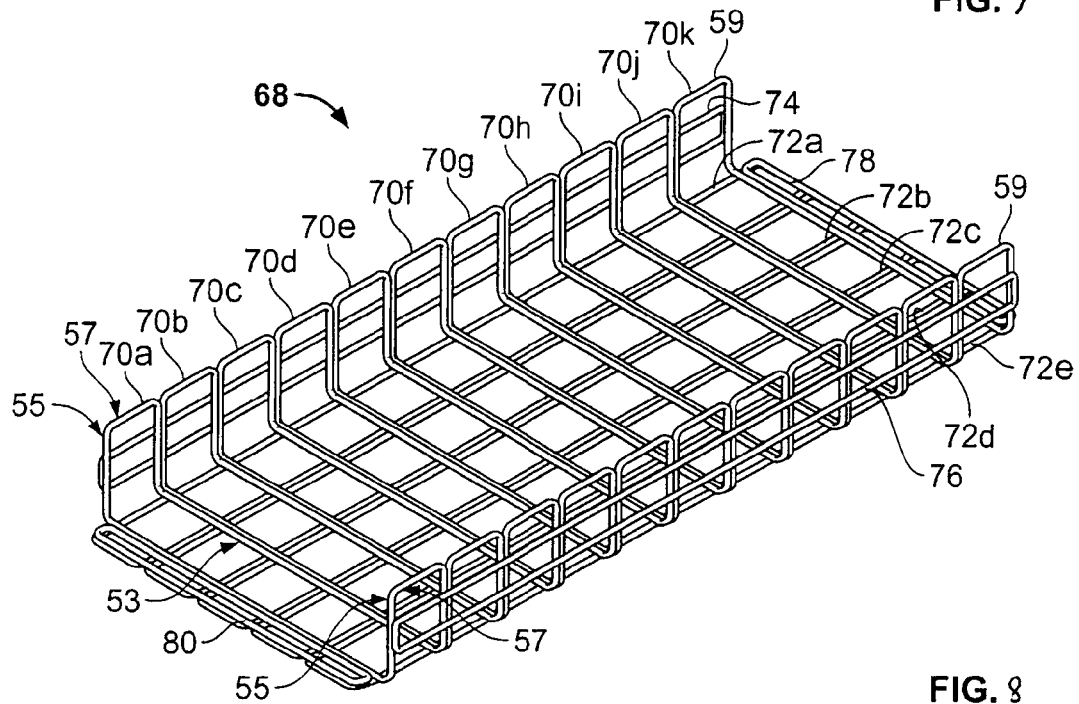
FIG. 8 is an upper perspective view of another embodiment of a wire basket for use in a cable pathway system.

Shown in FIG. 8 is a larger reinforced wire basket 68 which is 21" wide by 6" high by 48" long. Reinforced wire basket 68 has a larger number of U-shaped closed wire frames 70a-70k than that of reinforced wire basket 50 shown in FIG. 7. As in the previously described embodiment, reinforced wire basket 68 includes plural flat closed wire frames 72a-72e, first and second closed parallel wire frames 74 and 76 disposed on lateral portions of the U-shaped closed wire frames, and third and fourth closed parallel wire frames 78 and 80 disposed on opposed ends of the reinforced wire basket. The larger reinforced wire basket 68 shown in FIG. 8 would permit the use of fewer pedestal brackets in a wire basket pathway system in which it is incorporated. The reinforced wire baskets disclosed herein are not limited to the specific dimensions discussed herein, but may have a wide range of dimensions depending upon the dimensions of the cable pathways being supported.

Figure 9:
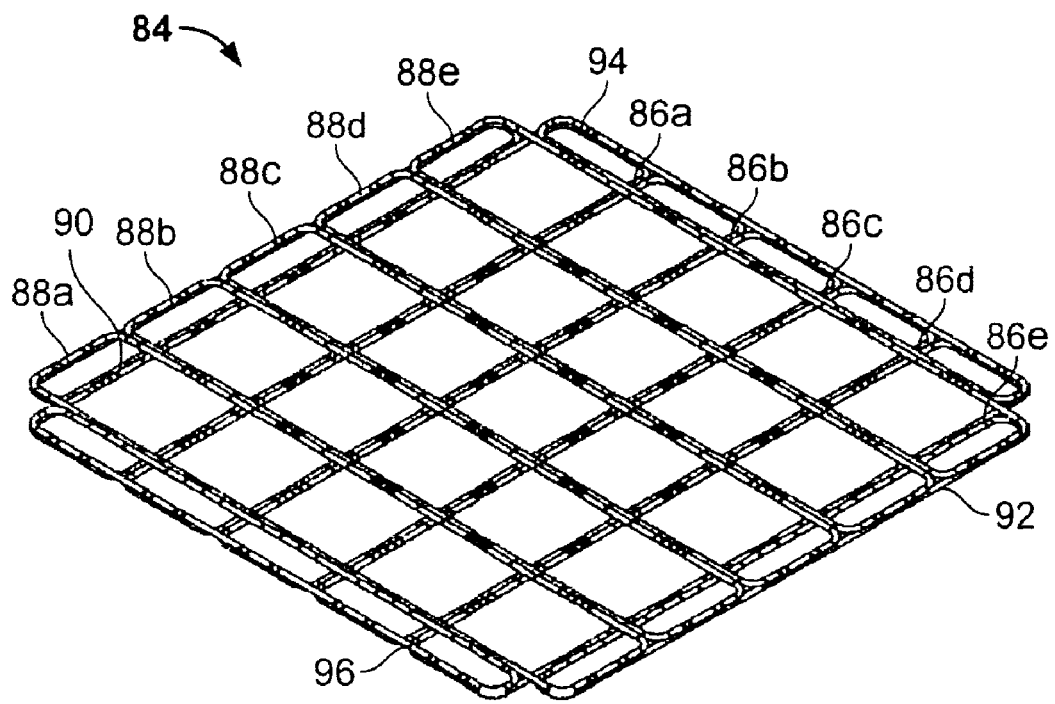
FIG. 9 is a perspective view of a wire basket intersection for use in a cable pathway system.

Referring to FIG. 9, there is shown a reinforced wire basket intersection 84 that can be used in place of the cable enclosure 8 (see FIG. 1) depending on the desires of the user and the demands of the cable management system 4. Reinforced wire basket intersection 84 is also shown in the wire basket pathway system 10 of FIG. 6. Reinforced wire basket intersection 84 is installed and attached in the wire basket pathway system 10 in the same manner as the aforementioned wire baskets and allows for horizontal directional changes of the cables with a single component. Reinforced wire basket intersection 84 includes first plural closed parallel wire frames 86a-86e and second plural closed parallel wire frames 88a-88e which are aligned generally transverse to and are disposed in contact with one another. The ends of the first plural closed parallel wire frames 86a-86e extend beyond the width of the second plural closed parallel wire frames 88a-88e. Similarly, the ends of the second plural closed parallel wire frames 88a-88e extend beyond the width of the first plural closed parallel wire frames 86a-86e. First and second closed parallel wire frames 90 and 92 are disposed on and attached to opposed ends of the second plural closed parallel wire frames 88a-88e. Similarly, third and fourth closed parallel wire frames 94 and 96 are disposed upon and attached to opposed ends of the first plural closed parallel wire frames 86a-86e. Each wire frame is securely attached to all other wire frames with which it is in contact by means of resistance weldments. Providing a resistance weldment at each intersection of the various wire frames substantially increases the strength and rigidity of the reinforced wire basket intersection 84.

Figure 10:
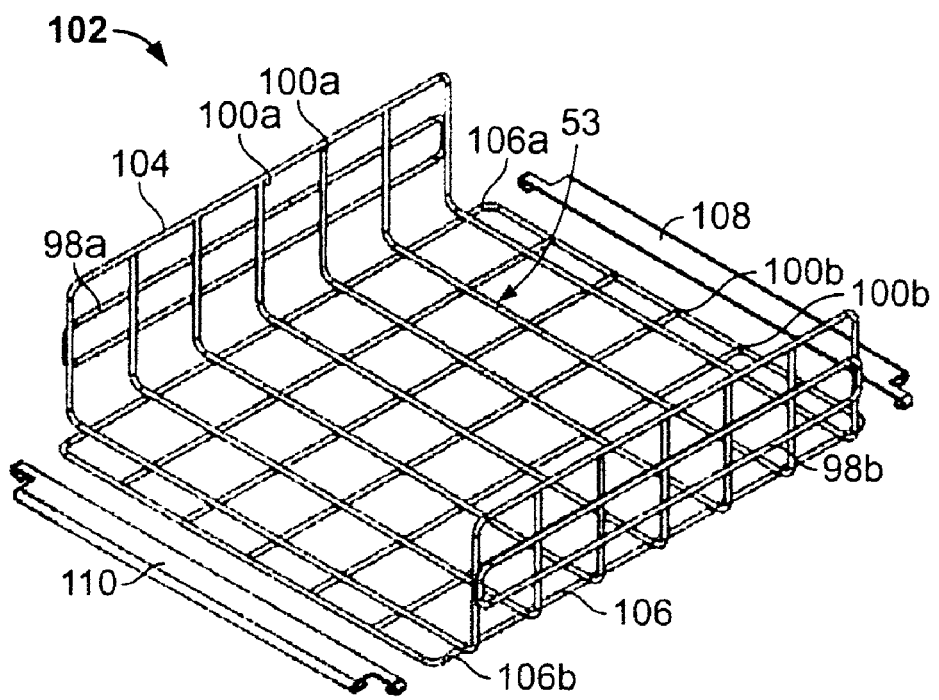
FIG. 10 is a partially exploded perspective view of a reinforced wire basket.
Figure 11:
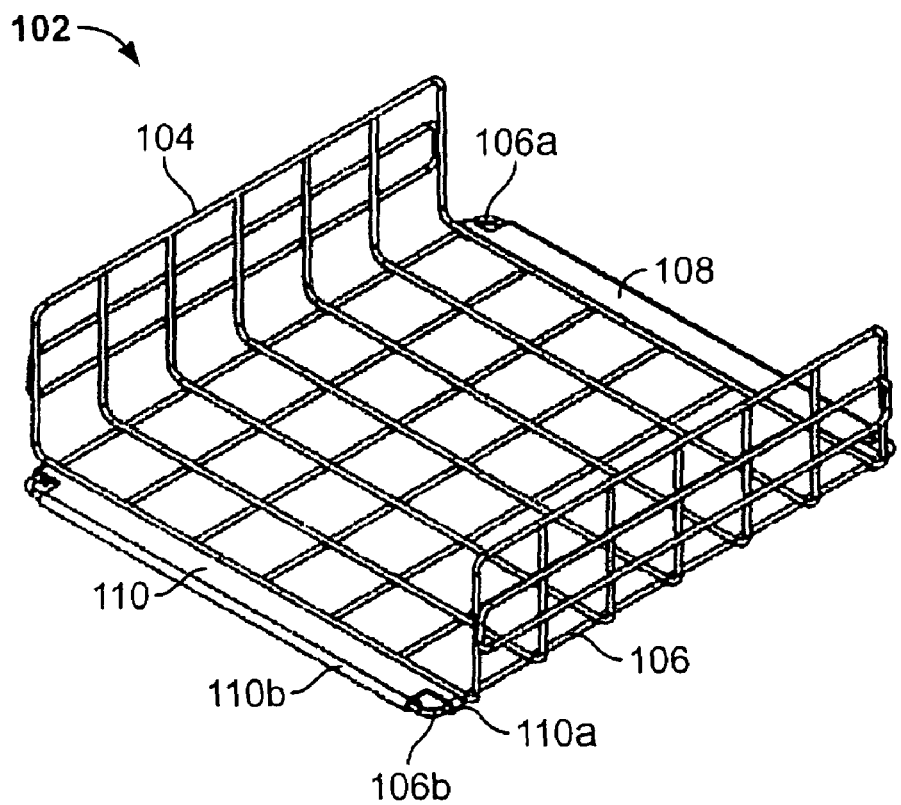
FIG. 11 is an upper perspective view of the reinforced wire basket of FIG. 10 shown assembled.

Referring to FIG. 10, there is shown an upper perspective view of another embodiment of a reinforced wire basket 102. Reinforced wire basket 102 includes an upper U-shaped frame assembly 104 and a lower planar frame assembly 106. The upper and lower frame assemblies 104, 106 are secured together by means of plural resistance weldments at their intersections. Disposed at opposed ends of the lower planar frame assembly 106 are first and second end reinforcing members 108 and 110, which are shown removed from the reinforced wire basket 102 in FIG. 10. FIG. 11 shows the first and second end reinforcing members 108, 110 attached to opposed ends of the reinforced wire basket's lower planar frame assembly 106a, b, as discussed in more detail below. First and second closed parallel wire frames 98a and 98b are attached to respective opposed ends of the upper U-shaped frame assembly 104 by means of weldments. Similarly, plural T-welds such as at locations 100a and 100b securely connect inner wires to the outer peripheral wires of upper and lower frame assemblies 104 and 106. The first and second end reinforcing members 108, 110 are preferably comprised of pre-galvanized steel; however, other metals such as stainless steel, cold-rolled steel, and the like can be employed.

Figure 12:
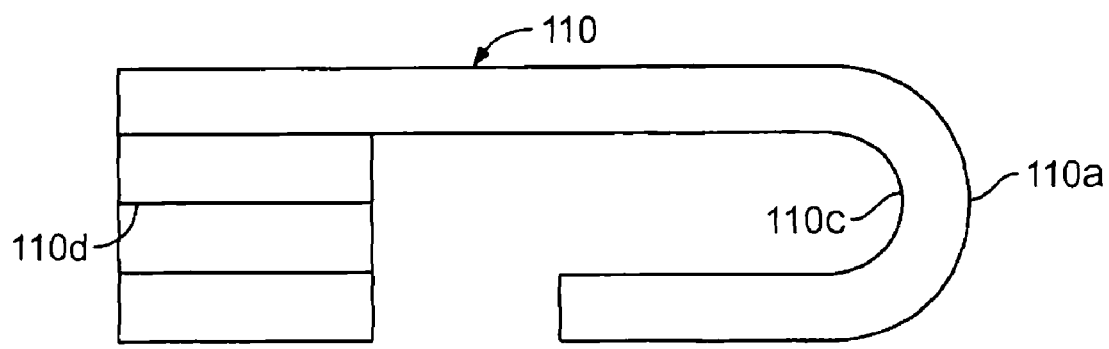
FIG. 12 is sectional view of an end portion of a reinforcing member incorporated in the wire basket shown in FIG. 11.

Referring also to FIG. 12, there is shown a sectional view of an end portion of the second end reinforcing member 110. The second end reinforcing member 110 includes opposed lateral curvilinear end portions 110a and an aft end curvilinear portion 110b extending substantially the entire length of the reinforcing member as shown in FIG. 11. The first curvilinear end portion 110a forms a first inner recessed portion 110c in the end of the second end reinforcing member 110. The second curvilinear aft portion 110b forms a second inner recessed portion 110d extending substantially the length of the second end reinforcing member 110. The first and second inner recessed portions 110c and 110d are adapted for receiving end portions of the lower planar frame assembly 106 in a tight fitting manner so that the first and second end reinforcing members 108 and 110 are securely maintained in position on reinforced wire basket 102.

Figure 13:
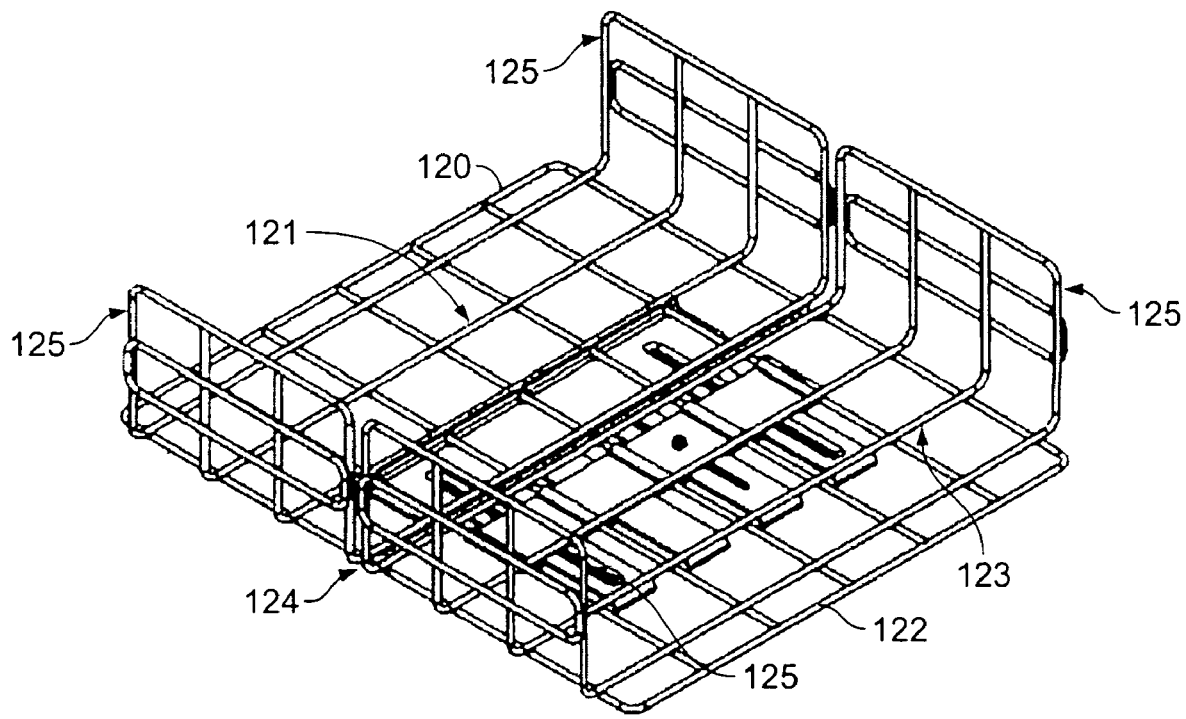
FIG. 13 is an upper perspective view of a pair of wire baskets connected together in a telescoping manner.
Figure 14:
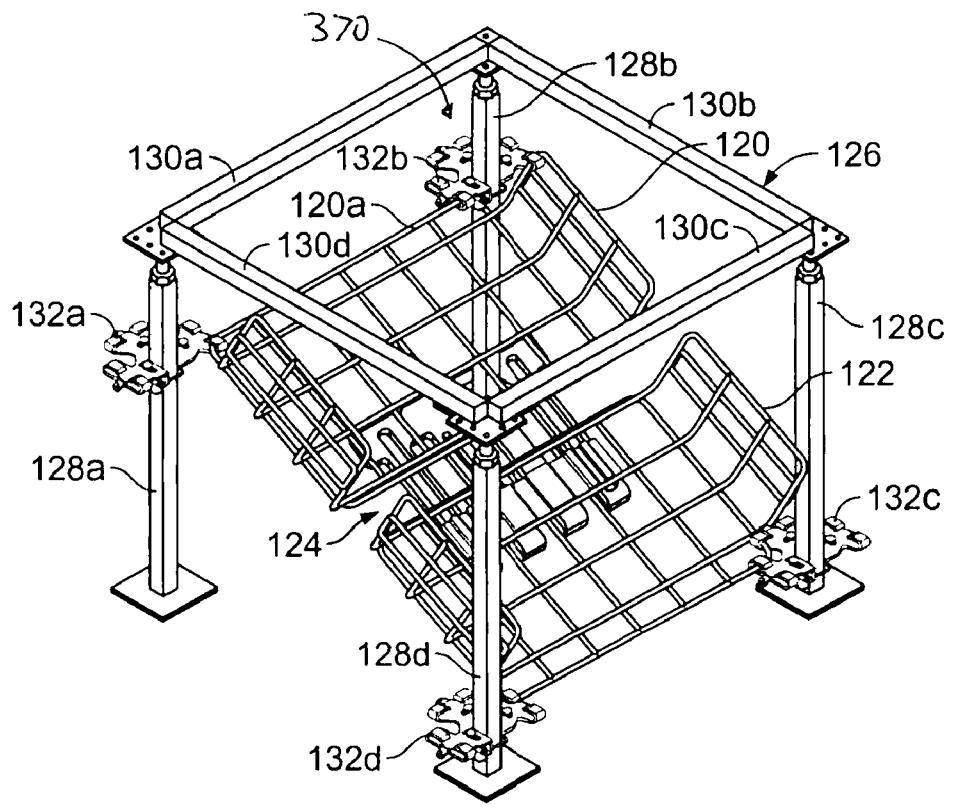
FIG. 14 is a perspective view of the telescopically coupled pair of wire baskets of FIG. 13 shown suspended from a support structure.
Figure 15:
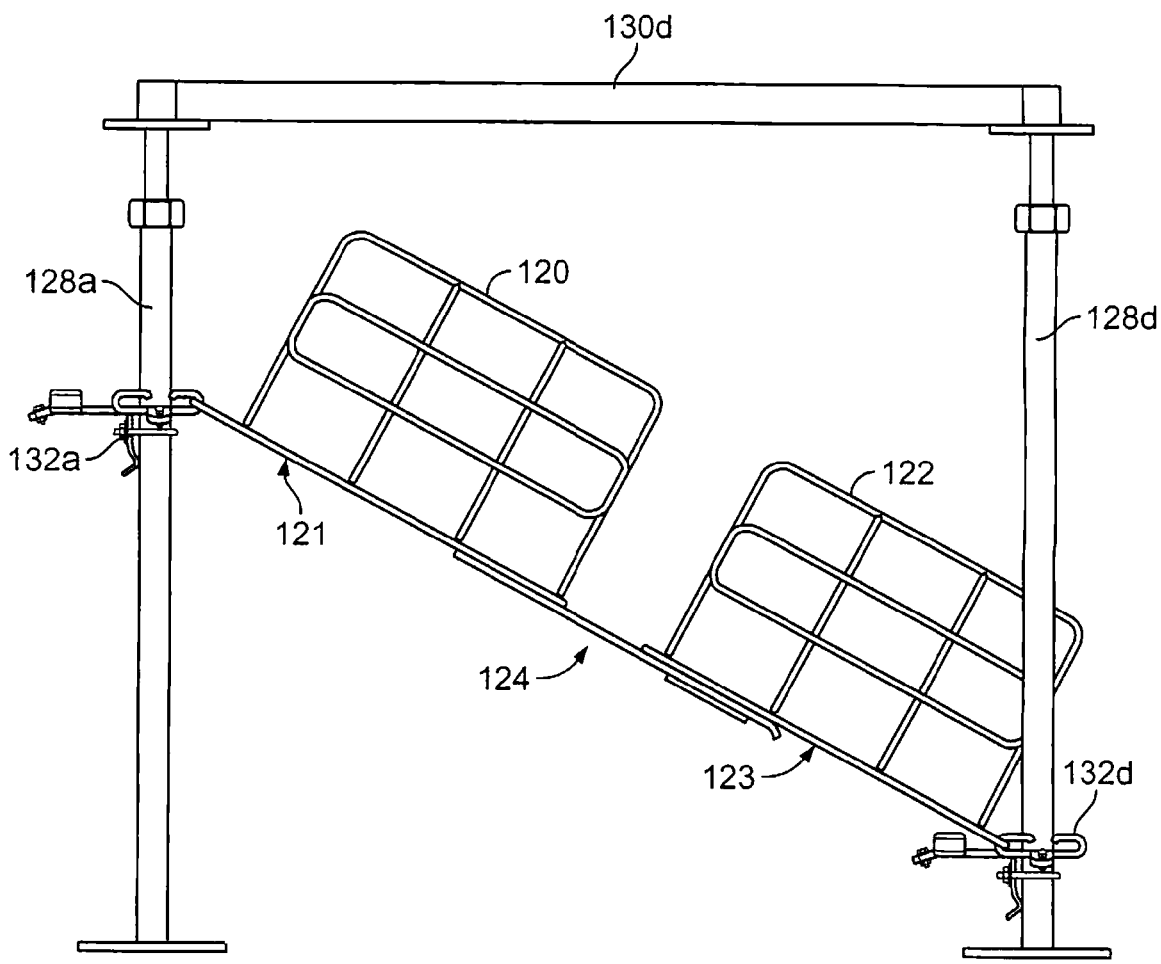
FIG. 15 is a side elevation view of the telescopically coupled pair of wire baskets shown in FIG. 14 extending over a large height change.
Figure 16:
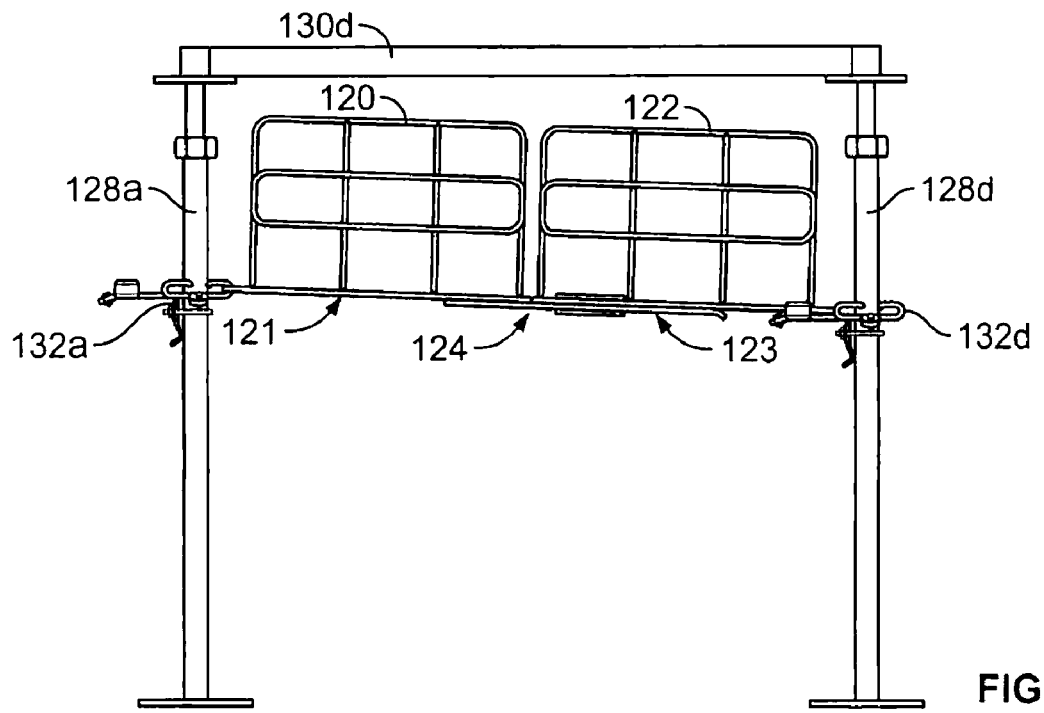
FIG. 16 is a side elevation view of the telescopically coupled pair of wire baskets shown in FIG. 14 extending over a small height change.

Referring to FIG. 13, there is shown first and second wire basket sections 120 and 122 coupled together by adjustable coupling assembly 124 in accordance with another embodiment. The telescoping wire basket arrangement shown in FIG. 13 is also illustrated in FIG. 14, where the first and second wire basket sections 120, 122 are shown connected to and maintained in position by utilization of a support structure 126. Support structure 126 includes first through fourth vertical support members 128a-128d and first through fourth horizontal support members 130a-130d. One end portion of the first wire basket 120 is coupled to the first and second vertical support members 128a and 128b by use of pedestal brackets 132a and 132b, respectively. Similarly, one end of the second wire basket 122 is connected to the third and fourth vertical support members 128c and 128d by use of pedestal brackets 132c and 132d, respectively. The adjustable coupling assembly 124 allows the first and second wire basket sections 120, 122 to be either moved together in closely spaced relation or to be moved apart in an extended configuration. The extended configuration is shown in the side elevation view of FIG. 15, while the retracted configuration is shown in the side elevation view of FIG. 16. By adjusting the spacing between the first and second wire basket sections 120, 122, the vertical height change between the two wire baskets, and plural cables disposed thereon, may be adjusted in a continuous manner over a wide range of height differences, as desired. For example, for a minimal height change such as 1", the first and second wire basket sections 120, 122 are arranged in closely spaced relation as shown in FIG. 16. To accommodate a height change of 12", the first and second wire basket sections 120, 122 are arranged in the fully extended configuration as shown in FIG. 15. A maximum height differential of 12" is possible with a horizontal spacing of 24" between adjacent vertical support members 128a and 128d. Each floor tile is typically a 24"×24" square.

Figure 17:
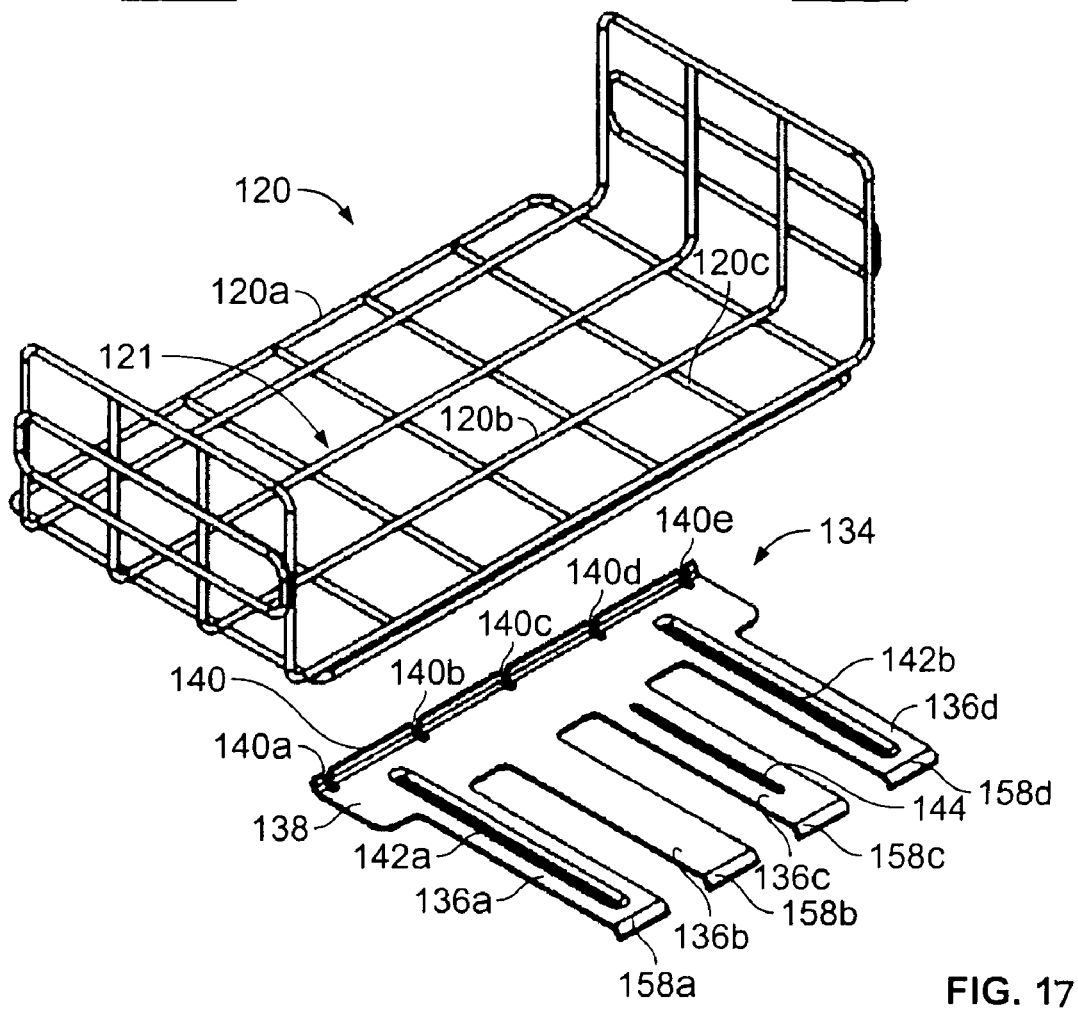
FIGS. 17 and 18 are upper perspective views of a first of the wire baskets shown in FIG. 13 illustrating a first telescoping member respectively detached from and attached to the wire basket.
Figure 18:
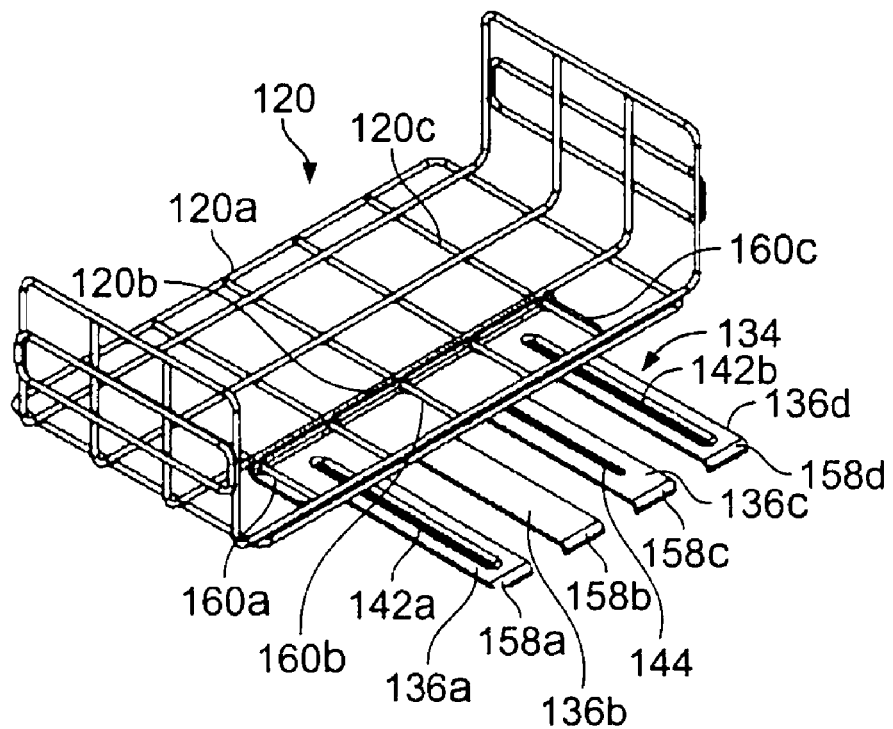

Referring to FIG. 17, there is shown a perspective view of the first wire basket 120 which includes an extended portion 120a extending substantially across its width. The first and second wire basket sections 120, 122 are identical in size and configuration. Each basket section 120, 122 is similarly constructed to wire basket 50, described above. Each section 120, 122 comprises a flat bottom portion 121 and 123 respectively, and opposing upraised end portions 125, wherein each section 120, 122 takes on a generally U-shaped overall frame configuration. Also shown in FIG. 17 is a first telescoping member 134 which is adapted for secure attachment to the first wire basket 120 as shown in FIG. 18. First telescoping member 134 is in the form of a single piece of high-strength metal and includes a body portion 138 and four elongated linear portions 136a-136d extending laterally from the body portion 138. The four elongated linear portions 136a-136d are arranged in a spaced manner along the length of the body portion 138. The two outer elongated linear portions 136a and 136d are each provided with a respective reinforcing rib 142a and 142b. The third elongated linear portion 136c is provided with an elongated, linear clearance slot 144. While not shown, a linear clearance slot could also be formed on elongated linear portion 136b. Disposed on the end of each of the four elongated, linear portions 136a-136d is a respective stop tab 158a-158d. Similarly, disposed on the outer edge of body portion 138 is an angled edge 140 having plural, spaced recesses 140a-140e disposed along its length. With the first telescoping member 134 positioned in contact with the first wire basket section 120 as shown in FIG. 18, the first telescoping member is securely connected to the first wire basket by means of plural resistance weldments 160a, 160b and 160c. With the first telescoping member 134 thus attached to the first wire basket section 120, the angled edge 140 of the first telescoping member engages wire 120b of the first wire basket. In addition, each of the spaced recesses 140a-140e in the angled edge 140 is adapted to receive a respective wire in a lower portion of the first wire basket 120. For example, wire 120c of the first wire basket section 120 is disposed within recess 140e in the first telescoping member's angled edge 140.

Figure 19:
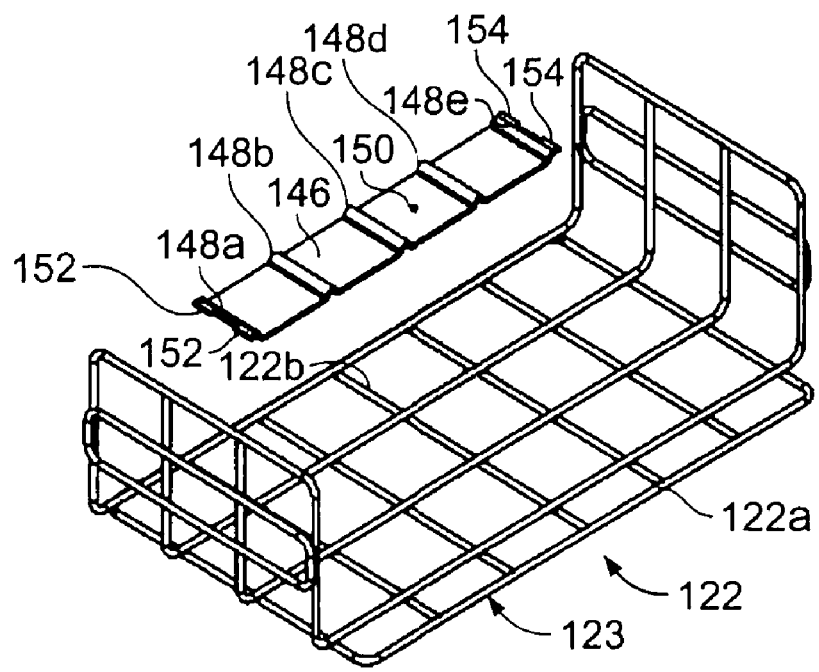
FIGS. 19 and 20 are upper perspective views of a second of the wire baskets shown in FIG. 13 illustrating a second telescoping member respectively detached from and attached to the wire basket.
Figure 20:
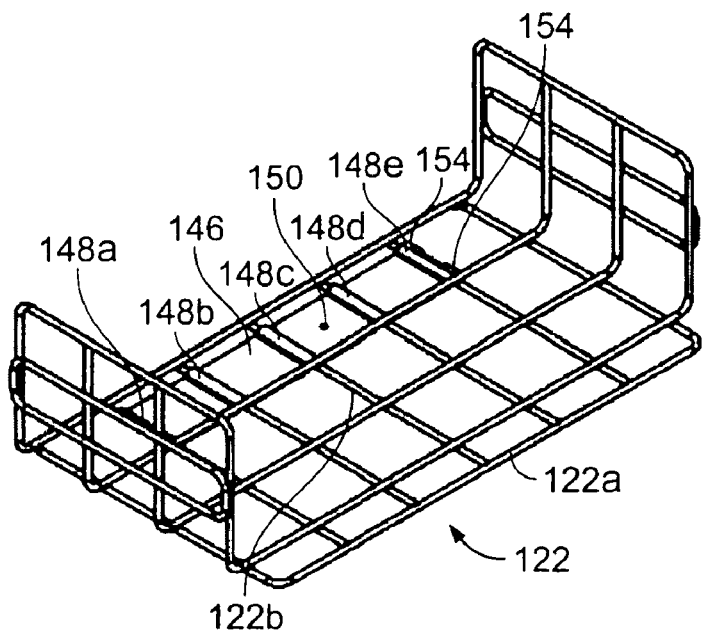

Referring to FIG. 19, there is shown an upper perspective view of the second wire basket section 122 including extension portion 122a and a second telescoping member 146. Second telescoping member 146 is shown positioned oil second wire basket section 122 in FIG. 20. Second telescoping member 146 includes plural spaced upraised portions 148a-148e along its length. Disposed on the first upraised portion 148a are a pair of spaced tabs 152. Similarly, disposed on the fifth upraised portion 148e of the second telescoping member 146 are a second pair of spaced tabs 154. With the second telescoping member 146 disposed on the second wire basket section 122, a lower surface of each of the upraised portions 148a-184e is adapted to receive a respective wire of the second wire basket. For example, the lower surface of the third upraised portion 148c is adapted to receive wire 122b of the second wire basket section 122. Second telescoping member 146 further includes an aperture 150. Second telescoping member 146 is securely attached to the second wire basket by means of plural resistance weldments disposed between respective wires of the second wire basket and spaced recesses on the lower surface of the second telescoping member.

Figure 21:
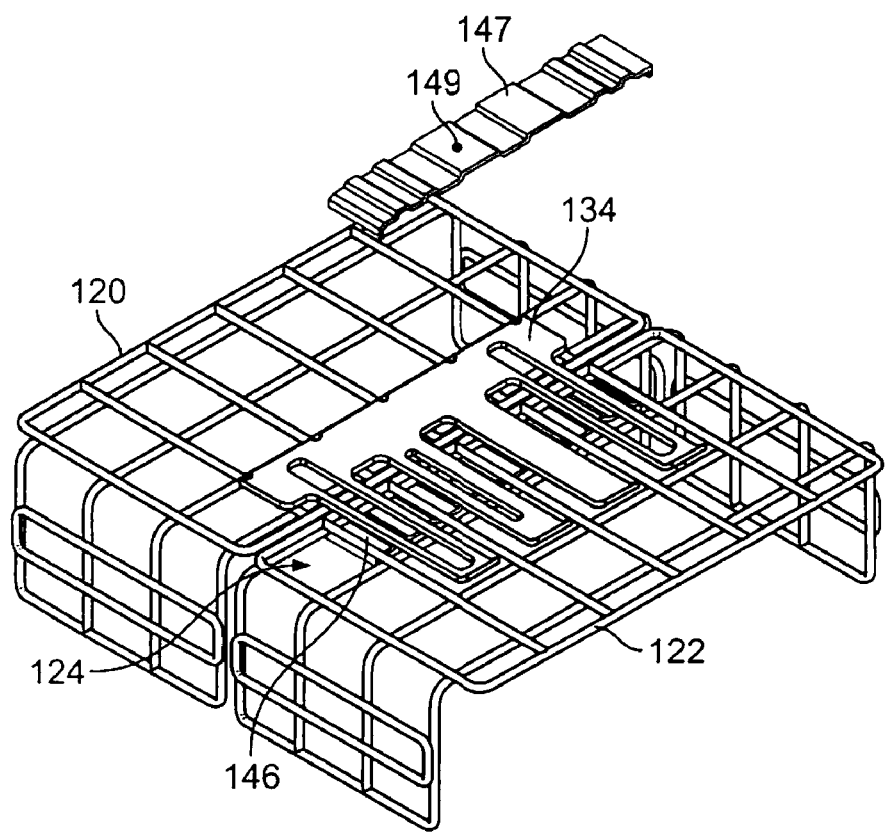
FIG. 21 is a lower perspective view of the telescopically coupled pair of wire baskets shown in FIG. 13 illustrating the second telescoping member prior to attachment to the telescoping arrangement.
Figure 22:
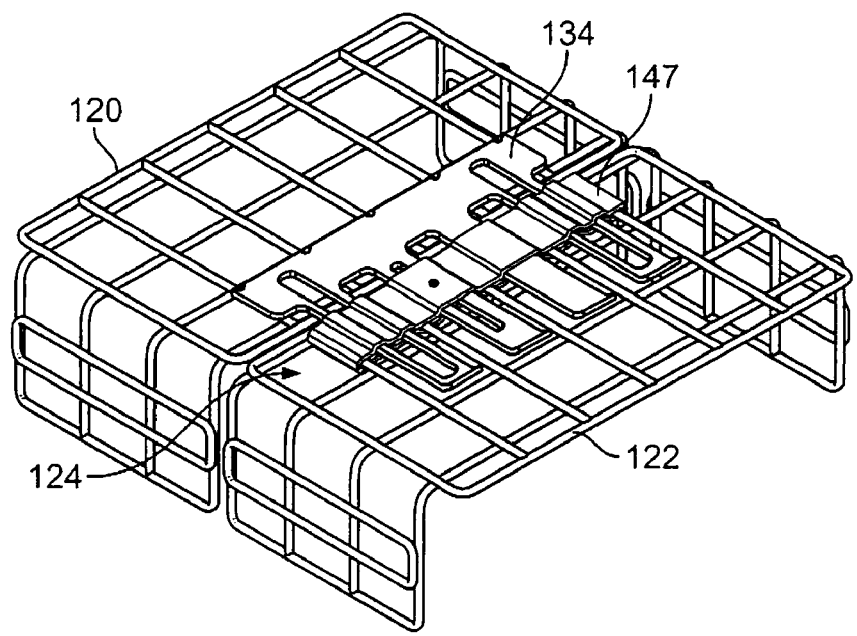
FIG. 22 is a lower perspective view of the telescopically coupled pair of wire baskets shown in FIG. 13.

With reference to FIG. 21, which is a lower perspective view of the first and second wire basket sections 120, 122, the combination is assembled by positioning the first telescoping member 134 which is attached to the first wire basket section 120 in an overlapping manner with respect to the second wire basket. The lour elongated linear portions 136a-136d of the first telescoping member 134 are each positioned in contact with the second telescoping member 146 between adjacent upraised portions of the second telescoping member. A third telescoping member 147 having an aperture 149 is then positioned over the elongated linear portions 136a-136d of the first telescoping member 134 as shown in FIG. 22. A threaded fastener is inserted through apertures 150 and 149 in the second and third telescoping members 146 and 147, respectively, as well as through the elongated, linear clearance slot 144 in the first telescoping member 134, which are in mutual alignment. It is in this manner that the first and second wire basket sections 120, 122 are securely maintained in sliding engagement with each other to provide a telescoping feature for the two wire baskets and provide an electrical bond between wire basket sections 120, 122.

Figure 23:
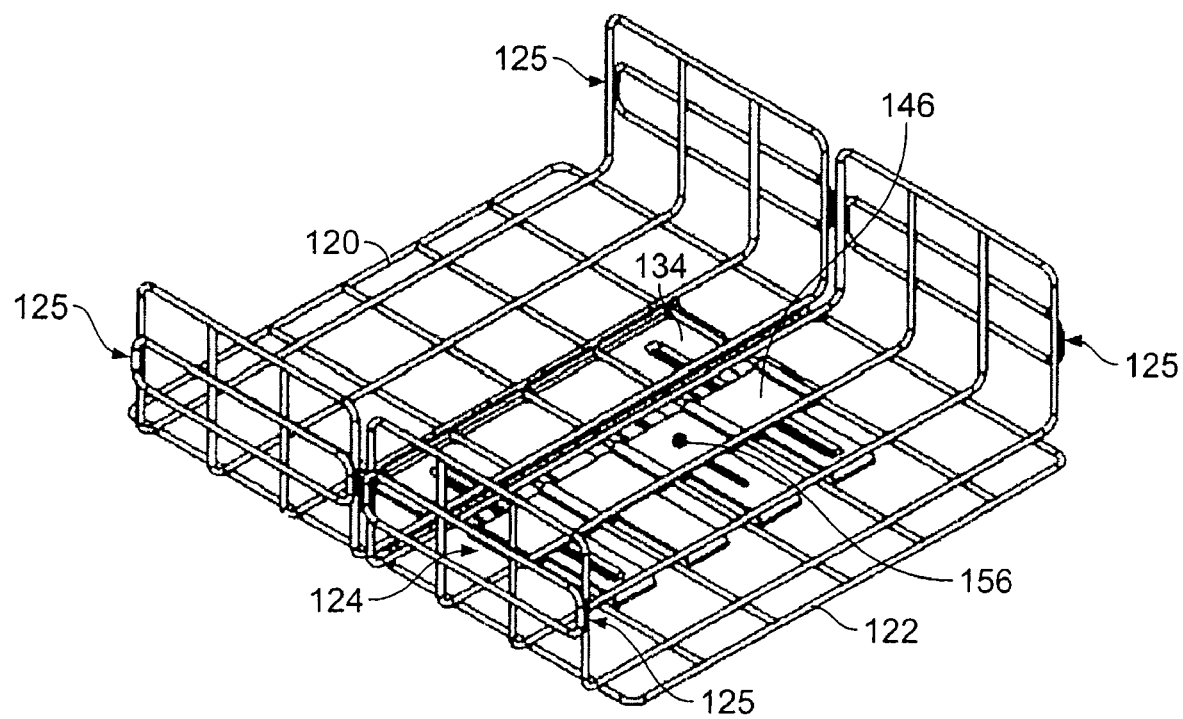
FIG. 23 is an upper perspective view of the pair of telescopically coupled wire baskets shown in FIG. 13 illustrating the two baskets in the non-extended configuration.
Figure 24:
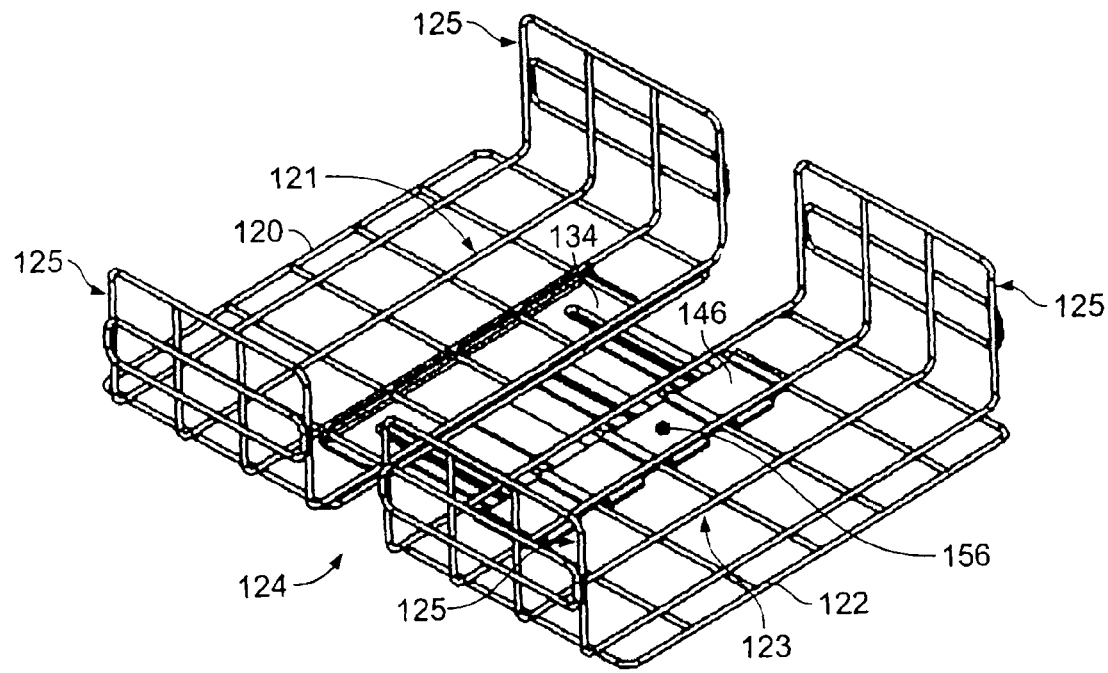
FIG. 24 is an upper perspective view of the pair of telescopically coupled wire baskets shown in FIG. 13 illustrating the two baskets in the fully extended configuration.

FIG. 23 is a perspective view showing the first and second wire basket sections 120, 122 in the retracted, closely spaced position, while FIG. 24 is a perspective view showing the two wire baskets in the fully extended position. The threaded fastener 156 disposed within the aligned apertures 150, 149 of the second and third telescoping members 146, 147 and within the elongated, linear clearance slot 144 of the first telescoping member 134, in combination with the plural stop tabs 158a-158d also disposed on the first telescoping member, prevent separation of the first and second wire basket sections 120, 122. Once the proper spacing between the first and second wire basket sections 120, 122 is achieved, depending upon the required change in height between the two wire baskets, the threaded fastener 156 is tightened to maintain the required wire basket spacing.

Figure 25:
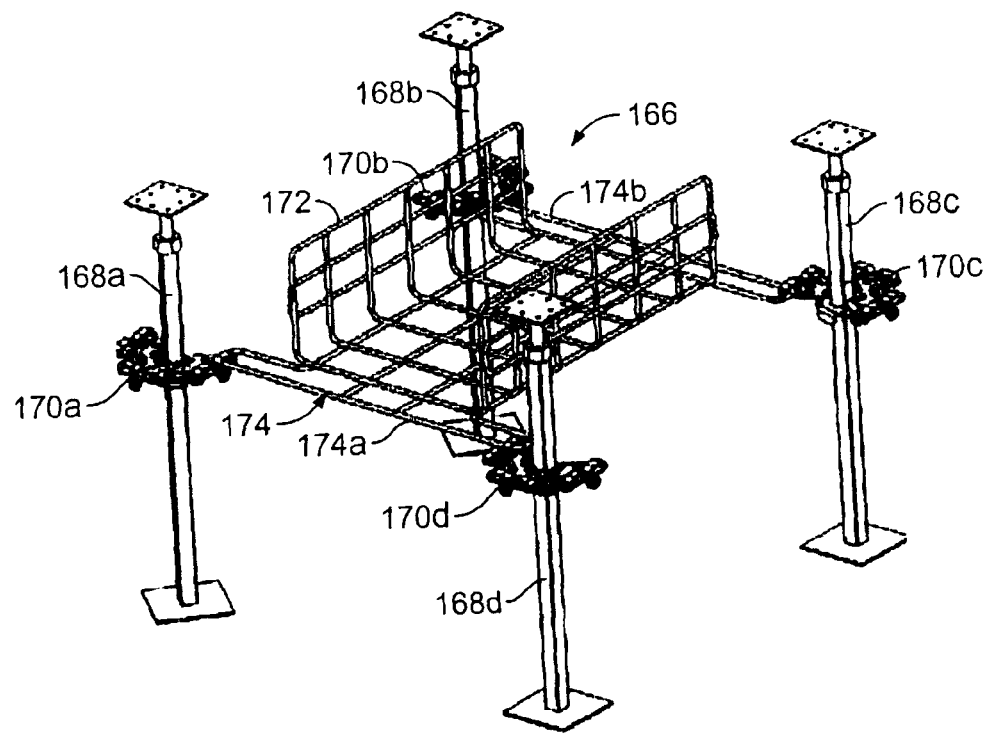
FIG. 25 is an upper perspective view of a centered wire basket attached to four vertical pedestal members, or support columns.

Referring to FIG. 25, there is shown an upper perspective view of a centered wire basket 166 without sharp edges and in accordance with another aspect of the present invention. Centered wire basket 166 is without sharp edges and is coupled to plural vertical pedestal members 168a-168d by means of plural pedestal brackets 170a-170d. Centered wire basket 166 includes a generally U-shaped upper frame member 172 connected to a lower frame member 174 by means of plural resistance weldments as previously described. Lower frame member 174 includes first and second extended end members 174a and 174b. The width of the wire basket's upper frame member 172 is less than the length of the extended end members 174a, 174b of the wire basket's lower frame member 174. The wire basket's upper frame member 172 is centered between the ends of its extended end members 174a, 174b and between the first and fourth pedestal members 168a, 168d and the second and third pedestal members 168b, 168c. The spaces between the sides of the wire basket's upper frame member 172 and the ends of the lower frame member's extended end members 174a and 174b provide access to the space below the centered wire basket 166 for maintenance or repair of system components located beneath the centered wire basket.

Figure 26:
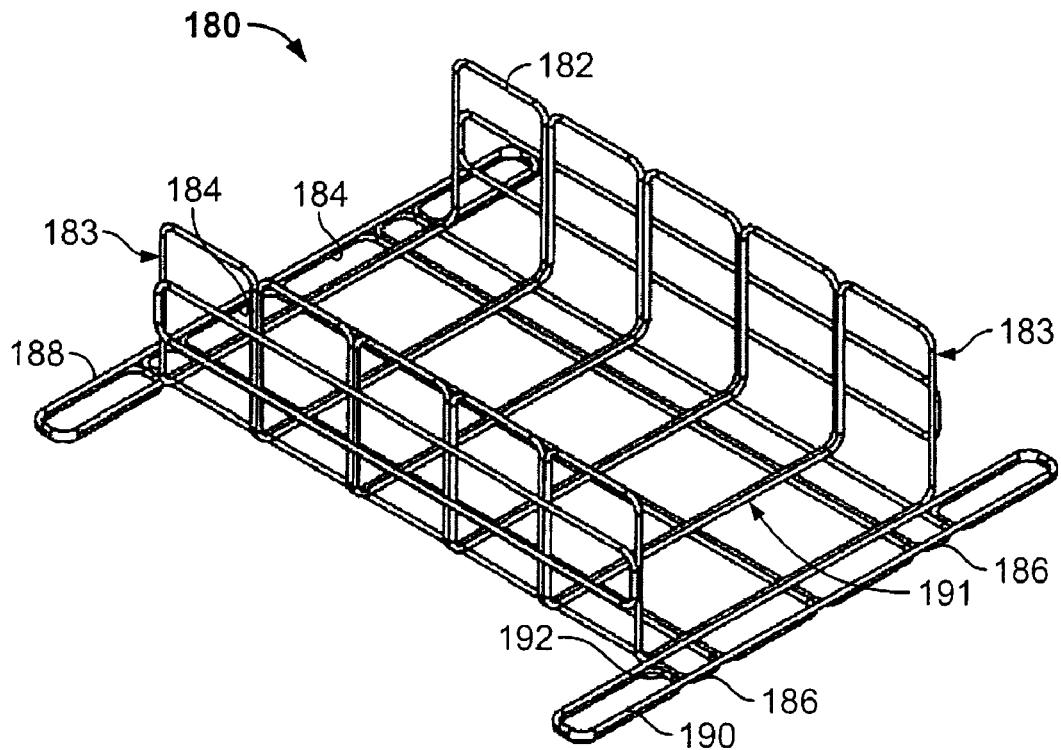
FIG. 26 is an upper perspective view of a reinforced centered wire basket.

Referring to FIG. 26, there is shown another embodiment of a centered wire basket 180. Centered wire basket 180 is also without any sharp edges and is similarly constructed as described above for wire basket 50 wherein plural U-shaped closed wire frames 182 with opposing upraised sections 183 are positioned in side-by-side relationship in mutual alignment and connected to a pair of inner flat closed wire frames 184 and a pair of outer flat closed wire frames 186. Plural wire frames 182 when connected form an overall U-shaped frame for wire basket 180. First and second end reinforcing members 188 and 190 are securely attached by use of resistance weldments (not shown for simplicity) to the end portions of the inner and outer flat closed wire frames 184 and 186. Extended end portions 188, 190 have distal ends that generally align with bottom 191 and extend away therefrom. A smaller flat closed wire frame 192 is disposed on opposed ends of each of the first and second end reinforcing members 188, 190 and is resistance welded to adjacent structural elements.

Figure 27:
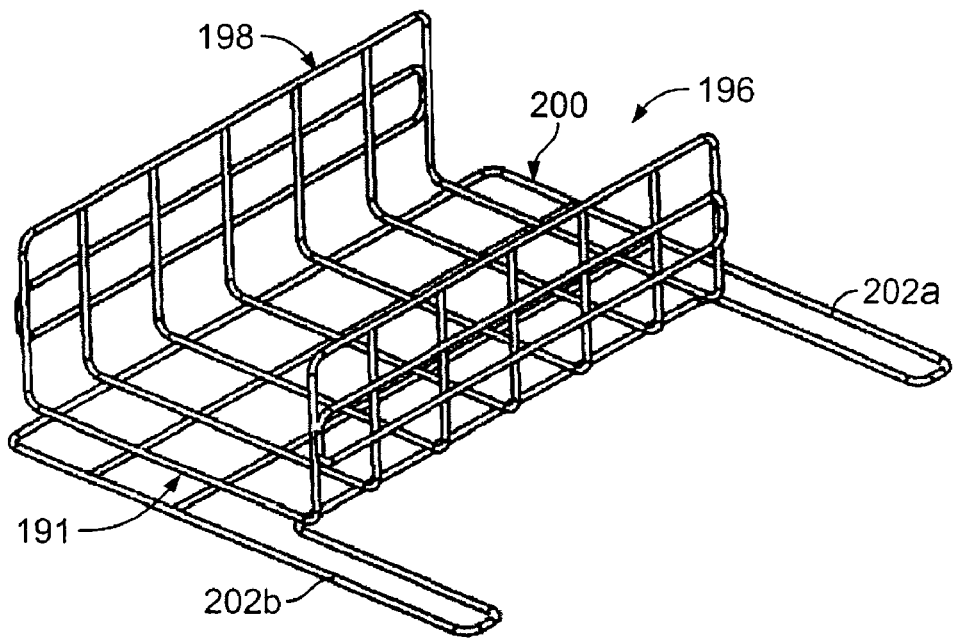
FIG. 27 is an upper perspective view of an off-center wire basket.
Figure 28:
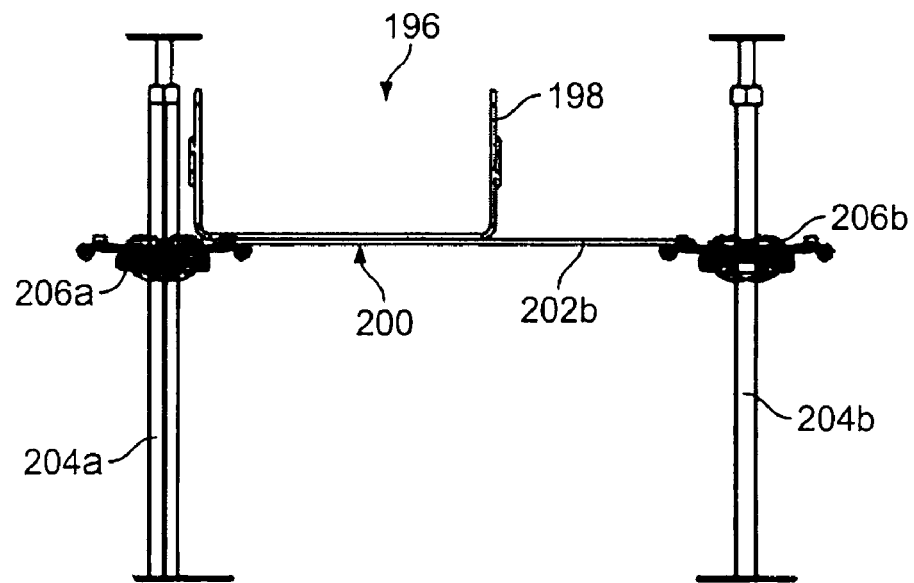
FIG. 28 is a front elevation view of the off-center wire basket of FIG. 27 shown attached to and supported by plural support members.

Referring to FIG. 27 there is shown an upper perspective view of an offset wire basket 196 in accordance with another embodiment of this aspect of the present invention. Offset wire basket 196 is shown in the front elevation view of FIG. 28 attached to first and second vertical supports 204a and 204b by means of first and second pedestal brackets 206a and 206b, respectively. Offset wire basket 196 includes a generally U-shaped upper frame 198 attached to a generally planar lower frame 200 by means of plural resistance weldments as previously described. Offset wire basket 196 also includes first and second extended end portions 202a and 202b. The offset wire basket's upper frame 198 is disposed on one end of each of the first and second extended end portions 202a, 202b to provide a space, or gap, between a lateral edge of the upper frame and the distal ends of the first and second extended end portions 202a, 202b. It is this space between a lateral portion of the offset wire basket's upper frame 198 and the distal ends of the lower frame's extended end portions, as shown for the case of extended end portion 202b in FIG. 28, which provides access for maintenance or repair of system components located below the offset wire basket 196.

Figure 29:
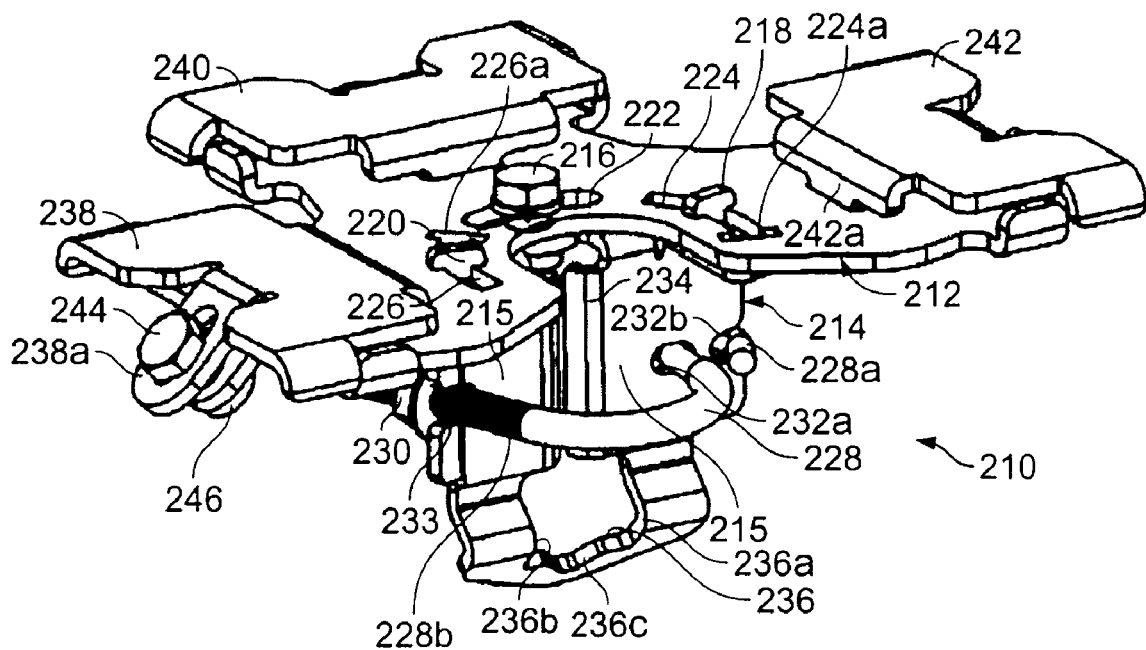
FIG. 29 is a perspective view of a pedestal bracket for attaching a wire basket to a support structure.
Figure 3O:
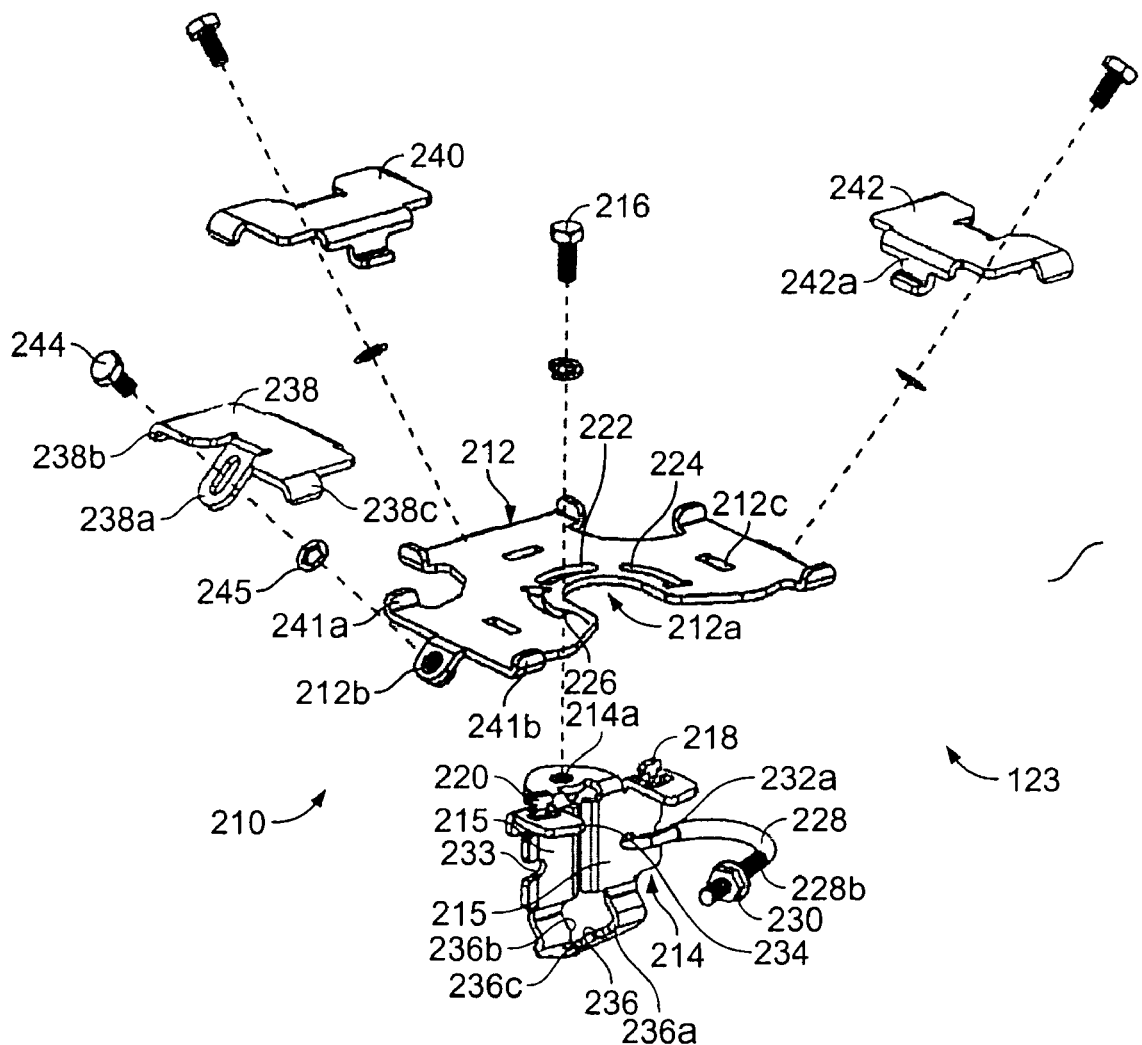
FIG. 3 is a right side view of the cable management system shown in FIG. 1.

Referring to FIG. 29, there is shown a perspective view of a pedestal bracket 210. An exploded perspective view of the inventive pedestal bracket 210 is shown in FIG. 30, while FIGS. 31-34 illustrate additional details of the inventive pedestal bracket.

Pedestal bracket 210 includes an upper support plate 212 and a lower support clamp assembly 214. Support plate 212 is securely attached to support clamp assembly 214 by use of a support plate locking screw 216 inserted through a first curvilinear elongated slot 222 in the support plate and into a threaded aperture 214a in an upper portion of the support clamp assembly 214. Support plate 212 and support clamp assembly 214 are further coupled together by means of first and second shoulder locking tabs 218 and 220. First shoulder locking tab 218 is inserted through a second curvilinear slot 224 through insert slot 224a in support plate 212, while second shoulder locking tab 220 is similarly inserted through a third curvilinear slot 226 within the support plate through insert slot 226a. An opening 212a is formed in support plate 212 for receiving a vertical support member. Attached to the upper surface of support plate 212 are three retainer clips 238, 240 and 242. Each retainer clip includes a respective inwardly directed angled tab, as shown for the case of the third retainer clip 242 having angled tab 242a. Angled tab 242a is adapted for insertion in slot 212c in support plate 212. Each retainer clip further includes an outwardly extending apertured tab, as shown for the first retainer clip 238 having apertured tab 238a. Each pair of angled and apertured tabs are disposed on opposed portions of a retainer clip and extended downwardly from the retainer clip. Each apertured tab 238a of a retainer clip is disposed in contact with an apertured mounting tab 212b attached to and extending from the support plate 212. A retainer clip screw 244 is inserted through the aligned apertures of the retainer clip's apertured tab 238a and an apertured mounting tab 212b attached to and extending from support plate 212. A connector 246 engages screw 244 for maintaining each retainer clip securely in position on the upper surface of the support plate 212. A screw retainer 245 is used to secure the screw 244 to the retainer clip 238 in an assembly. Each of the first, second and third retainer clips 238, 240 and 242 is adapted to engage and support at least one wire basket as described in detail below. In order to more securely maintain a wire basket on the pedestal clamp's support plate 212, each retainer clip is provided with first and second edge tabs 238b and 238c as shown for the first retainer clip 238 in FIG. 30. Disposed adjacent each retainer clip are upward extending tabs 241a and 241b on the pedestal clamp's support plate 212 as also shown in FIG. 30 for maintaining a wire basket in engagement with the pedestal bracket 210.

Attached to support clamp assembly 214 is a U-bolt clamp 228 in the form of a metal rod. U-bolt clamp 228 is adapted for securely connecting pedestal bracket 210 to a support member 248. U-bolt clamp 228 includes a first curvilinear end 228a and a second threaded end 228b. The first curvilinear end 228a of U-bolt clamp 228 is adapted for insertion through an aperture 232a as well as through a slot 232b within the support clamp assembly 214. The first curvilinear end 228a of U-bolt clamp 228 is capable of undergoing pivoting displacement about the portion of the support clamp 214 between its aperture 232a and slot 232b in the direction of arrow 252 in FIG. 31.

Figure 32:
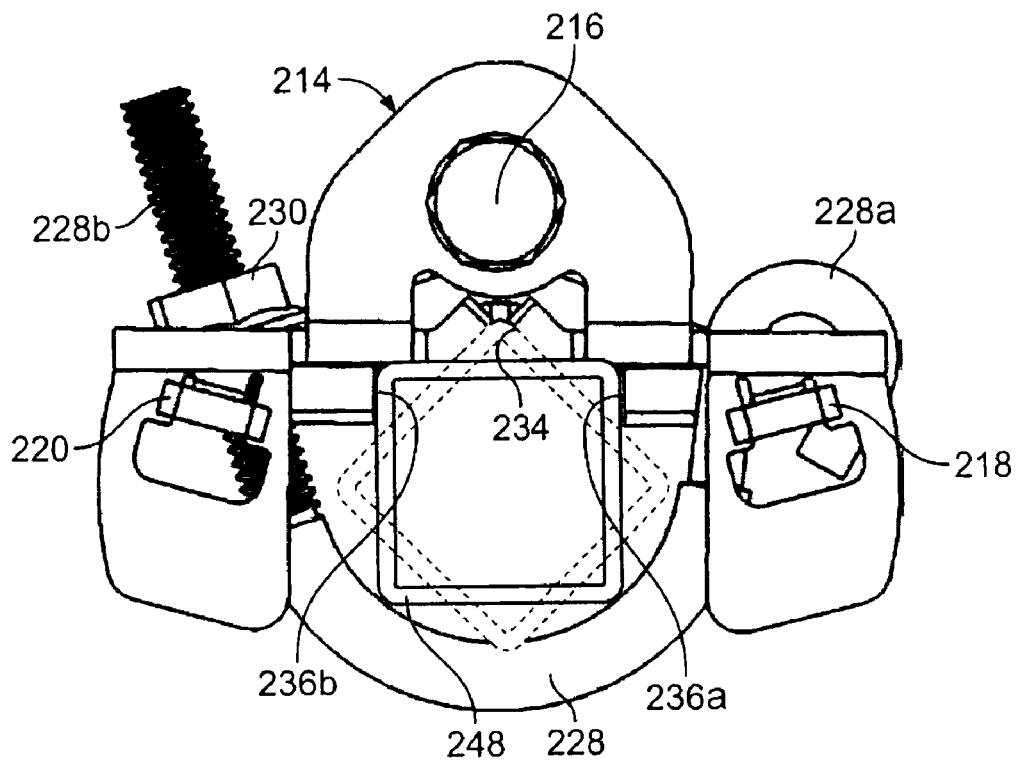
FIG. 32 is a top plan view of the support clamp portion of the pedestal bracket illustrating the U-bolt clamp in the closed, vertical support member engaging position.
Figure 33:
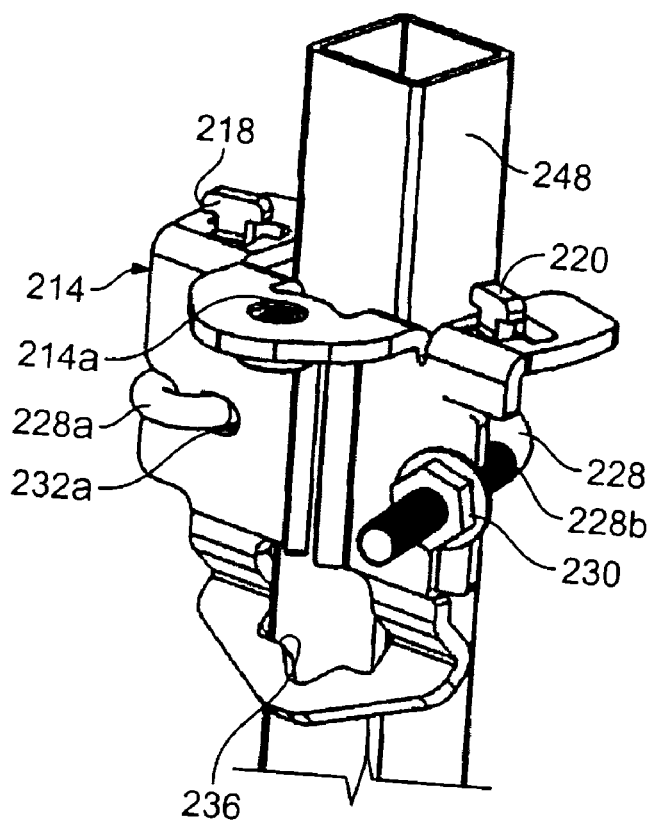
FIG. 33 is a perspective view of the support clamp portion of the pedestal bracket attached to a vertical support member.

The U-bolt clamp 228 may, thus, be moved to a position in contact with vertical support member 248 (also referred to as 32 in earlier figures), as shown in FIG. 32. In this position, the threaded end 228b of U-bolt clamp 228 is disposed within a notched portion 233 in an outer edge of the support clamp 214. Tightening of a nut 230 disposed on the threaded end 228b of the U-bolt clamp 228 secures pedestal bracket 210 in fixed position on vertical support member 248.

Figure 31:
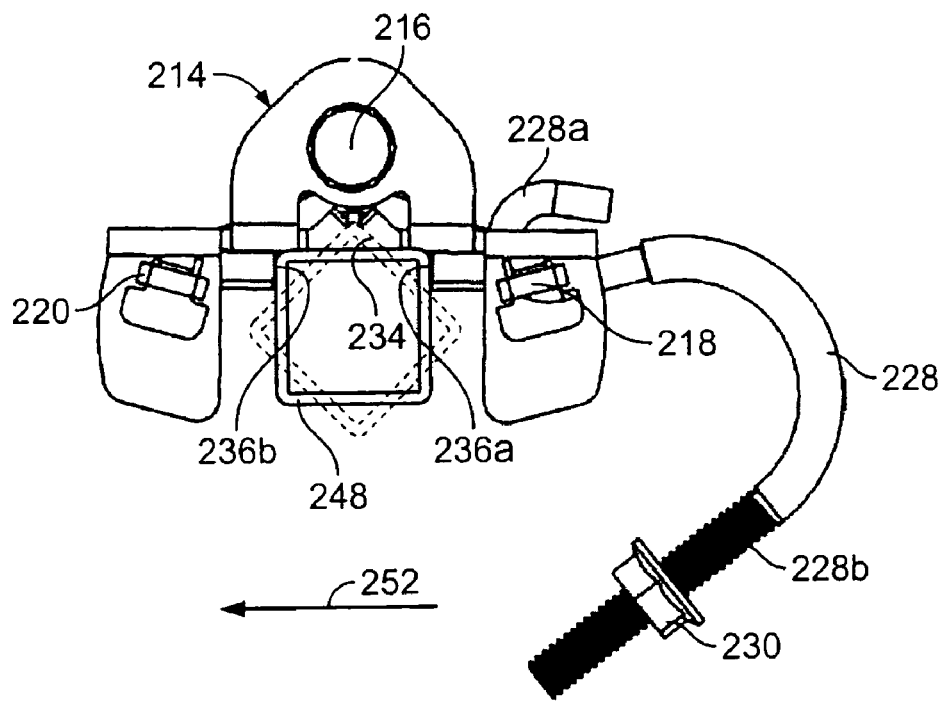
FIG. 31 is a top plan view of a support clamp portion of the pedestal bracket illustrating its U-bolt clamp in the open position.
Figure 34:
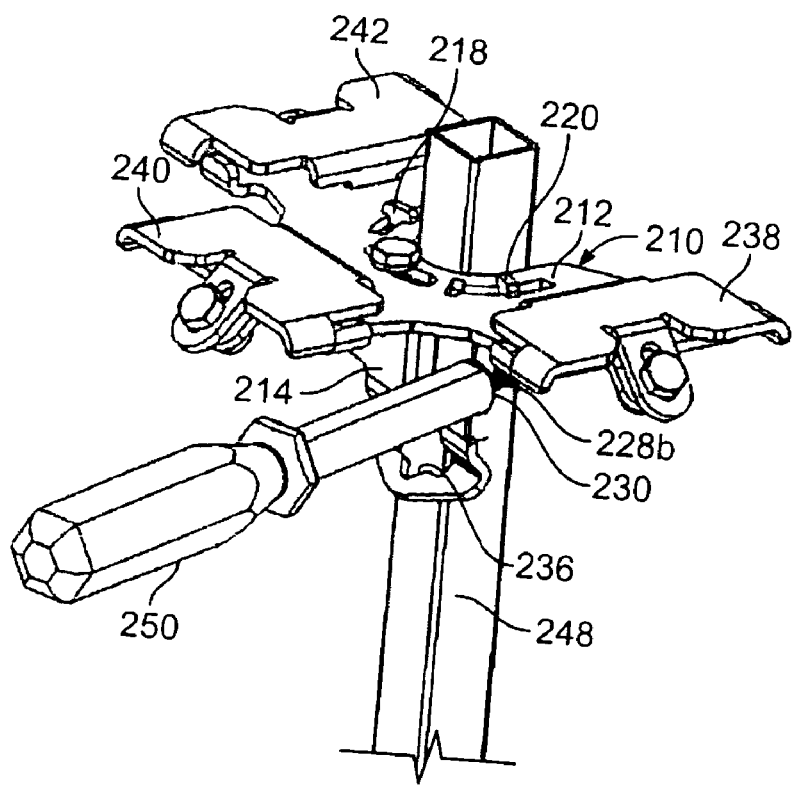
FIG. 34 is a perspective view of the pedestal bracket attached to a vertical support member illustrating the manner in which the pedestal bracket's U-bolt clamp is tightened.

The support clamp assembly 214 of pedestal bracket 210 further includes a V-shaped recess 234 formed from wall 215 and adapted to engage an outer corner of a generally square, or rectangular, vertical support member 248 as shown in FIGS. 31 and 32, as well as a circular or round vertical support member, not shown. The V-shaped recess 234 and U-bolt clamp 228 maintain the support clamp 214 in secure position on vertical support 248. Support clamp assembly 214 further includes a pair of spaced, facing flat surfaces 236a and 236b for engaging opposed outer surfaces of vertical support member 248 as also shown in FIGS. 31 and 32. First and second facing flat surfaces 236a, 236b of support clamp assembly 214 in combination with U-bolt clamp 228 maintain the pedestal bracket 210 securely in fixed position on vertical support member 248. The lower end of the V-shaped recess 234 and the spaced, facing flat surfaces 236a and 236b form a portion of an aperture 236 in a lower portion of support clamp assembly 214. As shown in the various figures, the portion of the support clamp assembly 214 adjacent the lower aperture 236 therein is angled inwardly to increase the strength of this portion of the support clamp to provide increased resistance to rotation of the pedestal bracket 210 on vertical support member 248. As shown in FIG. 34, U-bolt clamp 228 of the support clamp assembly 214 is securely attached to the vertical support member 248 by tightening nut 230 around the threaded end portion 228b of the U-bolt clamp by means of a conventional tool such as a nut driver 250.

Figure 35:
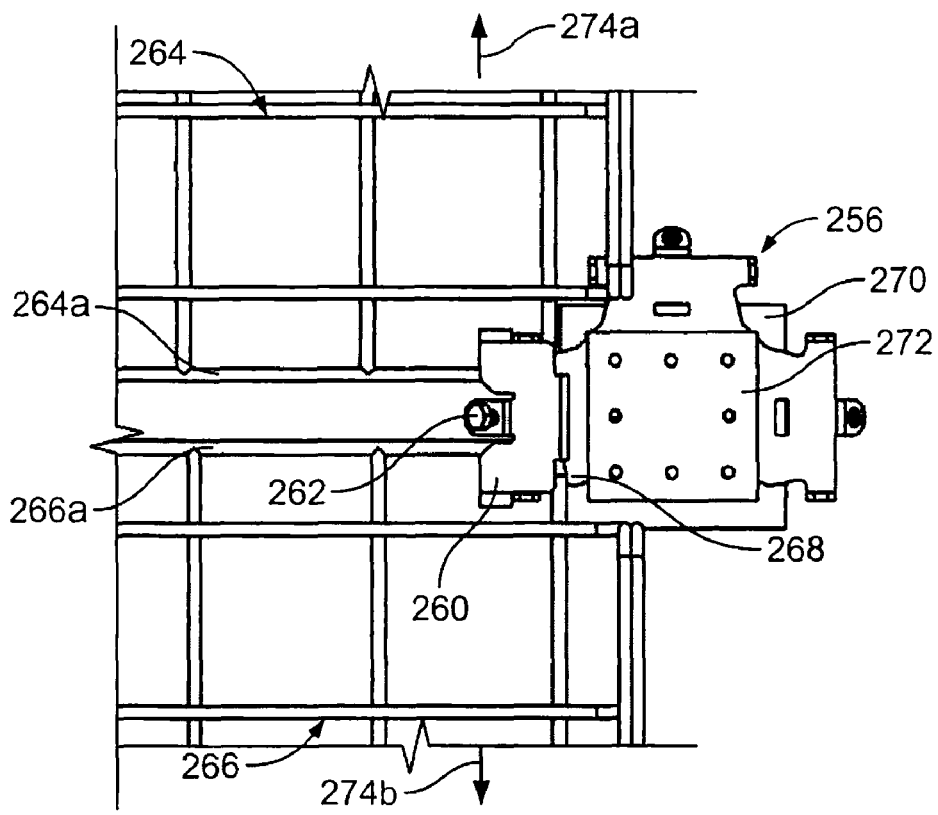
FIG. 35 is a top plan view of a pedestal bracket attached to and supporting a pair of wire baskets.

Referring to FIG. 35, there is shown the manner in which a pedestal bracket 256 engages and provides support for a pair of wire baskets 264 and 266. Adjacent corner portions of the wire baskets 264 and 266 are positioned on the upper surface of the pedestal bracket's support plate 268. Retainer clip 260 is positioned over adjacent edges of the first and second wire baskets 264, 266 and a screw 262 is inserted through the aligned apertures within retainer clip and the pedestal bracket's support plate 268 and is tightened. Adjacent wires 264a and 266a of the first and second wire baskets 264, 266, respectively, are securely and fixedly maintained in position between the pedestal bracket's support plate 268 and retainer clip 260. Each retainer clip 260 is adapted for securely attaching either a single wire basket or a pair of wire baskets to pedestal bracket 256. Also shown in FIG. 35 is the lower plate 270 and an upper plate 272 of the vertical support member (not shown for simplicity) to which pedestal bracket 256 is attached.

As shown in FIG. 35, the positions of wires 264a and 266a, which are attached to pedestal bracket 256 by means of its retainer clip 260, may be variably positioned between the pedestal bracket's support plate 268 and its retainer clip in both the longitudinal and lateral directions. For example, wire 264a is disposed closer to the outer edge of retainer clip 260, while wire 266a is positioned closer to the center of retainer clip 260, and is almost in contact with the tab of the retainer clip through which the retainer clip screw 262 is inserted. By adjusting the positioning of wires 264a and 266a in the direction of arrow 274a or in the direction of arrow 274b, the spacing between the first and second wire baskets 264 and 266 may be adjusted longitudinally, as desired. The capability to adjust the spacing between adjacent wire baskets allows these pedestal brackets of the present invention to be used with the United States standard grid system of a 24 inch by 24 inch for the spacings of vertical supports 248 as well as the 600 mm by 600 mm grid spacing of the vertical supports for the Europe standard.

Figure 36:
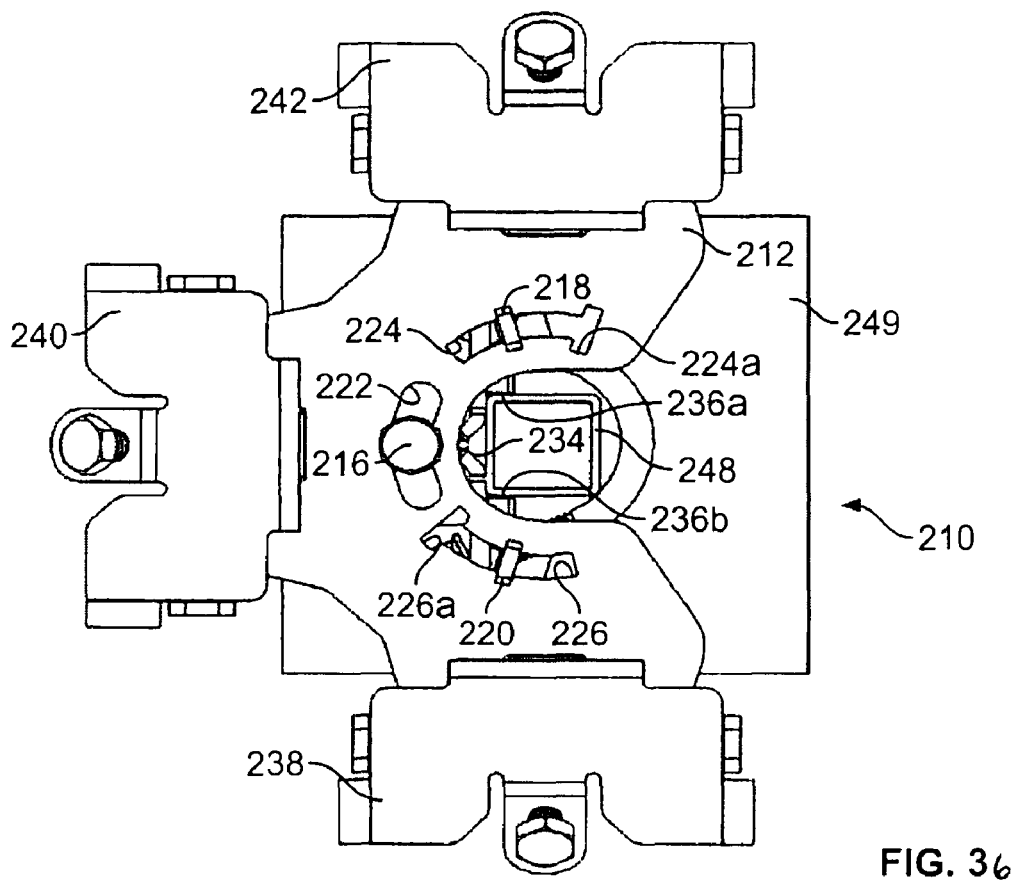
Figure 45:
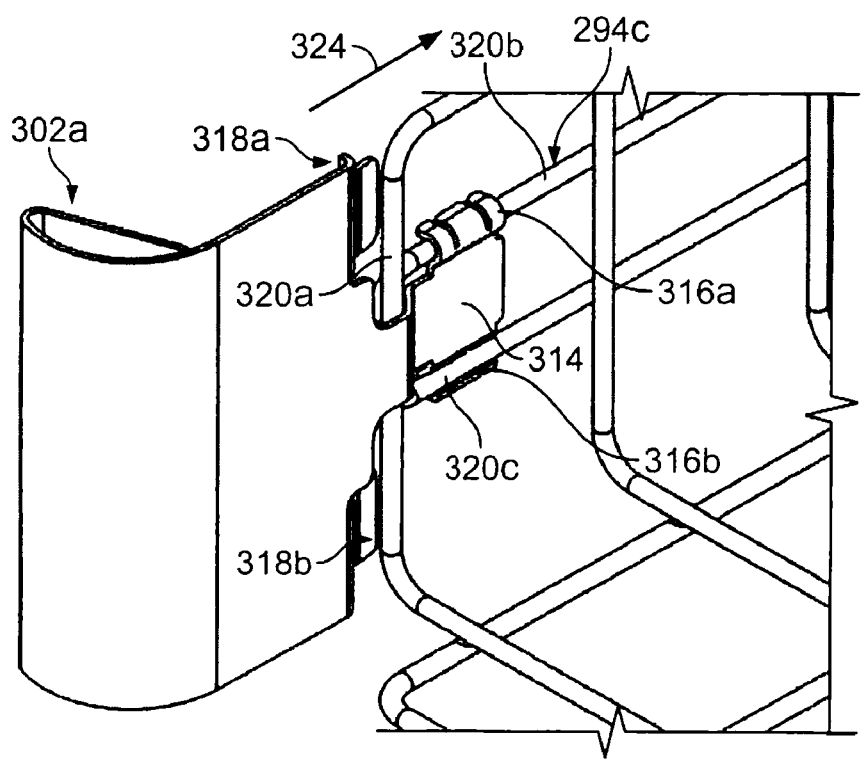

Referring to FIGS. 36-38, the manner in which the pedestal bracket 210 may be positioned at any angular orientation on a generally square vertical support member 248 will now be described. As shown in FIG. 36, pedestal bracket 210 engages a pair of opposed lateral sides of vertical support member 248 between its opposed facing flat surfaces 236a and 236b. The orientation of pedestal bracket 210 relative to vertical support member 248 may be changed by rotating pedestal bracket 45° and inserting an outer corner of the vertical support member in the pedestal bracket's V-shaped, recess 234 as previously described and as shown in FIG. 37. Pedestal bracket 210 may be oriented at any angle between 0°, as shown in FIG. 36, and 45°, as shown in FIG. 37. In FIG. 38, the pedestal bracket 210 is also shown engaging opposed outer walls of vertical support member 248 between its first and second facing flat surfaces 236a and 236b. However, in FIG. 38, support plate locking screw 216 has been loosened, allowing support plate 212 to rotate relative to support clamp 214 in the direction of arrow 254. Changing the orientation of pedestal bracket 210 relative to the vertical support member 248 causes the support plate locking screw 216 to be positioned at the lower end of first curvilinear slot 222 in support plate 212 as shown in FIG. 38. Similarly, the first and second shoulder locking tabs 218 and 220 have moved within the second and third curvilinear slots 224 and 226, respectively. Rotational displacement of the pedestal bracket 210 relative to the vertical support member 248 in the opposite direction would position the support plate locking screw 210 in an upper portion of the first curvilinear slot 222. Similarly, the first and second shoulder locking tabs 218, 220 would be moved to respective opposed ends of the second and third curvilinear slots 224 and 226 from that shown in FIG. 38. Once the support plate 212 is in the desired orientation relative to the vertical support member 248, the support plate locking screw 216 is tightened for securely and fixedly connecting the support plate 212 to the support clamp 214, with the pedestal bracket 210 similarly in fixed orientation relative to the vertical support member. Support plate 212 and support clamp 214 remain connected during relative rotational displacement between these two components by means of support plate locking screw 216 and shoulder locking tabs 218, 220. Support plate 212 is capable of undergoing up to 22½° rotational displacement relative to support clamp 214. Thus, any angular orientation between pedestal bracket 210 and vertical support member 248 may be achieved. For example, by attaching pedestal clamp 210 to the vertical support member 248, as shown in FIG. 36, with opposed sides of the vertical support member engaged by the pedestal clamp, the angle between the pedestal clamp and vertical support member may be changed by up to 22½° by rotating the pedestal bracket's plate 212 relative to its support clamp 214 in a first direction. Any angle between 22½° and 45° between the pedestal clamp 210 and vertical support member 248 may be achieved by positioning the pedestal bracket in engagement with two adjacent surfaces, or with a corner, of the vertical support member 248 and rotating the support clamp 212 relative to the vertical support member in a second, opposed direction.

Figure 39:
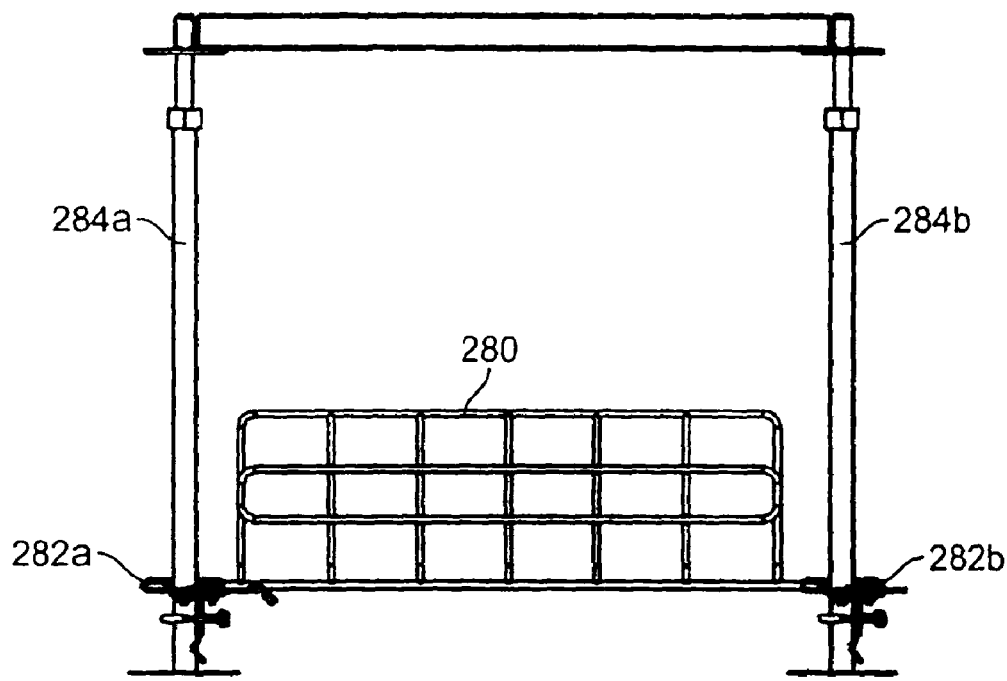
FIGS. 39-40 are side elevation views of a wire basket attached to a pair of vertical supports by means of a pair of pedestal brackets, wherein the vertical position of the wire baskets may be varied in a continuous manner over a vertical height range.
Figure 40:
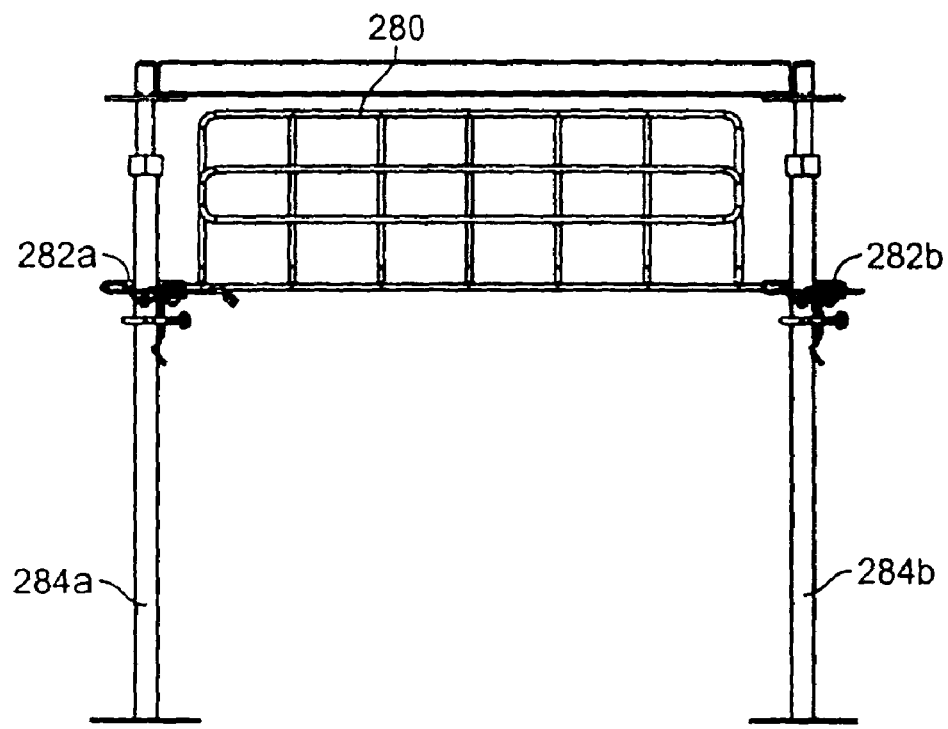

The pedestal clamp 210 has a further benefit in that it is capable of universal height adjustment of a wire basket to which it is connected. U-bolt clamp 228 can be releasably secured to vertical support member 248 at any desired position along the length of vertical support member 248. For example, as shown in FIG. 39, wire basket 280 is connected to lower end portions of first and second vertical support members 284a and 284b by first and second pedestal brackets 282a and 282b, respectively. FIG. 40 shows the vertical wire basket 280 connected to upper portions of the first and second vertical support members 284a and 284b by the first and second pedestal brackets 282a and 282b, respectively. Thus, the pedestal brackets of the present invention are capable of securely and fixedly positioning a wire basket at any height along the length of the vertical support members of the wire basket support system.

Figure 41:
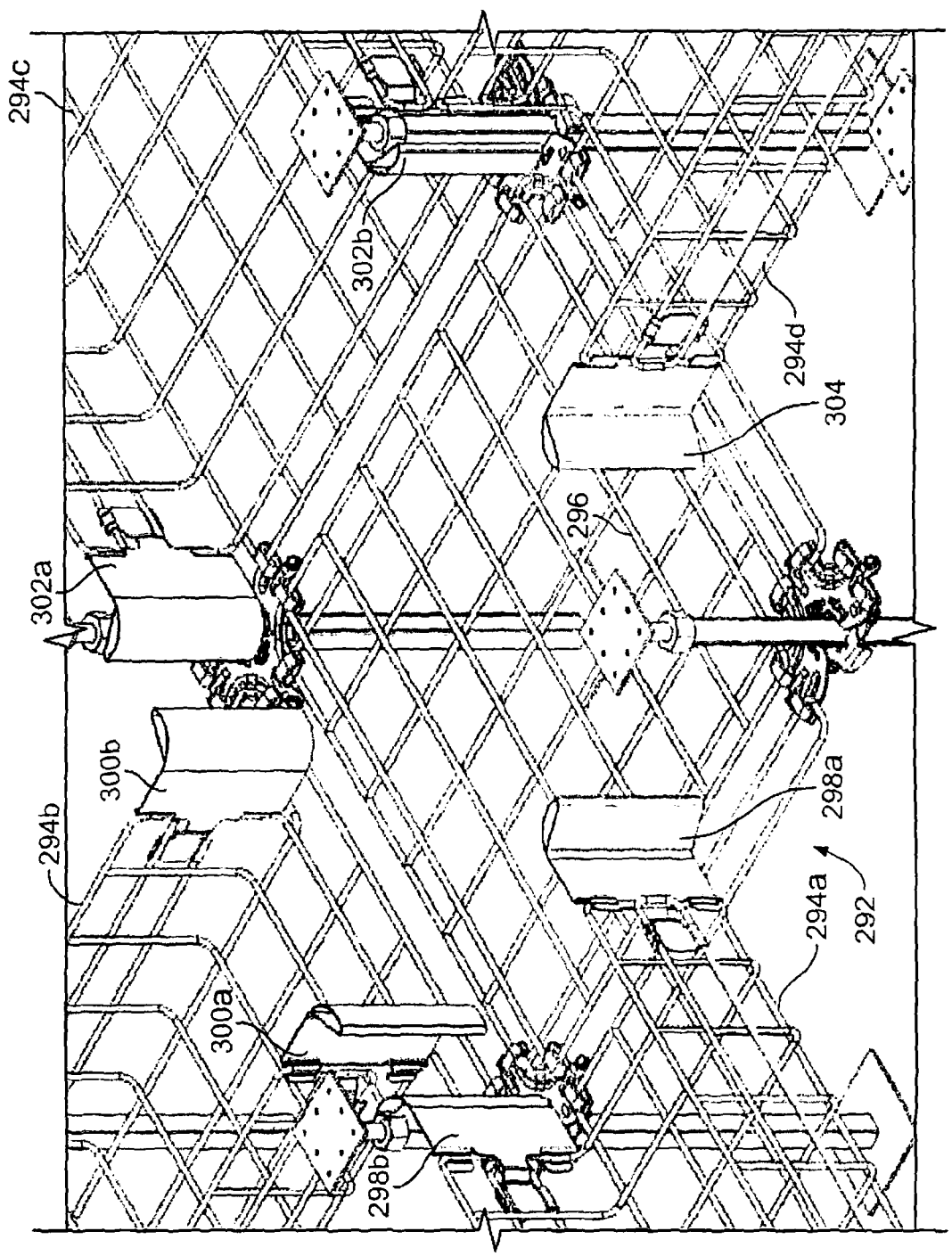
FIG. 41 is a perspective view of a portion of a wire basket pathway system incorporating plural cable bend guides.

Referring to FIG. 41, there is shown an upper perspective view of a wire basket pathway system 292. Wire basket pathway system 292 includes plural wile baskets 294a-294d connected together by use of a wire basket intersection 296. Plural cable bend guides are attached to the ends of the various wire baskets shown in FIG. 41 to accommodate a 90° turn in the cable runs. Thus, the first wire basket 294a has attached to its end adjacent to the wire basket intersection 296 first and second cable bend guides 298a and 298b. The second wire basket 294b has third and fourth cable bend guides 300a and 300b attached to its end which is adjacent to the wire basket intersection 296. The third wire basket 294c similarly has a pair of cable bend guides 302a and 302b connected to its end adjacent to the wire basket intersection 296. Finally, the fourth wire basket 294d has a cable bend guide 304 attached to its end adjacent to the wire basket intersection 296. The cable bend guides provide a smooth bend radius for the cables undergoing a 90° turn in passing from one wire basket to another, adjacent wire basket.

Figure 42:
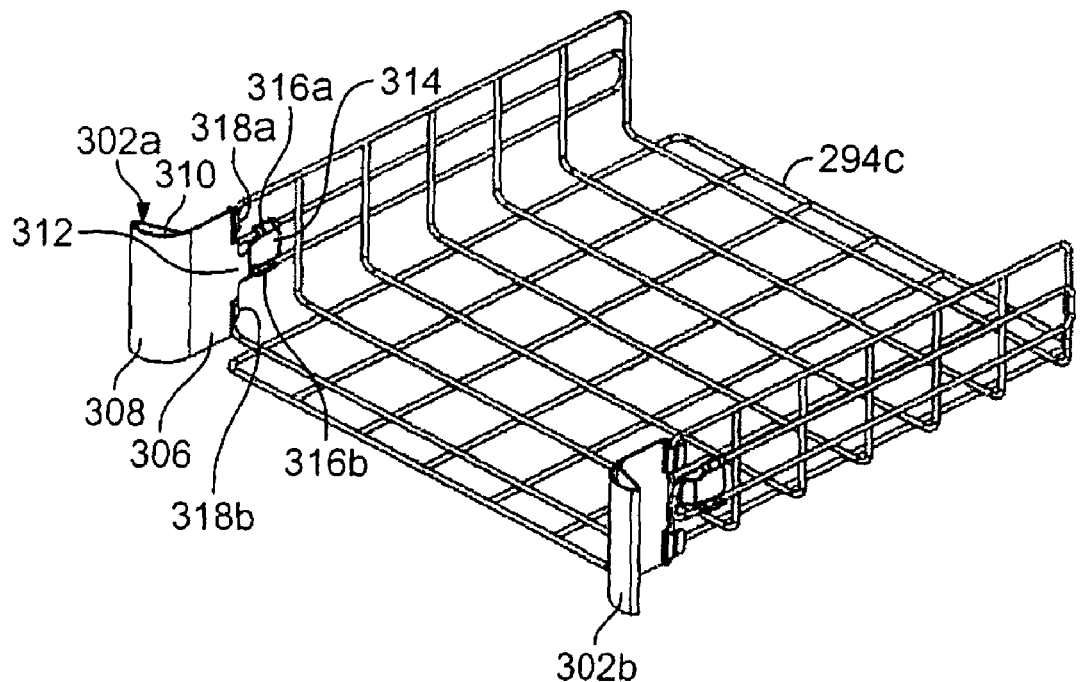
FIG. 42 is an upper perspective view of a wire basket to which are attached a pair of inventive cable bend guides.
Figure 43:
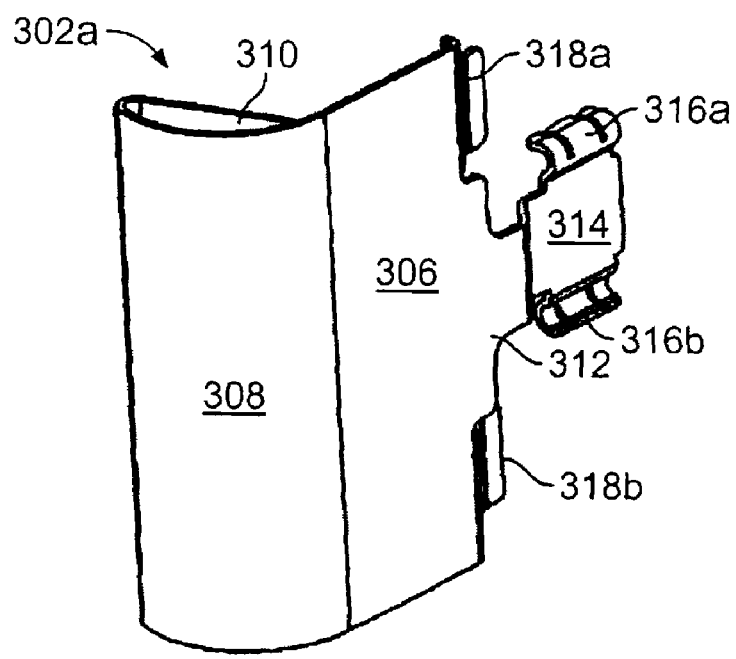
FIG. 43 is a perspective view of the inventive cable bend guide.

FIG. 42 is an upper perspective view of wire basket 294c illustrating additional details of cable bend guides 302a and 302b which will now be described in terms of FIGS. 43-47 which show the manner in which a cable bend guide is attached to a wire basket. Referring to FIG. 43, there is shown a perspective view of cable bend guide 302a. Cable bend guide 302a includes a first generally planar wall section 306, a second curvilinear wall section 308 and a third generally planar wall section 310. The three sections are formed from a single piece of high strength metal such as pre-galvanized sheetsteel. The curvilinear wall section 308 of the cable bend guide 302a engages one or more cables undergoing a turn in their routing for providing the cable, or cables, with a smooth bend radius. The third planar wall section 310 serves to reinforce, or strengthen, the cable bend guide 302a for use with large numbers of cables and eliminates any sharp edges which could damage the cables. Extending rearwardly from the first planar wall section 306 of the cable bend guide 302a is a tab 312 to which is attached a mounting clip 314. Mounting clip 314 includes upper wire hooks 316a and lower wire hooks 316b. Also extending from the aft edge of the cable bend guide's first planar wall section 306 are upper and lower retaining tabs 318a and 318b.

Figure 44:
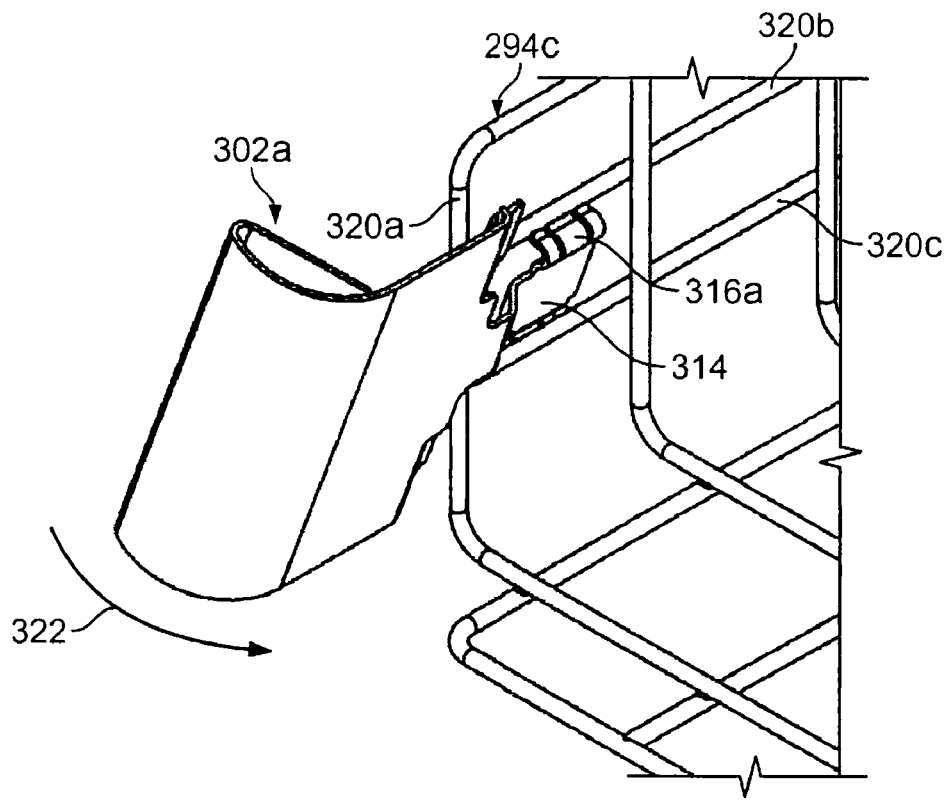
FIGS. 44-46 are perspective views illustrating the sequence of steps involved with attaching the inventive cable bend guide to a wire basket.
Figure 46:
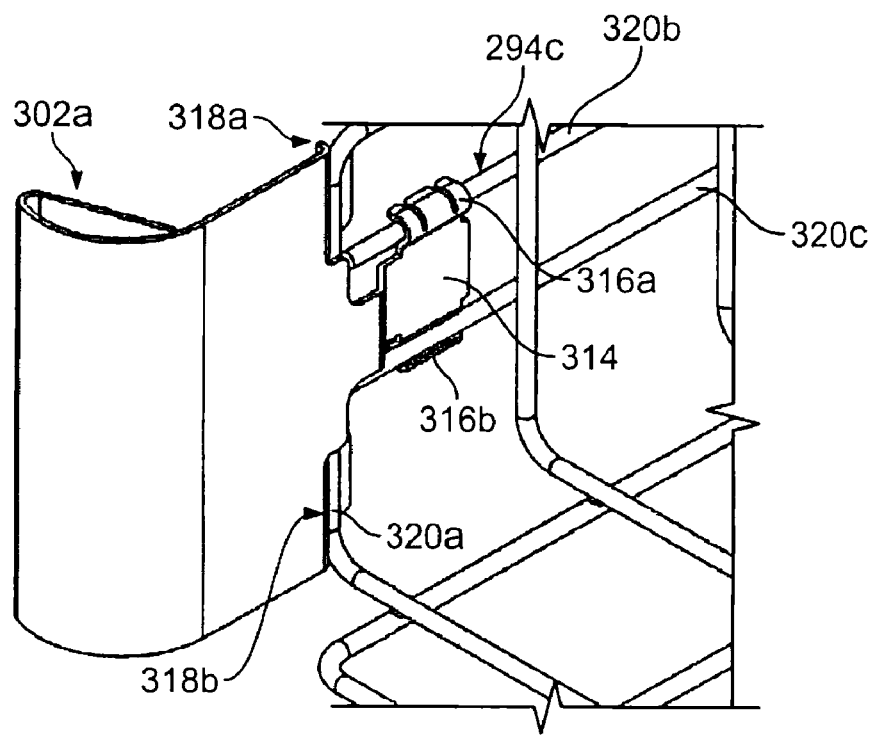
Figure 47:
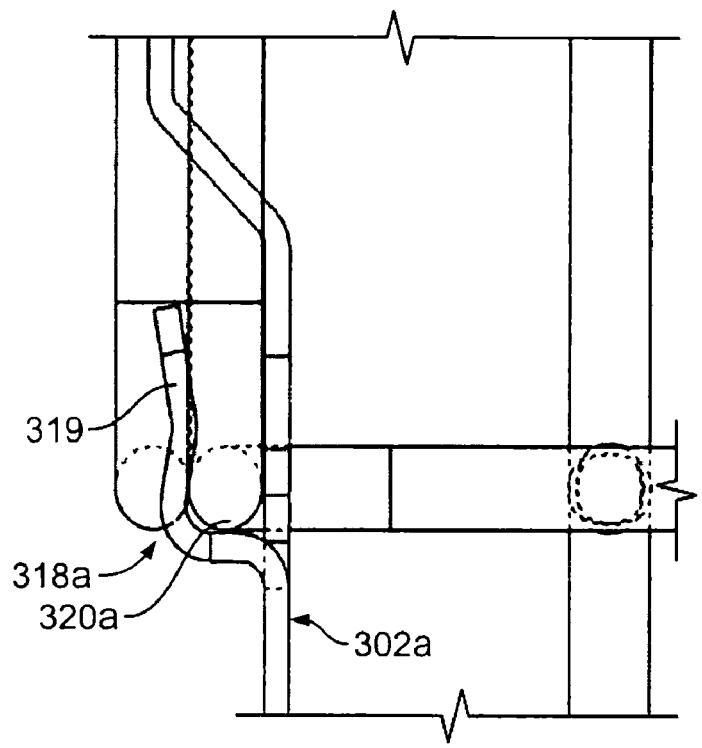
FIG. 47 is a sectional view of a portion of the cable bend guide attached to a wire basket.

Cable bend guide 302a is attached to wire basket 294c in the following manner. Cable bend guide 302a is positioned inside of a first end wire 320a of the wire basket 294c, with its mounting clip 314 located between second and third wires 320b and 320c of the wire basket as shown in FIG. 44. In this position, the first upper wire hooks 316a are disposed on a first side of the second wire 320b, while the second lower wire hooks 316b are disposed on a second, opposed side of the third wire 320c. Cable bend guide 302a is then rotated in the direction of arrow 322 in a counter clockwise direction as viewed in FIG. 44. The first upper wire hooks 316a then engage the second wire 320b in a snap-acting manner, while the second lower wire hooks 316b engage the third wire 320c also in a snap-acting manner as shown in FIG. 45. The wire hooks are sized so as to securely engage a wire of wire basket 294c when pressure is applied by rotational displacement of the cable bend guide 302a, as described. The cable bend guide 302a is then linearly displaced in the direction of arrow 324 as shown in FIG. 45. This causes the first and second retaining tabs 318a and 318b to engage the wire basket's first wire 320a, also in a snap-acting manner, as shown in FIG. 46. Each of the retaining tabs includes an angled portion 319 as shown with the first retaining tab 318a in FIG. 47 which engages the first wire 320a and further attaches the cable bend guide 302a to wire basket 294c. With the first and second wire hooks 316a, 316b engaging opposed sides of the second and third wires 320b and 320c, and with each of the retaining tabs 318a and 318b engaging the wire basket's first wire 320a, cable bend guide 302a is securely attached in a fixed manner to wire basket 294c.

Referring now to FIGS. 1-5 and 48, the cable enclosure 8 is positioned between the lower floor 26 and upper floor 28, and is supported by the support structure 30. The cable enclosure 8 includes a plurality of vertical side walls 340a-d and a base 342 connected at its edges to each of the plurality of walls 340. In some embodiments, the side walls 340 and base 342 are fabricated from aluminum and are riveted together at the corners, thereby providing the cable enclosure 8 with an overall lightweight design. The plurality of side walls 340 in combination with the base 342 define an enclosure cavity 344, which is open at a top of the cable enclosure 8. The top edges of the side walls 340 each include a horizontal portion 345 extending outwardly from the main portion of the side walls 340 and a down-turned portion 347 at the end of the horizontal portion 345 (see FIG. 48). The maximum width of the cable enclosure 8, which is defined from the down-turned portion 347 of one side wall 340 to the down-turned portion 347 of the opposite side wall 340, is less than the width of an opening 370 defined in the raised floor grid system 6 (described in greater detail below).

In some constructions, the cable enclosure 8 includes a cover 346 (see FIGS. 1-3) positioned on top of the cable enclosure 8 to cover and substantially seal the top opening of the enclosure cavity 344. The cover 346 is used when the cable enclosure 8 is positioned sufficiently low in the raised floor grid system 6 such that the top of the cable enclosure 8 is spaced a distance from the floor tile 28 positioned immediately above the cable enclosure 8. In instances where the cable enclosure 8 is positioned in the raised floor grid system 6 and the top of the cable enclosure 8 is not spaced from the floor tile 28 immediately thereabove (i.e., the floor tile 28 engages the top of the cable enclosure 8 when properly positioned in the raised floor grid system 6), the cover 346 is not required. A resilient member 348 is mounted at a top of each of the plurality of side walls 340 and is engaged by the cover 346 when the cover 346 is positioned on top of the cable enclosure 8 or is engaged by the floor tile 28 when the floor tile 28 is positioned on top of the cable enclosure 8. The resilient member 348 assists with sealing the top opening in the cable enclosure 8. In some constructions, the resilient member 348 is made of foam. In other constructions, the resilient member 348 is made of other materials, such as, for example, rubber, soft plastic, etc. The cable enclosure 8 further includes a plurality of openings 350 in the side walls 340. In the illustrated exemplary construction, the front and rear side walls 340a, 340b each include a pair of circular openings 350 and the right and left side walls 340c, 340d each include a single substantially rectangular opening 350. Alternatively, the side walls 340 may include any number of openings 350, including zero, and the openings 350 can assume any shape. Each opening 350 defined in the side walls 340 includes a corresponding sealing assembly 510 for forming a plenum seal around the cables. The sealing assembly 510 may, for example, inhibit undesirable temperature or smoke transfer to and from the cable enclosure 8 as well as prevent debris from entering the cable enclosure 8. The sealing assemblies 510 will be described in greater detail below.

Figure 48:
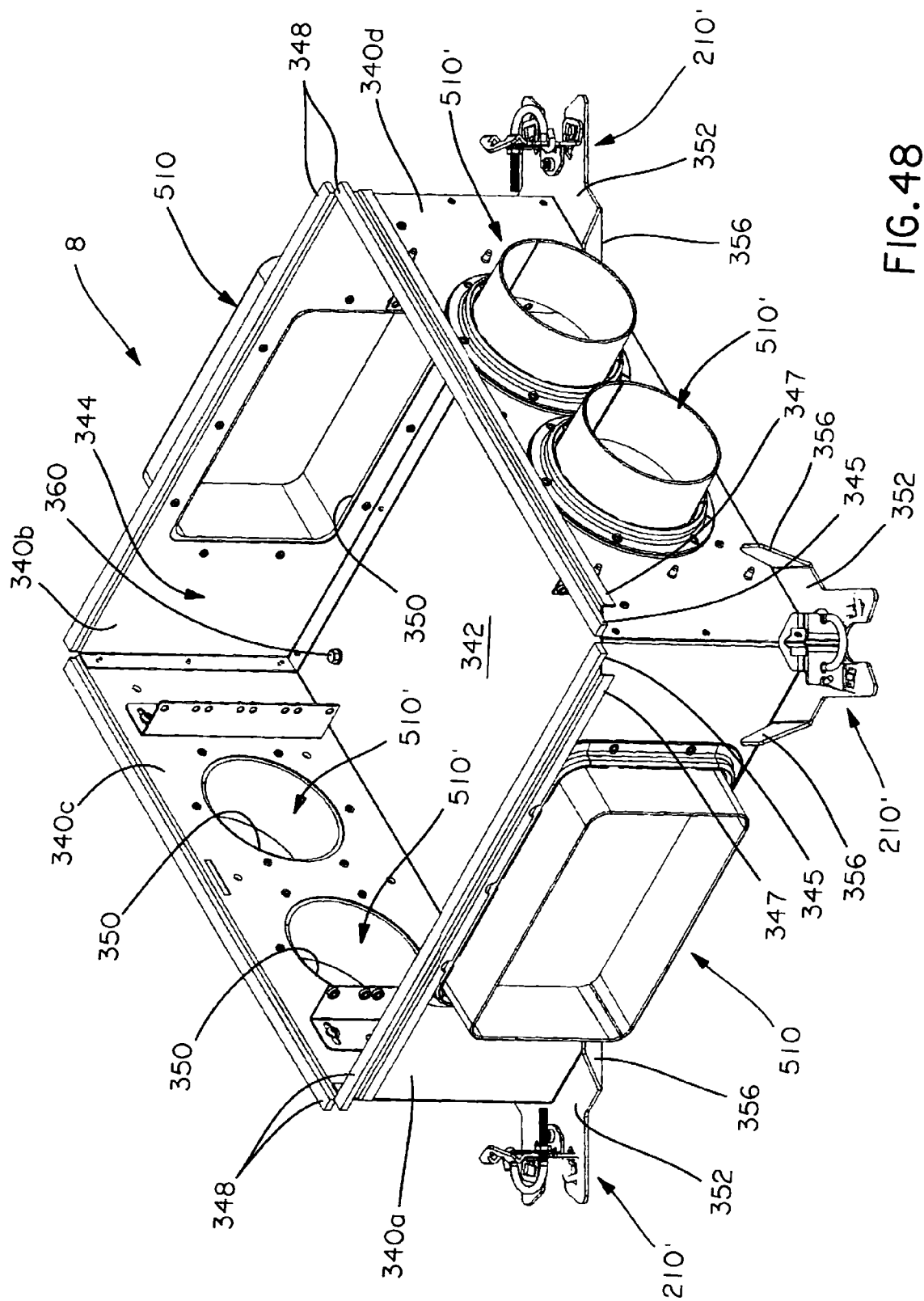
FIG. 48 is a top perspective view of a cable enclosure of the cable management system shown in FIG. 1.
Figure 50:
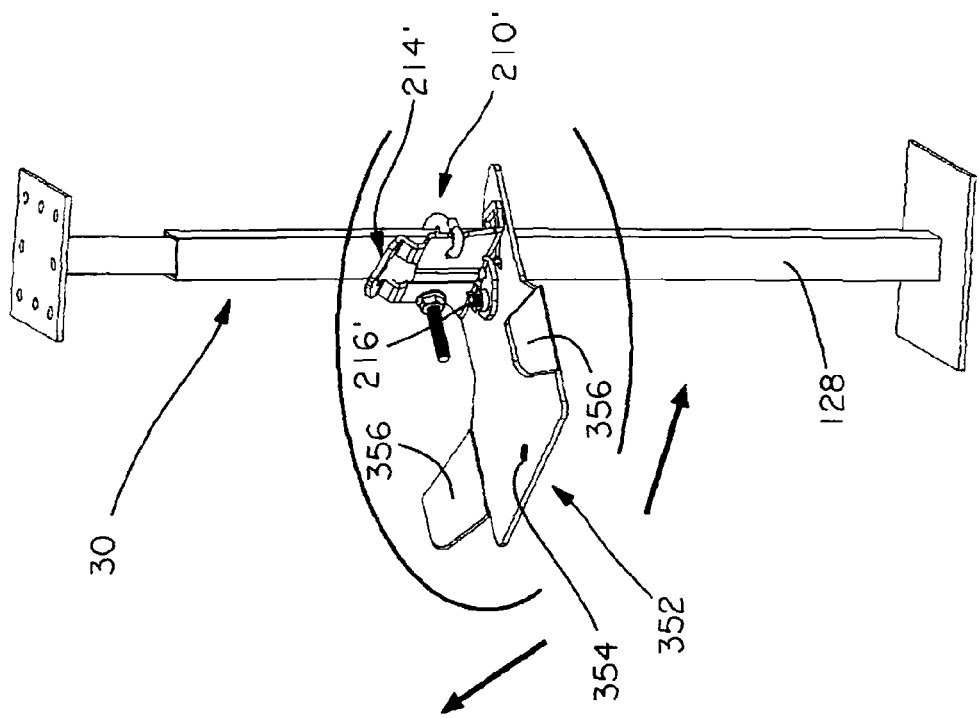
FIG. 50 is a perspective view of the vertical support member and the bracket shown in FIG. 49, shown with a portion of the bracket being rotatable.
Figure 49:
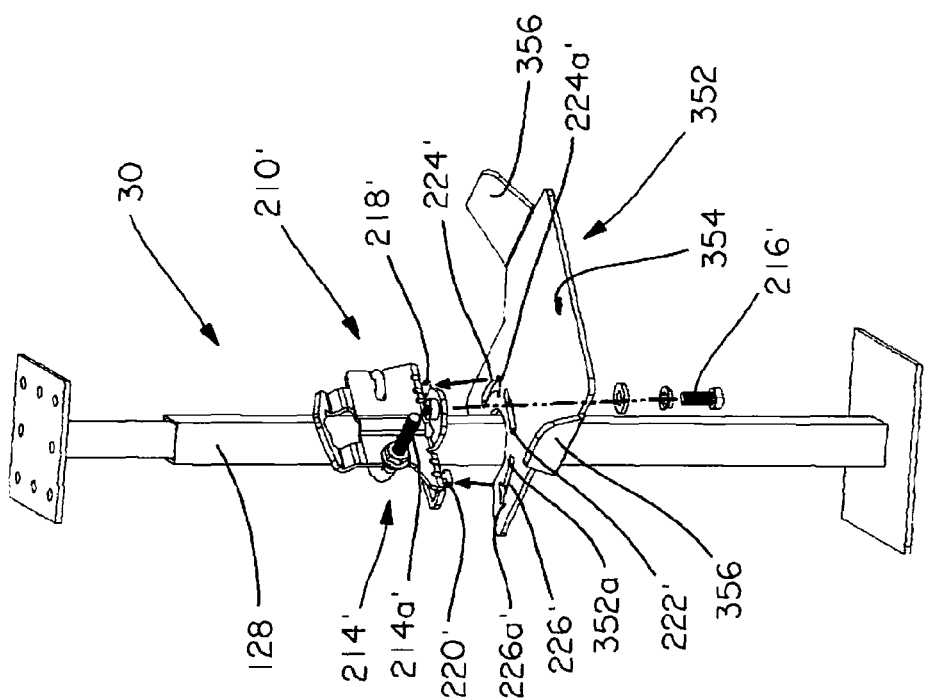
FIG. 49 is a perspective view of a vertical support member and a bracket for supporting the cable enclosure shown in FIG. 48.

With continued reference to FIGS. 1-5 and 48 and with additional reference to FIGS. 49 and 50, the cable enclosure 8 is connected to the vertical support members 128 with brackets 210' similar to the brackets 210 described above for connecting the baskets to the vertical support members 128. With respect to connecting the cable enclosure 8 to the vertical support members 128, the brackets 210' can be oriented in a similar manner to that described and illustrated above or can be oriented in an inverted manner. With particular reference to FIGS. 48-50, the brackets 210' are inverted and each bracket 210' includes an enclosure support plate 352 instead of the support plate 212 described above. The enclosure support plate 352 is securely attached to support clamp assembly 214' by use of a support plate locking screw 216' inserted through a first curvilinear elongated slot 222' in the enclosure support plate 352 and into a threaded aperture 214a' in an upper portion of the support clamp assembly 214'. Enclosure support plate 352 and support clamp assembly 214' are further coupled together by means of first and second shoulder locking tabs 218' and 220'. First shoulder locking tab 218' is inserted through a second curvilinear slot 224' through insert slot 224a' in enclosure support plate 352, while second shoulder locking tab 220' is similarly inserted through a third curvilinear slot 226' within the enclosure support plate 352 through insert slot 226a'. An opening 352a is formed in enclosure support plate 352 for receiving a vertical support member 128. The enclosure support plate 352 is selectively rotatable relative to the bracket 210' and the vertical support member 128 (as illustrated in FIG. 50) by loosening and tightening the locking screw 216'. Each enclosure support plate 352 also includes an aperture 354 for fastening the enclosure support plates 352 to the cable enclosure 8 and a pair of upwardly angled flanges 356 for assisting with proper alignment of the cable enclosure 8 during installation (described in greater detail below).

Figure 53:
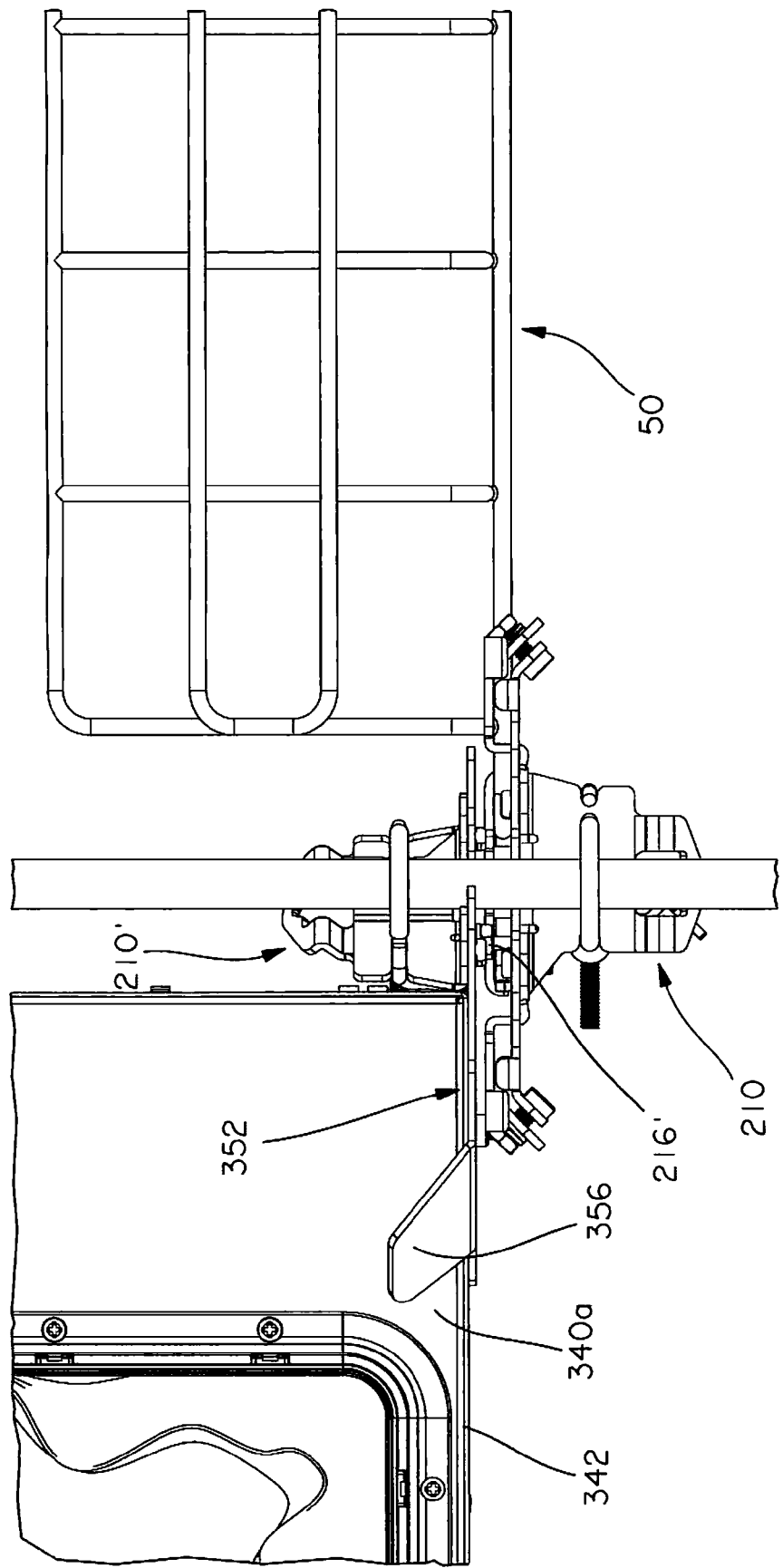
FIG. 53 is a perspective view of a pair of brackets for connecting a cable enclosure and a basket to a vertical support member.

With reference to FIG. 53, a portion of a vertical support member 128 is shown with both a cable enclosure 8 and a basket connected thereto. As mentioned above, the bracket 210' can be connected to the vertical support member 128 in either an upright orientation or an inverted orientation. In instances where only the cable enclosure 8 is connected to the vertical support member 128 (i.e., a bracket 210 and basket are not connected to the same vertical support member 128), a user may connect the bracket 210' to the vertical support member 128 in either of the upright or inverted orientations as desired. In instances where both a cable enclosure 8 and a basket are required to be connected to the same vertical support member 128, the bracket 210' can be connected to the vertical support member in the inverted orientation (as shown in FIG. 53) in order to facilitate proper alignment of the openings 350 in the cable enclosure 8 with the cables supported by the basket. As can be seen in FIG. 53, the bracket 210 used to connect the basket to the vertical support member 128 is in the upright orientation and the bracket 210' used to connect the cable enclosure 8 to the vertical support member 128 is in the inverted orientation. This allows the brackets 210 and 210' to be positioned in close proximity to each other, thereby positioning the openings 350 of the cable enclosure 8 in alignment with the baskets and the cables that are supported by the baskets. The aligned openings 350 and cables allow the cables to pass into or exit from the cable enclosure 8 in a substantially straight manner, thereby inhibiting any significant bends or changes of direction which would apply unwanted stress to the cables.

Figure 56:
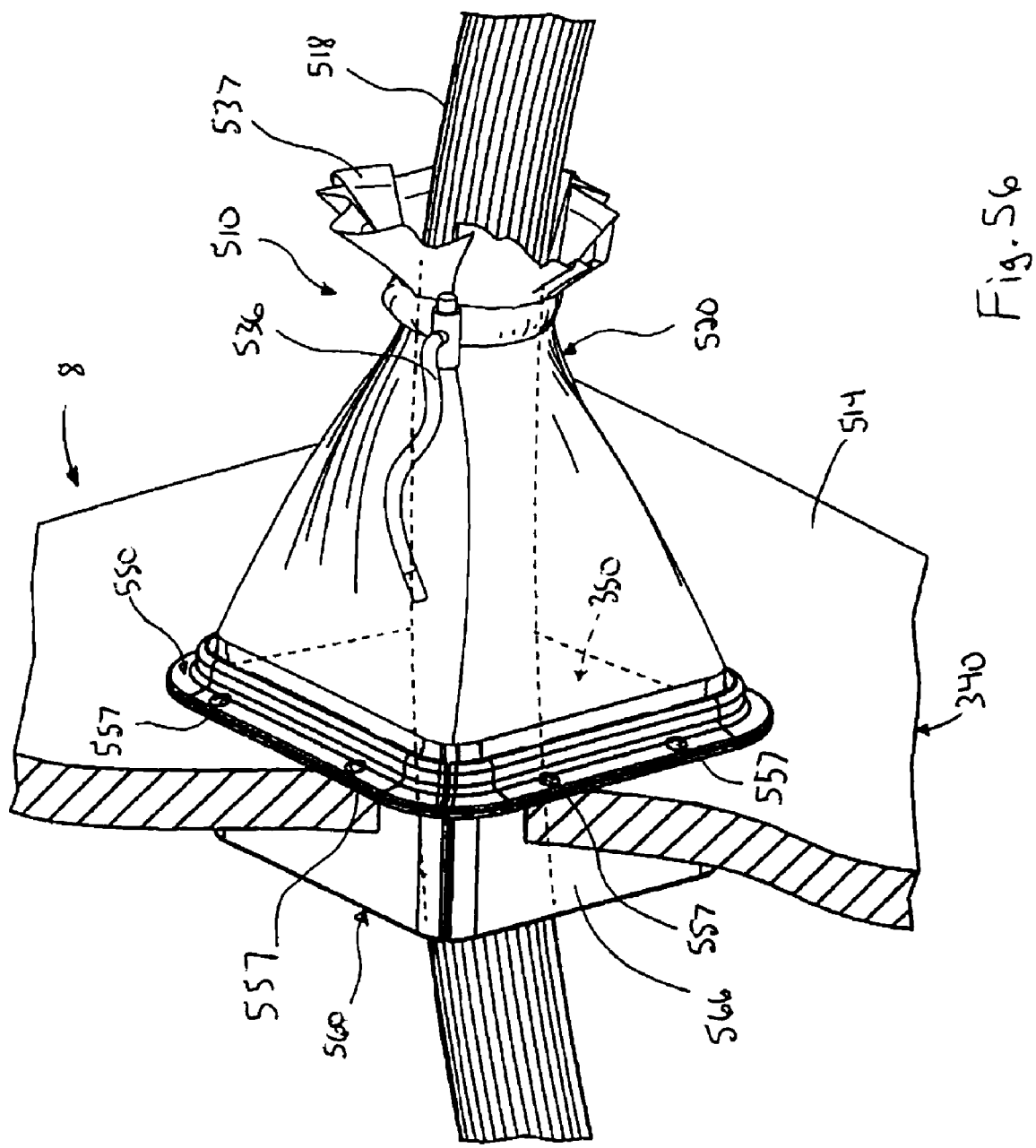
FIG. 56 is a perspective view of one example of a sealing assembly as installed on a cable enclosure.
Figure 57:
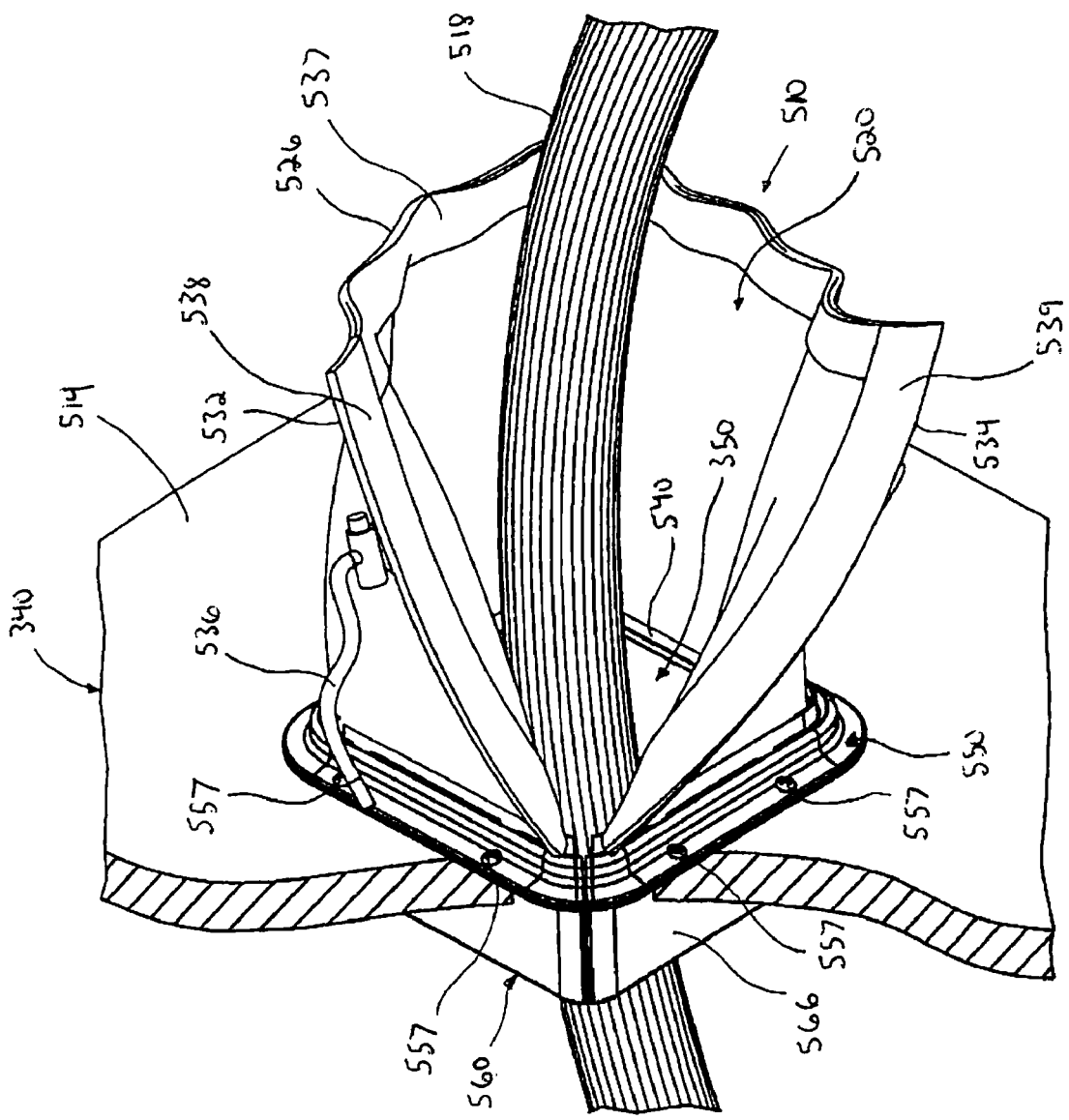
FIG. 57 is a perspective view of the sealing assembly of FIG. 56 with the sleeve in an open position.

Referring now to FIGS. 56-65, one example of a sealing assembly 510 is shown as installed around a cable 518 passing through one of the openings 350 in the side wall 340 of the cable enclosure 8. As indicated above the openings 350 can assume a variety of shapes and likewise the sealing assemblies 510 can assume a variety of complimentary shapes to accommodate the variety of opening shapes in order to properly seal the openings 350. The sealing member 510 illustrated in FIGS. 56-65 accommodates a polygonal shaped opening 350 such as the rectangular openings 350 formed in the right and left sides 340c, 340d of the cable enclosure 8. As can be seen in FIG. 56, the side wall 340 of the cable enclosure 8 has an exterior surface 514, which is typically an electrically conductive material such as metal, and the opening 350, which allows the passage of the cable 518 through the side wall 340. The cable 518 could be a single cable, multiple cables, a cable bundle, or multiple cable bundles, depending on the particular installation. In this example, the sealing assembly 510 generally has a sleeve 520, a cover 550, a frame 540, and a grommet 560.

Referring generally to FIGS. 56, 57, 59, and 62, in this example, sleeve 520 is constructed of a sheet of flexible material that can be wrapped around cable 518 during installation. This simplifies the installation of sleeve 520 and allows for installation of sleeve 520 around existing cables that are already installed. Alternatively, sleeve 520 could be of a generally tubular construction that requires cable 518 to be passed through sleeve 520 for installation. In the example shown, strips of hook and loop type fastener 538, 539, such as Velcro®, are attached to first and second side edges 532, 534 of sleeve 520. Strips 538, 539 engage each other to connect first and second side edges 532, 534 and position sleeve 520 around cable 518. In alternate embodiments, any well known method could be used to connect first and second side edges 532, 534 of sleeve 520, such as snaps, buttons, rivets, double sided tape, etc.

In addition to being flexible, in this example sleeve 520 is constructed of a material that is electrically conductive, such as Dura-stat 3983, so that sleeve 520 assists in the dissipation of static electricity from cable 518, as discussed below. For example, sleeve 520 could be constructed of a static-dissipative, vinyl-coated fabric having conductive fibers wound therein. In order to meet specific codes, sleeve 520 could also be constructed of a material that is flame retardant.

Drawstring 536 is positioned in the top portion of sleeve 520 and extends through a passageway or holes formed in sleeve 520. Drawstring 536 is used to cinch the top portion of sleeve 520 around cable 518 and any similar cinching mechanism could also be used. In installations where a single cable is present, drawstring 536 can be used to seal the top portion of sleeve 520 around cable 518. However, if multiple cables, a cable bundle, or multiple cable bundles pass through opening 350, use of only drawstring 536 will leave air gaps between the cables/cable bundles and will not provide a complete seal.

In order to provide a more complete seal around multiple cables, a cable bundle, or multiple cable bundles, a strip of hook and loop) type fastener 537, such as Velcro®, is attached to sleeve 520 above drawstring 536 and adjacent top edge 526 of sleeve 520. Strip 537 extends across substantially the entire top edge 526 such that varying portions of strip 537 can be closely wrapped around individual cables and/or individual cable bundles and engaged to seal the top portion of sleeve 520 around the individual cables and/or cable bundles.

Figure 62:
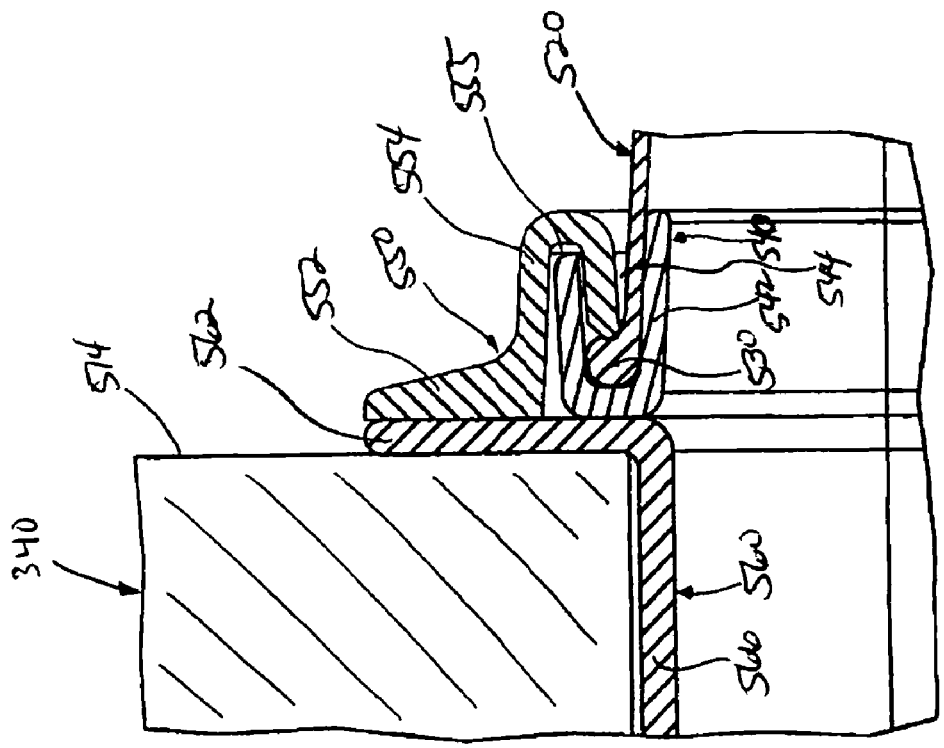
FIG. 62 is an enlarged partial view of the sealing assembly shown in the circle of FIG. 61.
Figure 63:
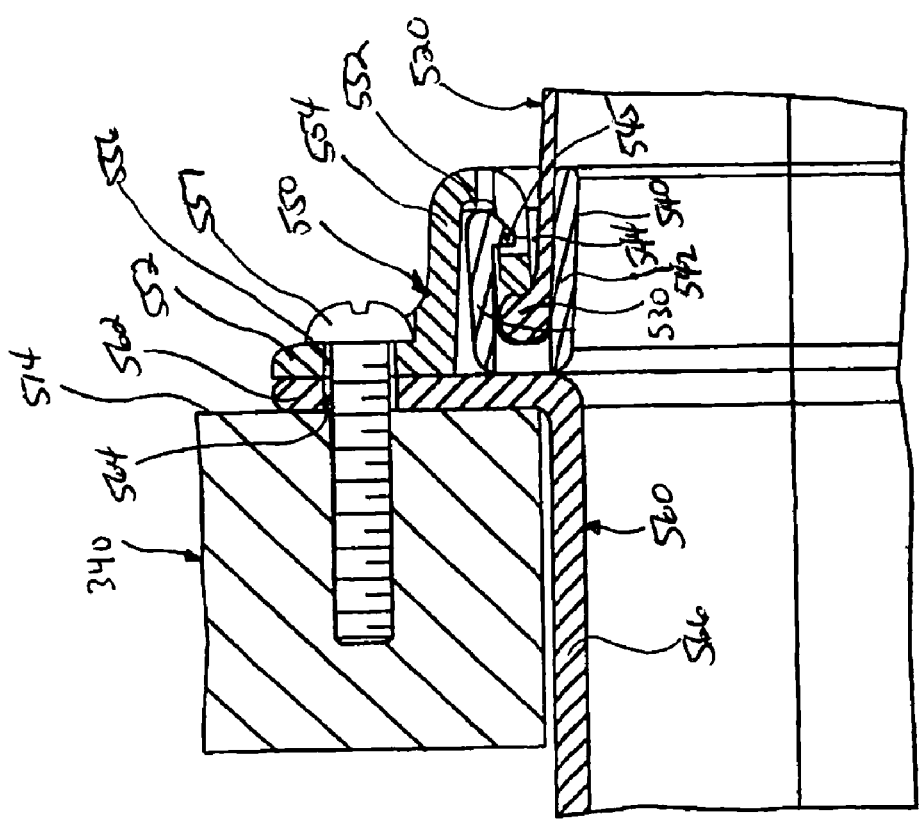
FIG. 63 is a cross-sectional view taken along line 63-63 in FIG. 60.

As can best be seen in FIGS. 59, 62, and 63, at the bottom portion of sleeve 520, bottom edge 528 has protuberance 530, which allows the bottom portion of sleeve 520 to be secured to exterior surface 514 through frame 540 and cover 550, as described below.

Referring generally to FIGS. 58, 59, and 61-63, in this example frame 540 and cover 550 are used to secure sleeve 520 to the exterior surface 514 of the cable enclosure 8.

In the example shown, frame 540 is generally square, but can be rectangular in shape to accommodate the rectangular openings 350 in the right and left sides of the cable enclosure 8, and is formed by wall 542. Wall 542 is generally U shaped, forming channel 544, which is configured to receive protuberance 530 of sleeve 520 and to receive the inside wall of second wall 554 of cover 550, as seen in FIGS. 62 and 63. As described in more detail below, protuberance 530 is first positioned within channel 544 and then the inside wall of second wall 554 of cover 550 is inserted into channel 544, trapping protuberance 530 between frame 540 and cover 550. In addition, at specified internals around frame 540, the outer wall of U shaped wall 542 has protrusions 545 (see FIG. 63) that extend into channel 544 and engage apertures in second wall 554 of cover 550 to secure cover 550 to frame 540.

Figure 58:
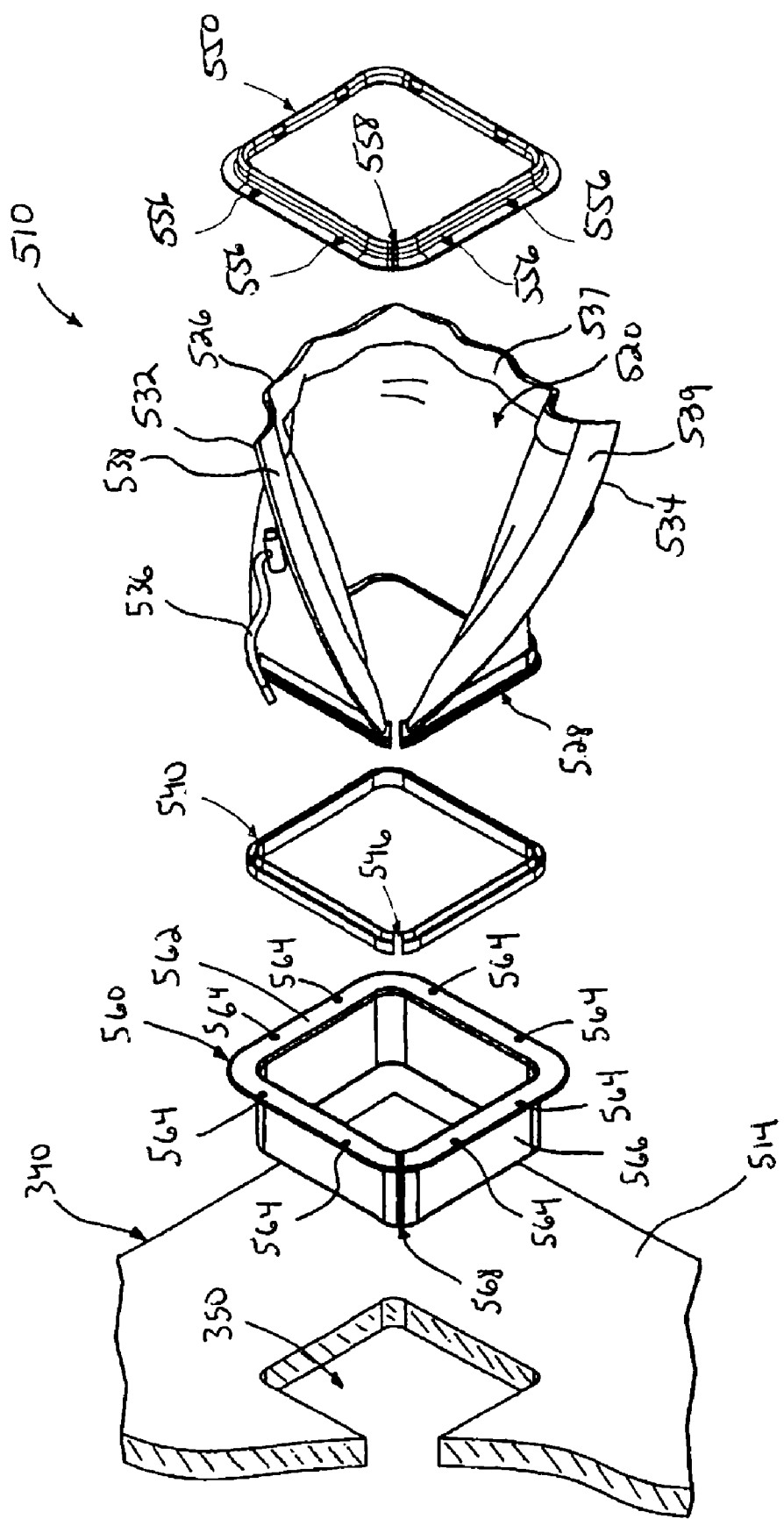
FIG. 58 is an exploded view of the sealing assembly of FIG. 56 without the cable/cable bundle.
Figure 59:
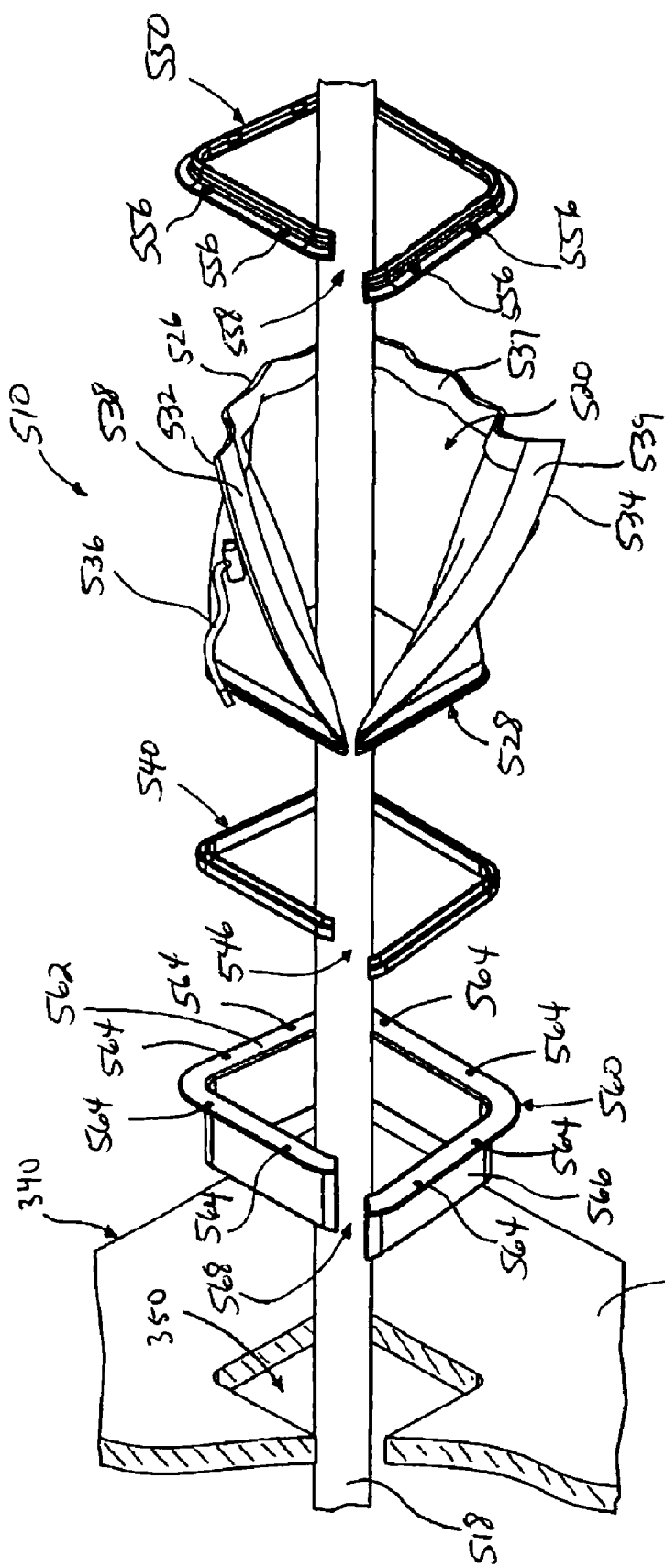
FIG. 59 is an exploded view of the sealing assembly of FIG. 56 with the cable/cable bundle.
Figure 60:
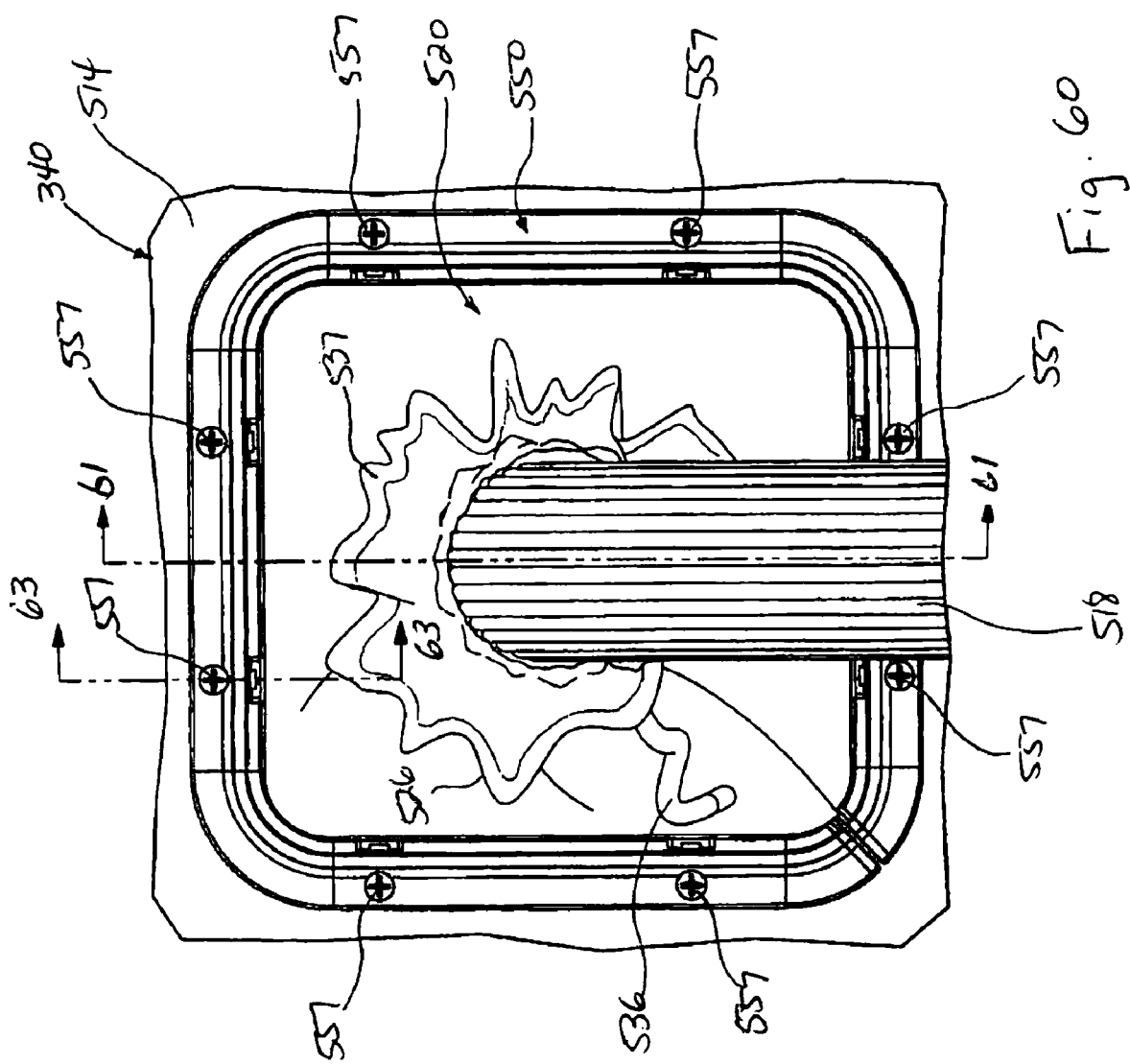
FIG. 60 is a top view of the sealing assembly of FIG. 56.
Figure 61:
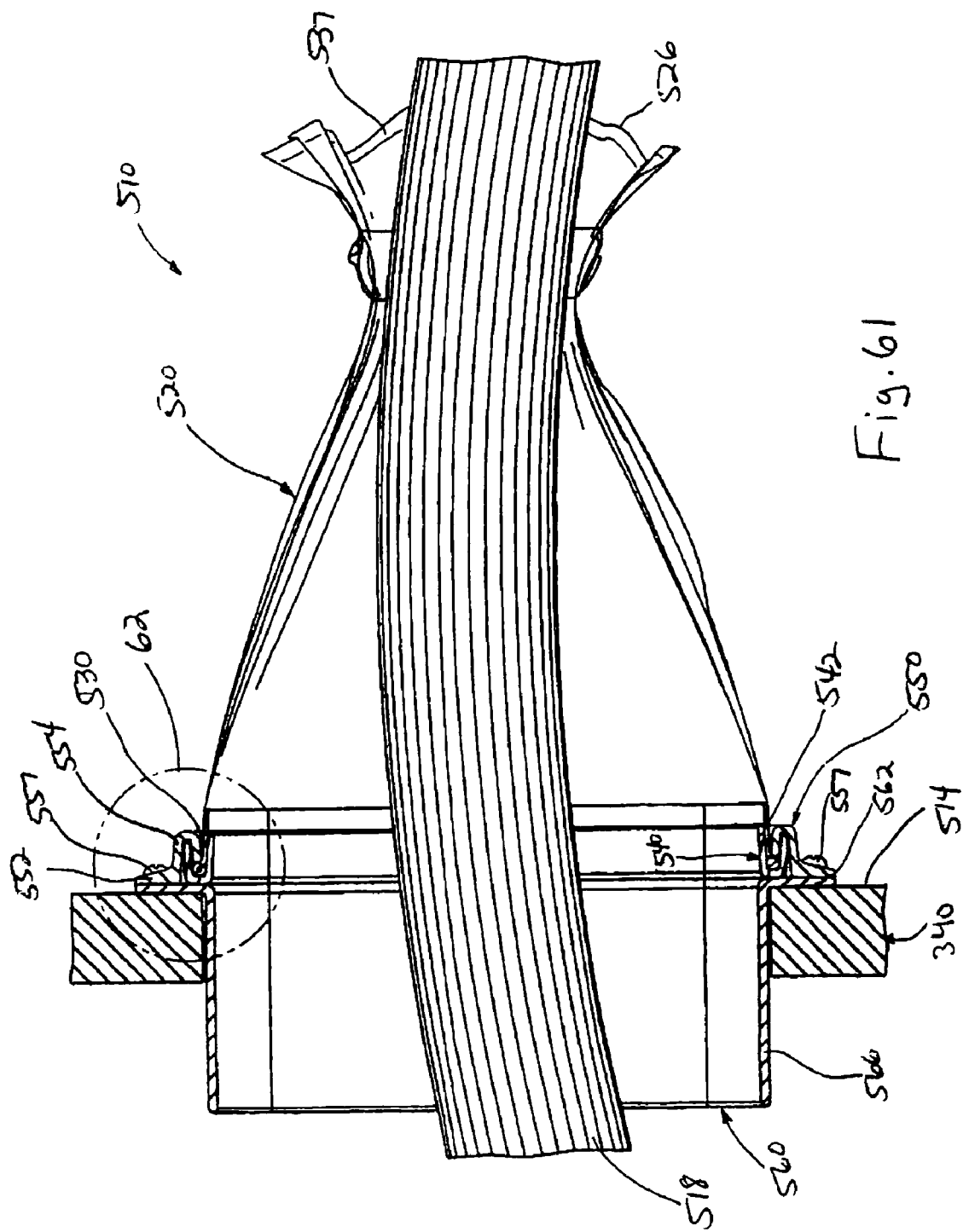
FIG. 61 is a cross-sectional view taken along line 61-61 in FIG. 60.

In the specific example shown, frame 540 also has slit 546, as can best be seen in FIGS. 58 and 59, which simplifies the installation of frame 540 and allows for installation of frame 540 around existing cables that are already installed. In addition, frame 540 could be made of an electrically conductive polycarbonate, such as Stat-kon D-FR, to assist in the dissipation of static electricity from cable 518. However, if cover 550 is constructed of an electrically conductive material, this may not be necessary. Furthermore, to meet specific codes, frame 540 could also be constructed of a flame retardant material.

Similarly, in the example shown, cover 550 is also generally square, is formed by first wall 552 and second wall 554 and is configured to fit over frame 540 and bottom edge 528 at the bottom portion of sleeve 520. First wall 552 is generally planar, is configured to engage first wall 562 of grommet 560, as seen in FIGS. 62 and 63. In this example, first wall 552 also has apertures 556, which are used to secure cover 550 to exterior surface 514 of the cable enclosure 8 via screws 557, as described in more detail below. Second wall 554 extends generally perpendicular to first wall 552 and is generally U shaped, forming channel 555, which is configured to receive the outer wall of U shaped wall 542 of frame 540. In addition, at specified intervals around cover 550, second wall 554 has apertures (see FIG. 63) that are positioned and configured to receive protrusions 545 in frame 540.

In the specific example shown, cover 550 also has slit 558, as can best be seen in FIGS. 58 and 59, which simplifies the installation of cover 550 and allows for installation of cover 550 around existing cables that are already installed. In addition, in this example, cover 550 is constructed of an electrically conductive polycarbonate, such as Stat-kon D-FR, to assist in the dissipation of static electricity from cable 518 to the exterior surface 514 of the cable enclosure 8. To secure cover 550 to the exterior surface 514 and to complete the grounding circuit between cable 518 and the exterior surface 514, self-tapping screws 557 are inserted through apertures 556 and threaded into the exterior surface 514, as seen in FIG. 63. To provide an electrical contact between screws 557 and cover 550, any well known method could be used. For example, if cover 550 is electrically conductive and does not contain any cover or coating, the contact between screws 557 and cover 550 will provide the contact. If cover 550 is painted or otherwise covered, the area around where screws 557 will contact cover 550 could be masked to provide a bare surface. In addition, internal tooth lock washers could be placed between the heads of screws 557 and cover 550 such that the teeth will bite into the material of cover 550 or screws having teeth underneath the head could be used, such that the teeth will bite into the material of cover 550. Furthermore, to meet specific codes, cover 550 could also be constructed of a flame retardant material.

Referring generally to FIGS. 56, 58-60, and 63, in the example shown grommet 560 is also generally square, but could also be rectangular or circular to accommodate the rectangular or circular openings 350 in the side wall 340 of the cable enclosure 8, and is formed by first wall 562 and second wall 566. First wall 562 is generally planar and is configured to engage first wall 552 of cover 550 and the exterior surface 514 of the cable enclosure 8. In this example, first wall 562 also has apertures 564, which are axially aligned with apertures 556 in cover 550 such that they receive screws 557 during installation. Second wall 566 extends generally perpendicular to first wall 562 and is configured to extend into and through opening 350 in the exterior surface 514 of the cable enclosure 8.

In the specific example shown, grommet 560 also has slit 568, as can best be seen in FIGS. 58 and 59, which simplifies the installation of grommet 560 and allows for the installation of grommet 560 around existing cables that are already installed. In addition, grommet 560 could be made of an electrically conductive material, such as Santoprene 251-80, to assist in the dissipation of static electricity from cable 518. However, if cover 550 is constructed of an electrically conductive material, this may not be necessary. Furthermore, to meet specific codes, grommet 560 could also be constructed of a flame retardant material.

Figure 64:
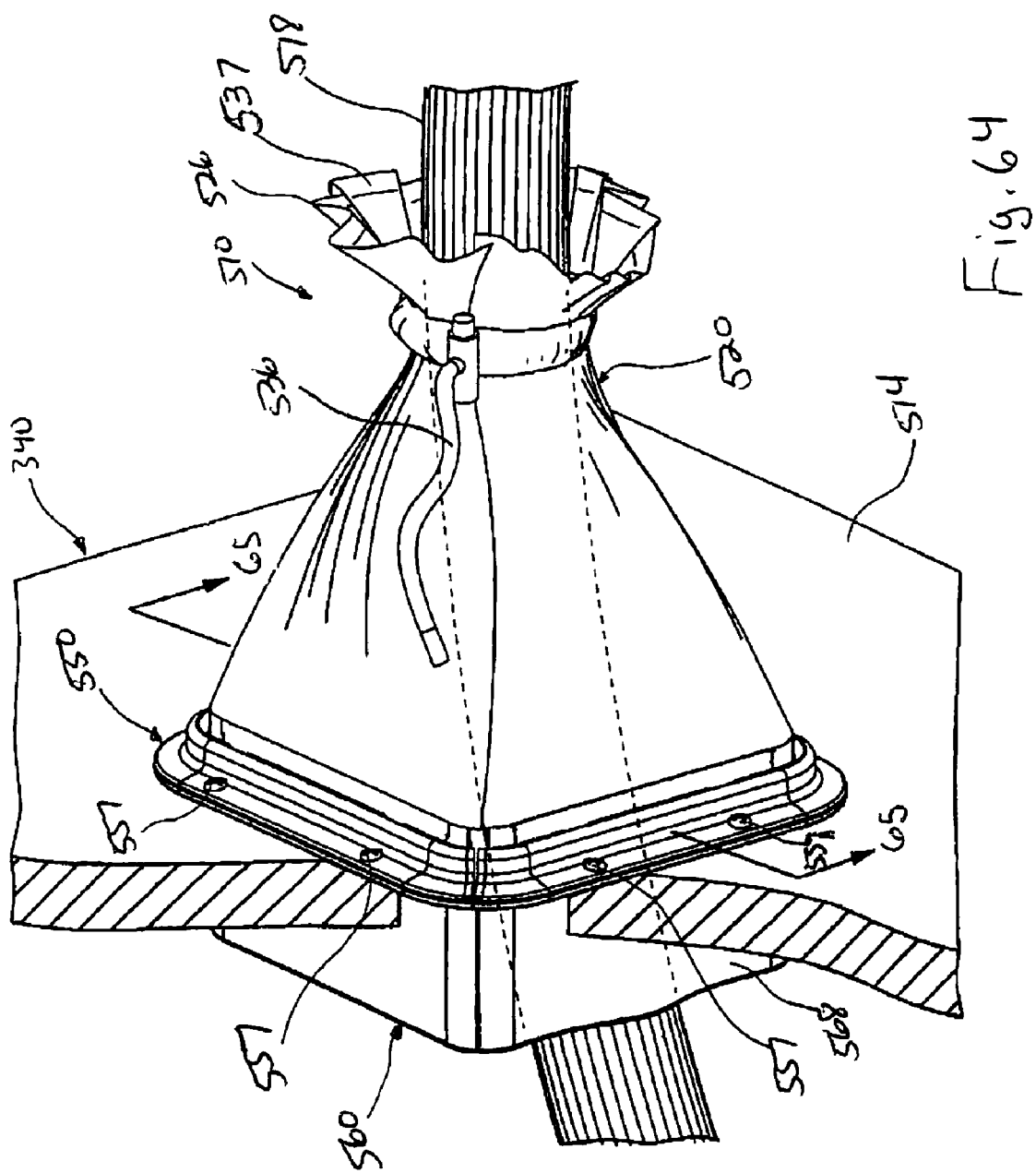
FIG. 64 is a perspective view of the sealing assembly of FIG. 56 with the cable/cable bundle in a non-centered position.
Figure 65:
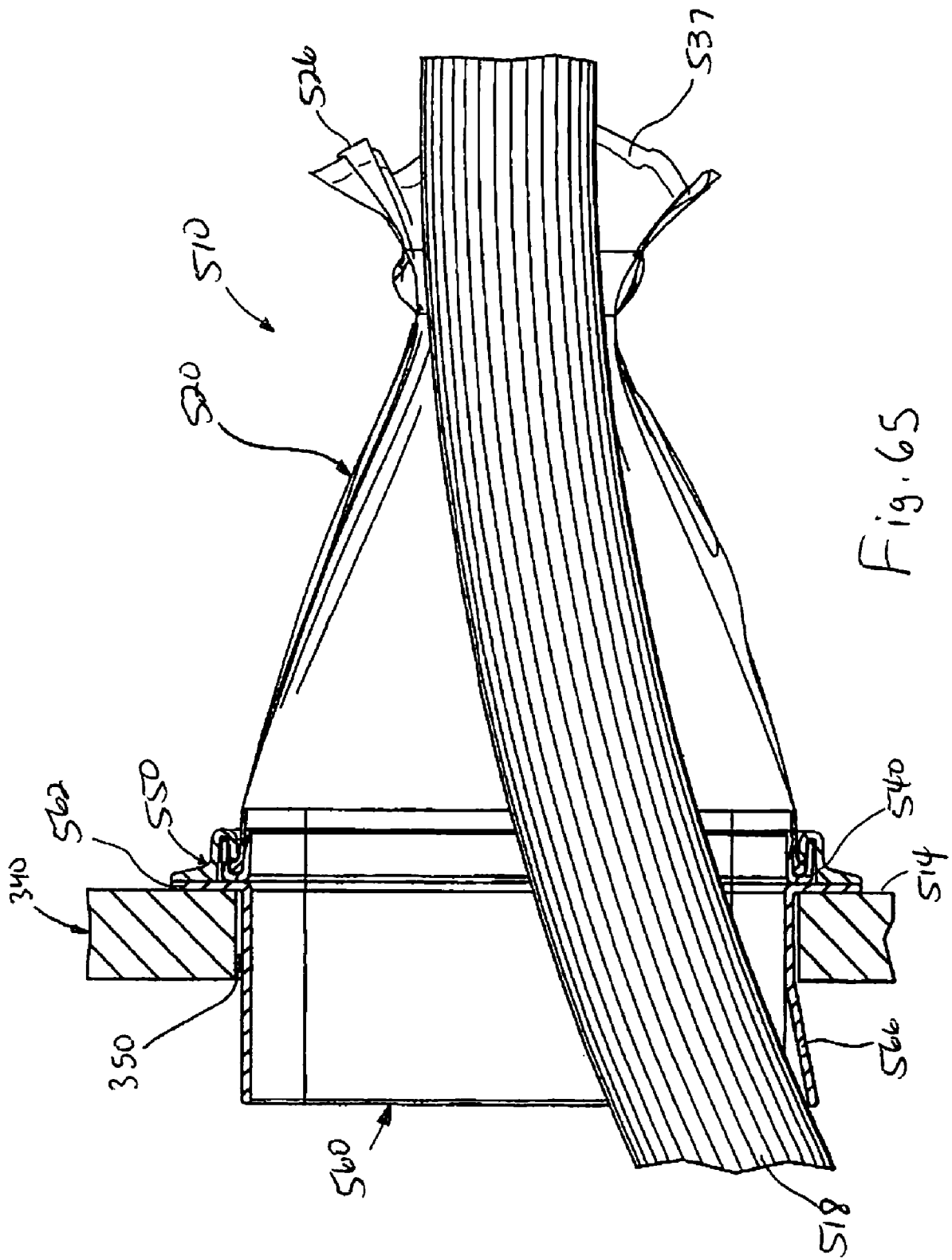
FIG. 65 is a cross-sectional view taken along line 65-65 in FIG. 64.

Furthermore, in the specific example shown, grommet 560 is constructed of a flexible material, such as a rubberized thermoplastic vulcanizate, so that second wall 566 protects cable 518. Referring specifically to FIGS. 64 and 65, if cable 518 is not centered in opening 350, it is possible for cable 518 to contact and/or rub the edge of the cable enclosure 8 at the perimeter of the opening 350, which could be rough or sharp. This contact could cut, fray, or otherwise damage cable 518. However, flexible second wall 566 of grommet 560 provides protection for cable 518 from sharp edges associated with the opening 350 in the exterior surface 514. As can be seen in FIG. 65, if cable 518 is not centered, second wall 566 of grommet 560 will bend and conform to the natural bend of cable 518, which protects cable 518 from the potentially sharp bottom edge of the side wall 340 at the perimeter of the opening 350.

As will be seen in other installation examples below, grommet 560 is optional and sealing assembly 510 could be installed and used without grommet 560.

Referring now to FIGS. 66-68, an alternate installation of an exemplary sealing assembly 510 is shown without grommet 560. The difference in the installation shown in these figures is that frame 540 and cover 550 are placed directly onto the exterior surface 514 and secured with self-tapping screws 557, rather than placing cover 550 onto first wall 562 of grommet 560.

Figure 69:
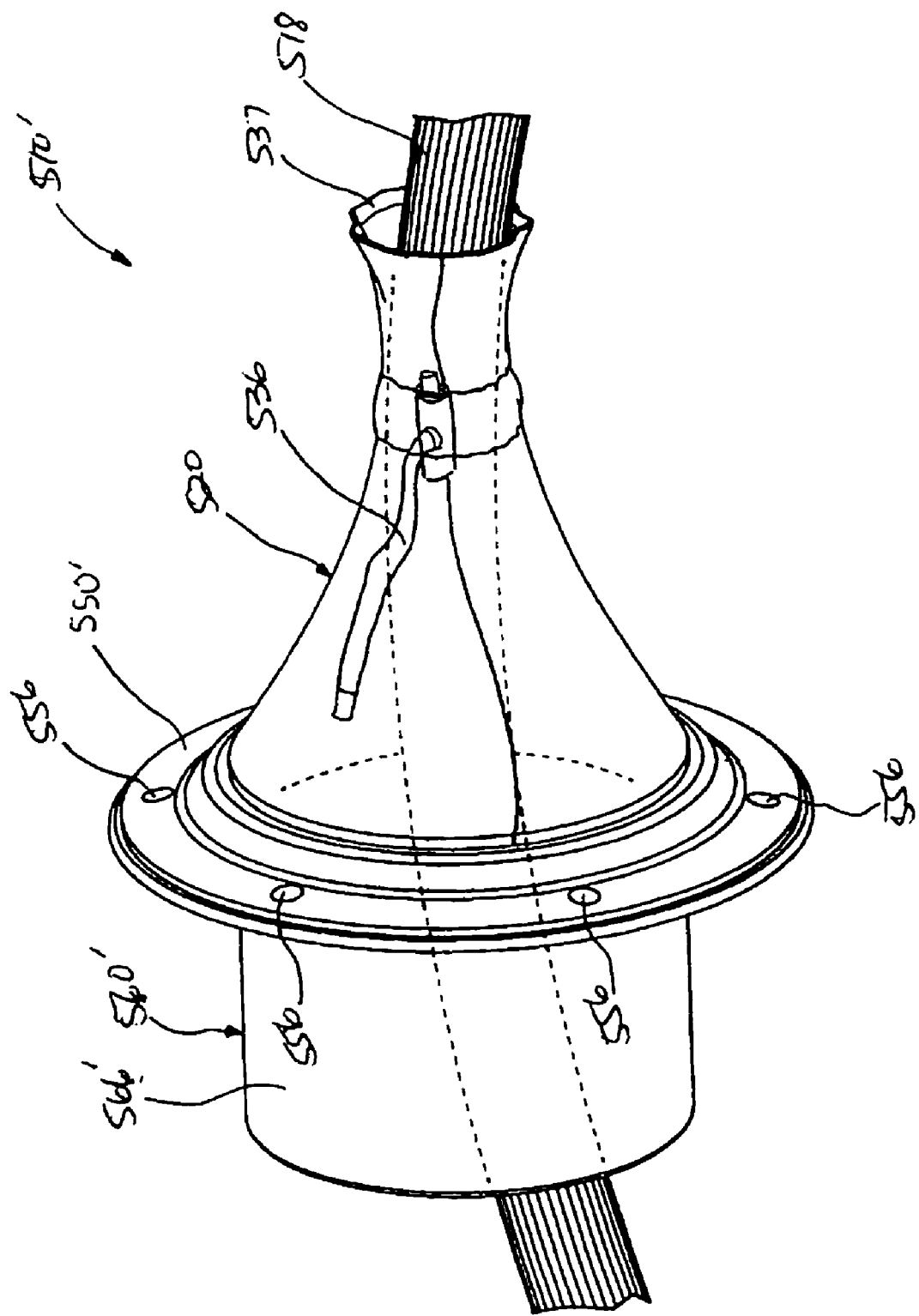
FIG. 69 is a perspective view of another example of a sealing assembly as installed on a cable enclosure.

Referring finally to FIG. 69, another example of a sealing assembly 510' is shown. The sealing assembly 510' is essentially the same as sealing assembly 510 shown in FIGS. 56-65 and common parts between the exemplary assemblies are designated with the same reference numbers. The main difference between the example shown in FIG. 69 and the example shown in FIGS. 56-65 is that in the sealing assembly 510' shown in FIG. 69, cover 550', frame 540' (not shown), and grommet 560' are circular, rather than square, to accommodate the circular openings 350 in the front and rear walls 340a, 340b of the cable enclosure 8. Other than the difference in shape, the construction, characteristics, installation, etc. is the same as that described above.

As mentioned above, sealing assemblies 510, 510' can be used to provide a grounding circuit between cable 518 and the exterior surface 514 of the cable enclosure 8 to provide static dissipation from cable 518. As discussed above, a ground path is created between cable 518 and the exterior surface 514 through: (1) sleeve 520, which is electrically conductive and contacts cable 518 when sealed; (2) cover 550, which is electrically conductive and contacts sleeve 520, and (3) self-tapping screws 557, which are electrically conductive and contact cover 550 and are threaded into the side wall 340, which in data centers is typically constructed of a conductive material, such as metal.

To install sealing assemblies 510 or 510', frame 540 is positioned on the exterior surface 514 such that frame 540 surrounds the opening 350. Bottom edge 528 of sleeve 520 is inserted into channel 544 in frame 540 such that protuberance 530 is positioned within channel 544. If cable 518 is already extending through the opening 350, slit 546 in frame 540 can be used to position frame 540 around cable 518. Similarly, first and second side edges 532, 534 of sleeve 520 can be separated by disengaging the hook and loop type fasteners 538, 539, sleeve 520 placed around cable 518, and fasteners 538, 539 re-engaged. Cover 550 is then placed over sleeve 520 and frame 540 such that the inner wall of second wall 554 is positioned with channel 544 of frame 540, thereby trapping protuberance 530 of sleeve 520. Again, if cable 518 is already extending through the opening 350, slit 558 in cover 550 can be used to position cover 550 around cable 518. Screws 557 are then inserted through apertures 556 in cover 550 and screwed into the exterior surface 514. This secures sealing assembly 510 to the side wall 340 and provides a ground path from cable 518 to the side wall 340. At this point, if cable 518 has not been inserted, cable 518 is extended through the opening 350, frame 540, cover 550, and sleeve 520. Top portion of sleeve 520 is then cinched around cable 518 by pulling drawstring 536 closed. In installations where drawstring 536 does not provide sufficient sealing or where multiple cables, cable bundles, or multiple cable bundles extend through scaling assembly 510, top portion of sleeve 520 can be sealed around each individual cable by engaging hook and loop fastener 537 around each cable or cable bundle.

Figure 51:
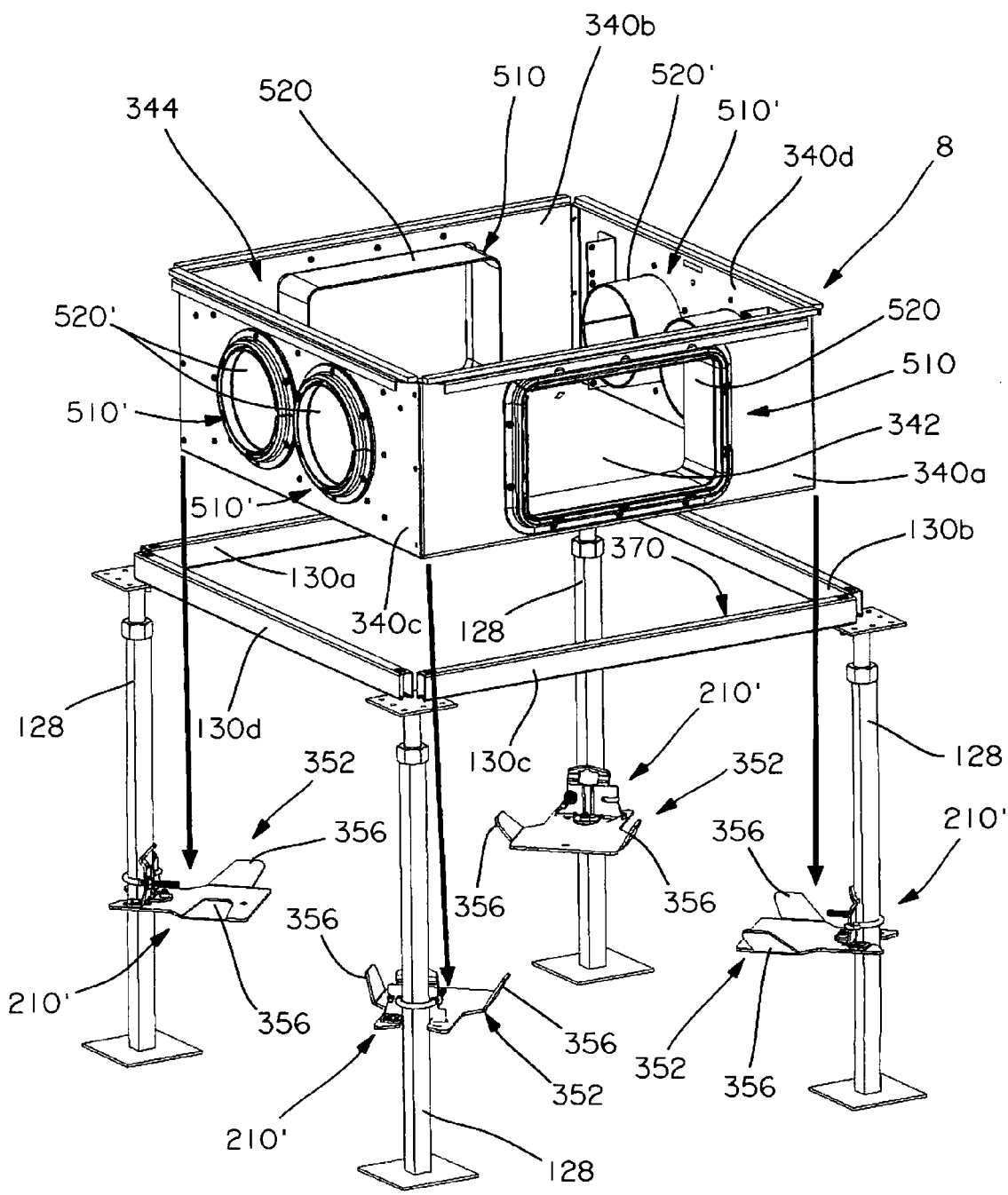
FIG. 51 is a top perspective view of the cable enclosure positioned above a portion of a raised floor grid system and four brackets of the cable management system.
Figure 52:
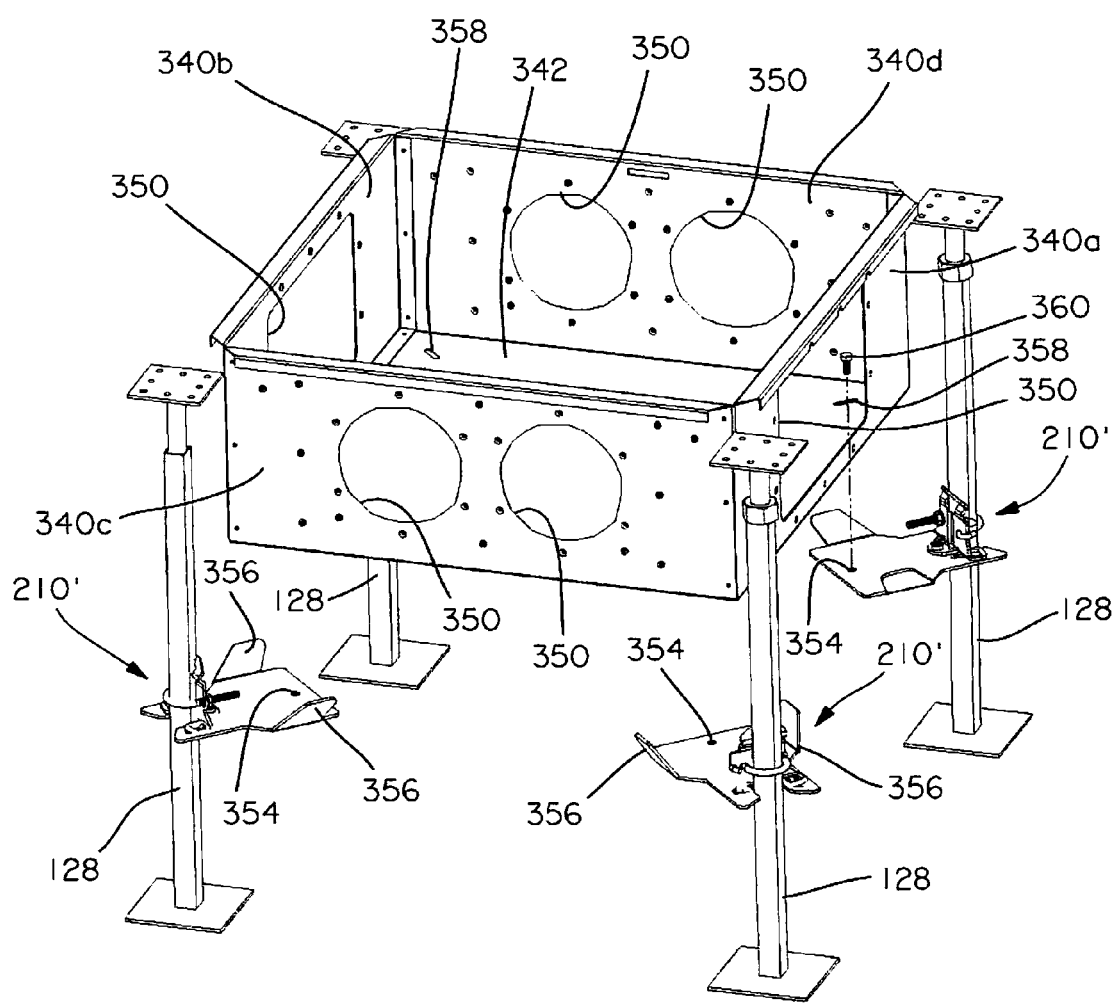
FIG. 52 is a top perspective view of a portion of the cable enclosure and a raised floor grid system.

With reference to FIG. 51, a user only needs to remove a single floor tile 28 in order to install the cable enclosure 8. The side walls 340a-d and base 342 of the cable enclosure 8 are dimensioned to be smaller than an opening 370 (see FIGS. 6 and 14) in the raised floor grid system 6 through which the cable enclosure 8 is inserted to a position below the floor tiles 28. The opening 370 is defined between the horizontal support members 130a-d and is uncovered by removing the single floor tile 28. A user first removes the desired floor tile 28 to facilitate access to the area between the upper floor 28 and the lower floor 26. If brackets 210' are not yet connected to the vertical support members 128, a user connects four brackets 210' to the four vertical support members 128 associated with the removed floor tile 28 as shown in FIG. 51. The brackets 210' are rigidly connected to the vertical support members at the desired height, but the lock screws 216' of the brackets 210' are loosened to allow the cable support plate 352 to rotate relative to the lower support clamp assembly 214'. The sealing assemblies 510, 510' of the cable enclosure 8 are moved from the external operational position (see FIG. 48), in which the sleeves 520, 520' of the sealing assemblies 510, 510' are positioned externally of the side walls 340, to an internal installation position (see FIG. 51), in which the sleeves 520, 520' of the cable enclosure 8 are pushed through respective openings 350 into the enclosure cavity 344. The sleeves 520, 520' are able to deform and are capable of moving between the external and internal positions because of the flexible material thereof. The sleeves 520, 520' of the sealing assemblies 510, 510' are moved to the internal positions so that they do not interfere with the horizontal support members 130 when the cable enclosure 8 is installed. Upon moving the sleeves 520, 520' of the sealing assemblies 510, 510' to the internal position, the cable enclosure 8 is positioned above the opening in the upper floor 28 created by removing the single floor tile 28. The cable enclosure 8 is then moved downward below the upper floor 28 toward the brackets 210' and more particularly toward the enclosure support plates 352. The enclosure support plates 352 are not necessarily required to be ideally positioned to receive corners of the cable enclosure 8. Instead, the enclosure support plates 352 are generally positioned to receive the corners of the cable enclosure 8 and are capable of moving into the ideal positions when engaged by the cable enclosure 8 since the locking screws 216' are loosened to allow movement of the enclosure support plates 352. As the cable enclosure 8 moves downward closer to the enclosure support plates 352, the exterior surfaces 514 (see FIG. 56) of the side walls 340 begin to engage the upwardly angled flanges 356 of the enclosure support plates 352 if the enclosure support plates 352 are not ideally positioned. If the enclosure support plates 352 are ideally aligned the cable enclosure 8 may not engage the flanges 356 at all when being installed. Engagement between the exterior surface 514 of the side walls 340 and the flanges 356 causes the enclosure support plates 352 to rotate toward the ideal positions. When the cable enclosure 8 finally rests upon the enclosure support plates 352, the enclosure support plates 352 are positioned in the ideal positions due to the engagement between the side walls 340 and the flanges 356. The ideal position of the enclosure support plates 356 is achieved when the apertures 354 in the enclosure support plates 35' align with enclosure apertures 358 in the base 342 of the cable enclosure 8 (see FIG. 52). When apertures 354, 358 are aligned, a user may insert a fastener 360 (see FIG. 52) through the aligned apertures 354, 358 and fasten the cable enclosure 8 to the four brackets 210'. Connection of the cable enclosure 8 to the brackets 210' and vertical support members 128 in this manner creates a mechanical electrical bond between the cable enclosure 8 and the raised floor grid system 6, thereby grounding the cable enclosure 8 without the need of any additional grounding components. The user may now move the sleeves 520, 520' of the sealing assemblies 510, 510' from the internal position (shown in FIG. 51) to the external operation position (shown in FIGS. 1 and 48). After the cable enclosure 8 is secured to the brackets 210', the user may feed cables into, through, and out of the cable enclosure 8 as desired (described in more detail below). When completed, a user need only replace the single removed floor tile 28 to conceal the cable enclosure 8 in the raised floor grid system 6 as shown in FIG. 1. If a user desires to change the height of the cable enclosure 8 within the raised floor grid system 6, the user removes the single floor tile 28 immediately above the cable enclosure 8, loosens the U-bolt clamps 228' on the brackets 210', moves the brackets 210' to the desired height, tightens the U-bolt clamps 228', and replaces the single removed floor tile 28 above the cable enclosure 8. If a user desires to remove the cable enclosure 8 from the raised floor grid system 6, a user should reverse the installation steps described above.

It should be understood that the order of steps described above for installation, height adjustment, and removal of the cable enclosure are exemplary and the cable enclosure can be installed, adjusted, and removed by performing the steps in a variety of different orders or with more, fewer, or different steps.

Figure 54:
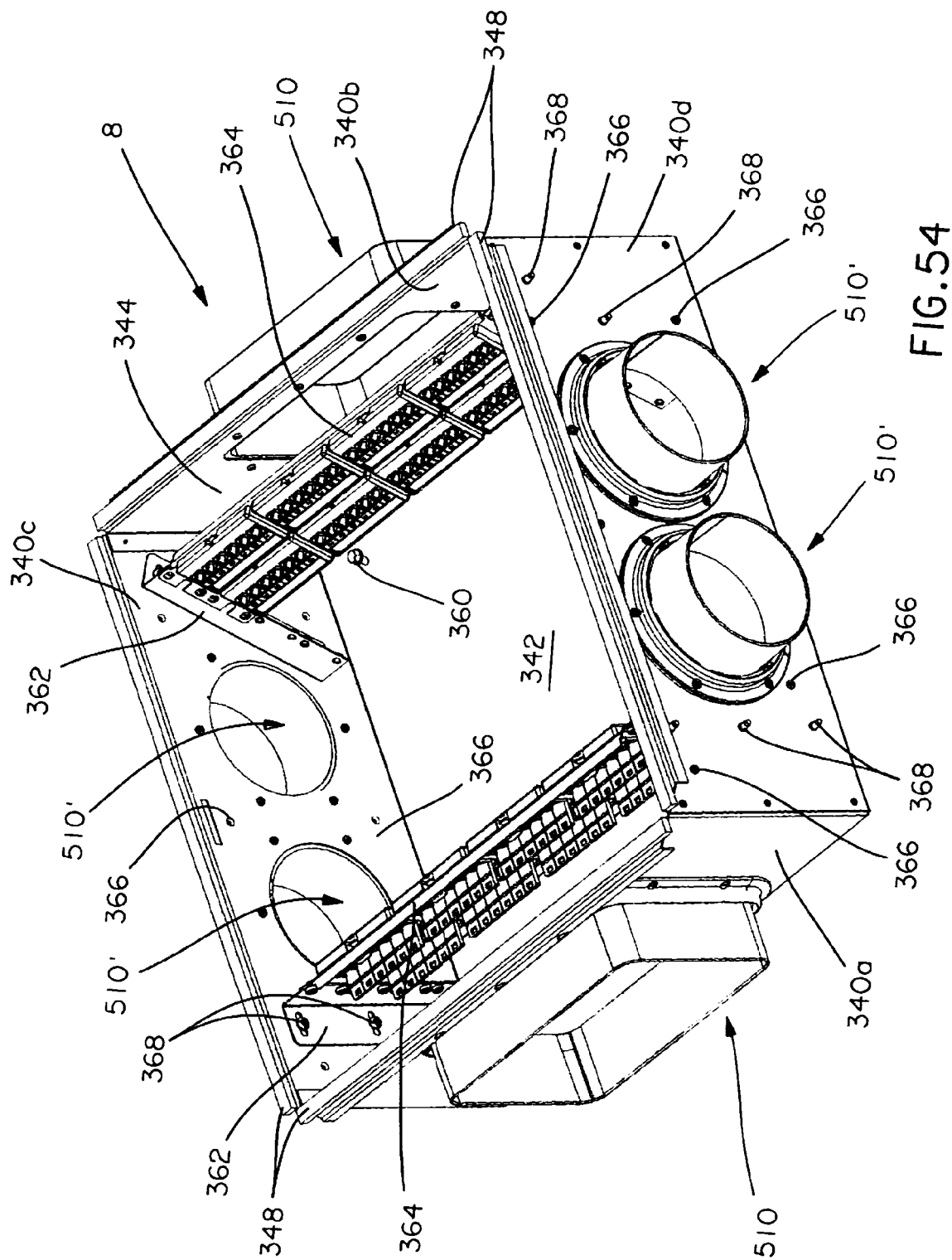
FIG. 54 is a top perspective view of a cable enclosure of the cable management system shown in FIG. 1.
Figure 55:
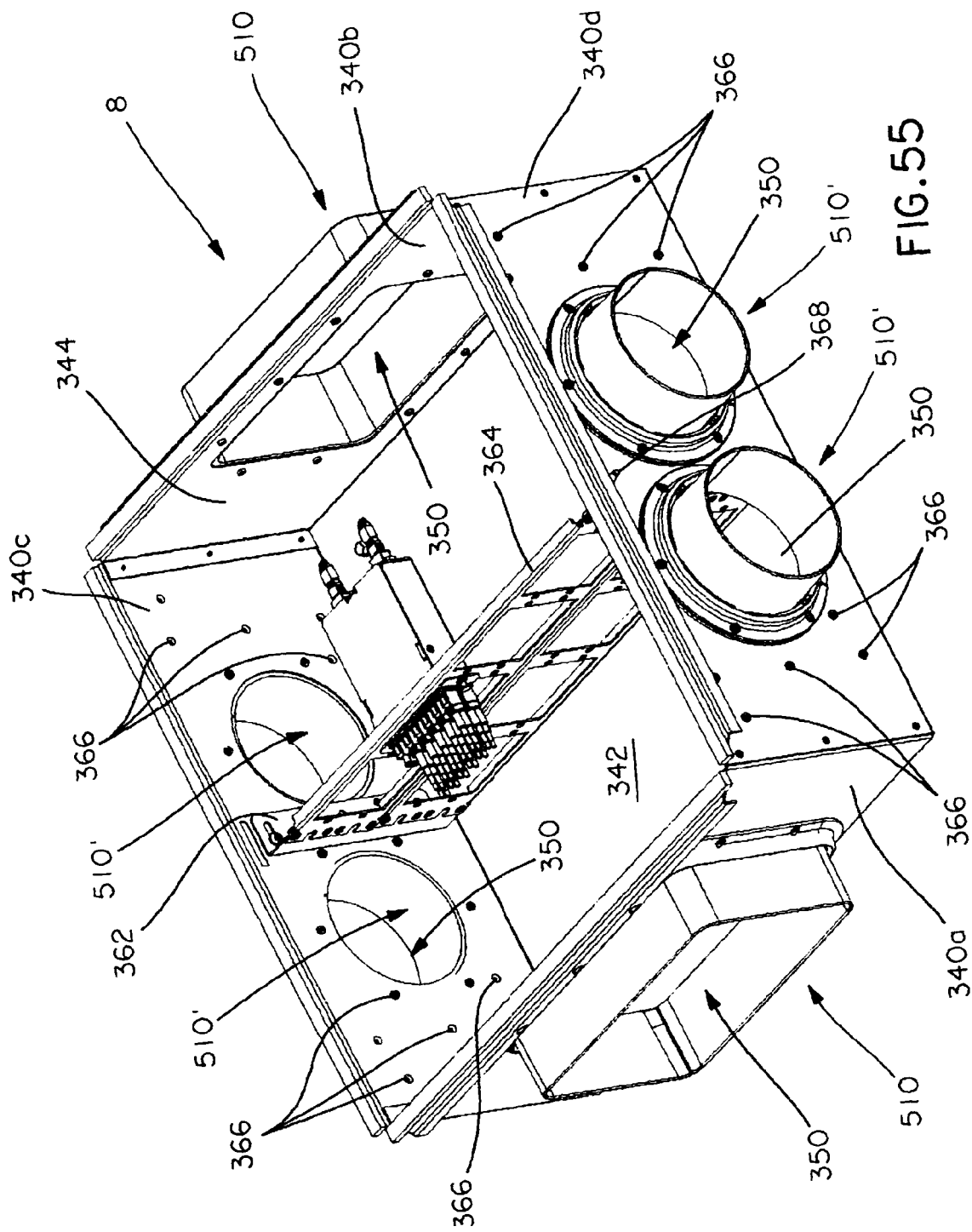
FIG. 55 is a top perspective view of a cable enclosure of the cable management system shown in FIG. 1.

Referring now to FIGS. 54 and 55, the cable enclosure 8 includes pairs of equipment brackets 362 connectable to the front and rear walls 340a, 340b within the enclosure cavity 344. Alternatively, the brackets 362 can be connected to the right and left walls 340c, 340d within the enclosure cavity 344. The brackets 362 are operable to support standard work equipment, patch panels and enclosures. In the illustrated construction, the front and rear walls 340a, 340b each include a plurality of mounting holes 366 to which the brackets 362 can connect via fasteners 368 to provide the brackets 362 with a variety of different mounting positions within the cable enclosure 8. The brackets 362 can be mounted vertically as shown by the left bracket 362 in FIG. 54 and the single bracket 362 in FIG. 55, or they can be mounted at an angle relative to the vertical as shown by the right bracket 362 in FIG. 54. The brackets 362 can be mounted within the cable enclosure 8 at a variety of angles. In some embodiments, the brackets 362 are mounted at a 30° angle relative to the vertical. Alternatively, the brackets 362 can be mounted at any angle relative to the vertical. Also, the brackets 362 can be mounted within the cable enclosure 8 at a variety of locations. For example, the brackets 362 can be mounted near the right and left side walls 340c, 340d as shown in FIG. 54 or in the middle of the cable enclosure 8 as shown in FIG. 55. Alternatively, the brackets 362 can be mounted at other locations within the cable enclosure 8. By mounting two brackets 362 within the cable enclosure 8 as shown in FIG. 54 the available space is doubled. Since users are accessing the cable enclosure 8 and the patch panels 364 from above, mounting the brackets 362 at an angle as shown in FIG. 54 provides a user with better access to the front of the patch panel 364.

Though particular embodiments of the present invention have been shown and described, it will be obvious to those skilled in the relevant arts that changes and modifications may be made without departing from the invention in its broader aspects. Therefore, the aim of the appended claims is to cover all such changes and modifications as falls within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A cable enclosure for managing electrical cables in a raised floor grid system, the cable enclosure comprising: a plurality of side walls and a base together defining an enclosure cavity, each of the plurality of side walls defines a cable opening in communication with the enclosure cavity; and
   a sealing assembly installed in each of the cable openings; the sealing assembly comprising a flexible sleeve configured to receive at least one electrical cable therethrough, the flexible sleeve including a first end and a second end, the first end positionable around a cable and the second end securable to the side wall; and
   a grommet positioned adjacent the second end of the flexible sleeve, the grommet having a first wall and a second wall that extends perpendicular to the first wall, wherein the first wall of the grommet comprises a plurality of apertures for connecting the grommet to the side wall; the second wall of the grommet extends away from the flexible sleeve and through the cable opening in the sidewall.

2. The cable enclosure of claim 1, wherein the plurality of side walls includes a plurality of bracket openings; and at least one equipment bracket mounted to an inside surface of the enclosure cavity via the plurality of bracket openings.

3. The cable enclosure of claim 2, wherein the plurality of bracket openings enable the mounting of the at least one equipment bracket to the side wall in a vertical orientation or an angled orientation.

4. The cable enclosure of claim 1, wherein the second wall of the grommet is flexible for protecting cables from sharp edges associated with the cable opening in the side wall.

5. The cable enclosure of claim 1, wherein the flexible sleeve moves between an external position, in which the first end is positioned externally of the enclosure cavity, and an internal position, in which the first end is positioned in the enclosure cavity.

6. The cable enclosure of claim 1, wherein the flexible sleeve includes a hook and loop fastener attached to the first end of the sleeve.

7. The cable enclosure of claim 6, wherein:
   each flexible sleeve is formed from a sheet of material having a top edge, a bottom edge, a first side edge, and a second side edge, and further comprises;
   a second hook and loop fastener attached to the flexible sleeve adjacent the first side edge; and
   a third hook and loop fastener attached to the flexible sleeve adjacent the second side edge; wherein
   the second and third hook and loop fasteners engage to position the flexible sleeve around at least one cable.

8. The cable enclosure of claim 1, wherein the flexible sleeve is electrically conductive.

9. The cable enclosure of claim 1, wherein a first pair of the side walls are opposite to one another and each has a single cable opening defined therethrough, and a second pair of the side walls, different than the first pair, are opposite to one another and each has two cable openings defined therethrough.

10. The cable enclosure of claim 9, wherein the cable openings in the first pair of side walls are polygonal and the cable openings in the second pair of side walls are circular.

* * * * *